United States Patent
Chung Yoo et al.

(10) Patent No.: US 12,508,322 B2
(45) Date of Patent: Dec. 30, 2025

(54) MIR-145 MICELLES FOR MITIGATING ATHEROSCLEROSIS

(71) Applicant: University of Southern California, Los Angeles, CA (US)

(72) Inventors: Eun Ji Paige Chung Yoo, Rancho Palos Verdes, CA (US); Christopher Yan Hoi Poon, Carlsbad, CA (US); Deborah Darong Chin, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 17/940,460

(22) Filed: Sep. 8, 2022

(65) Prior Publication Data
US 2023/0381337 A1 Nov. 30, 2023

Related U.S. Application Data

(60) Provisional application No. 63/241,870, filed on Sep. 8, 2021.

(51) Int. Cl.
*A61K 47/69* (2017.01)
*A61K 45/06* (2006.01)
*A61K 47/66* (2017.01)
*A61P 9/10* (2006.01)

(52) U.S. Cl.
CPC .......... *A61K 47/6909* (2017.08); *A61K 45/06* (2013.01); *A61K 47/66* (2017.08); *A61P 9/10* (2018.01)

(58) Field of Classification Search
None
See application file for complete search history.

(56) References Cited

PUBLICATIONS

Chin et al. "miR-145 micelles mitigate atherosclerosis by modulating vascular smooth muscle cell phenotype" Biomaterials 273: 120810. (Year: 2021).*
Poon et al. "Protein Mimetic and Anticancer Properties of Monocyte-Targeting Peptide Amphiphile Micelles" ACS Biomaterials Science and Engineering 3:3273-3282. (Year: 2017).*
Chin, D.D. et al., "miR-145 Micelles Mitigate Atherosclerosis by Modulating Vascular Smooth Muscle Cell Phenotype," Biomaterials (2021), 32 pages.
Chin, D.D. et al., "Long-term in vivo therapeutic effects of a single dose of miR-145 micelles for atherosclerosis," Bioactive Materials 27 (2023), pp. 327-336.
Patel, N. et al., "Therapeutic Response of miR-145 Micelles on Patient-Derived Vascular Smooth Muscle Cells," Frontiers in Digital Health (2022), v. 4, 10 pgs.

* cited by examiner

*Primary Examiner* — Sudhakar Katakam
*Assistant Examiner* — Zachary J Miknis
(74) *Attorney, Agent, or Firm* — Brooks Kushman P.C.

(57) ABSTRACT

A drug delivery system includes a plurality of nanoparticles wherein each nanoparticle includes a targeting peptide conjugated thereto that targets atherosclerotic plaque and a therapeutic agent conjugated thereto for treating atherosclerotic plaque. Alternatively, a drug delivery system includes a plurality of micelles wherein each micelle includes a targeting peptide conjugated thereto that targets atherosclerotic plaque and a drug incorporated into the core of the micelle or conjugated to the hydrophobic tail of the amphiphiles. A method for treating atherosclerosis in a subject is also provided.

38 Claims, 30 Drawing Sheets
(11 of 30 Drawing Sheet(s) Filed in Color)
Specification includes a Sequence Listing.

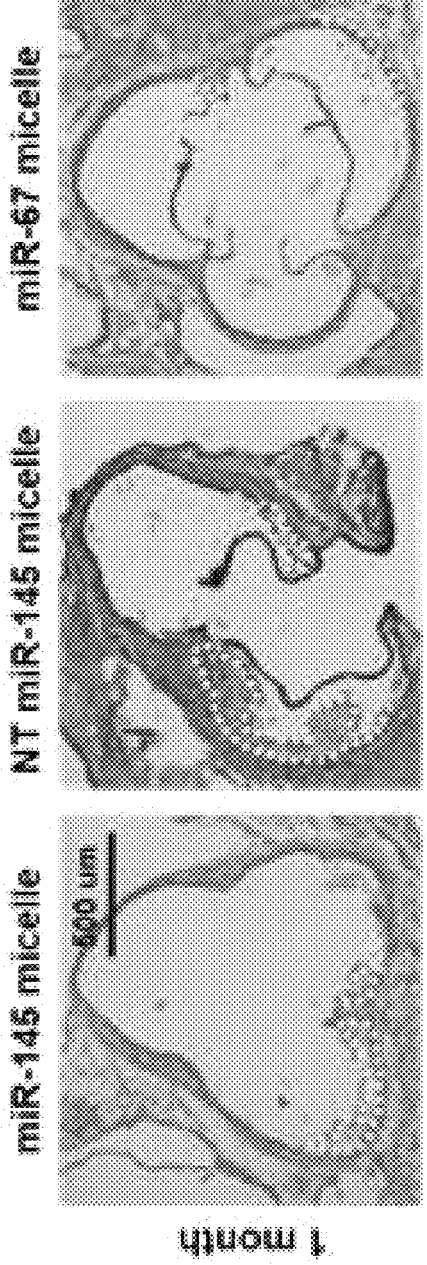
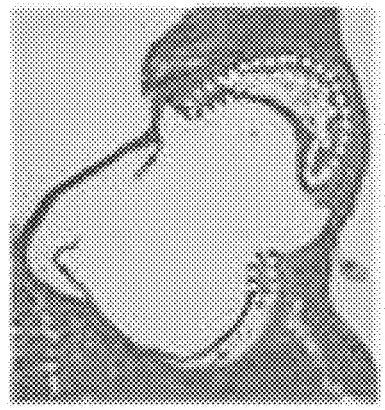
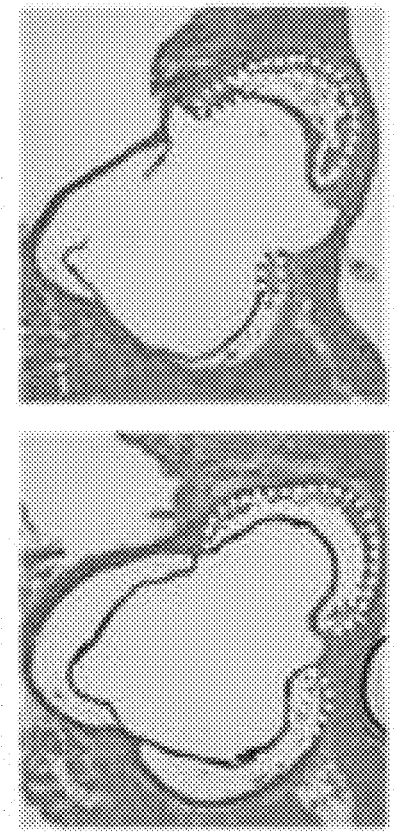

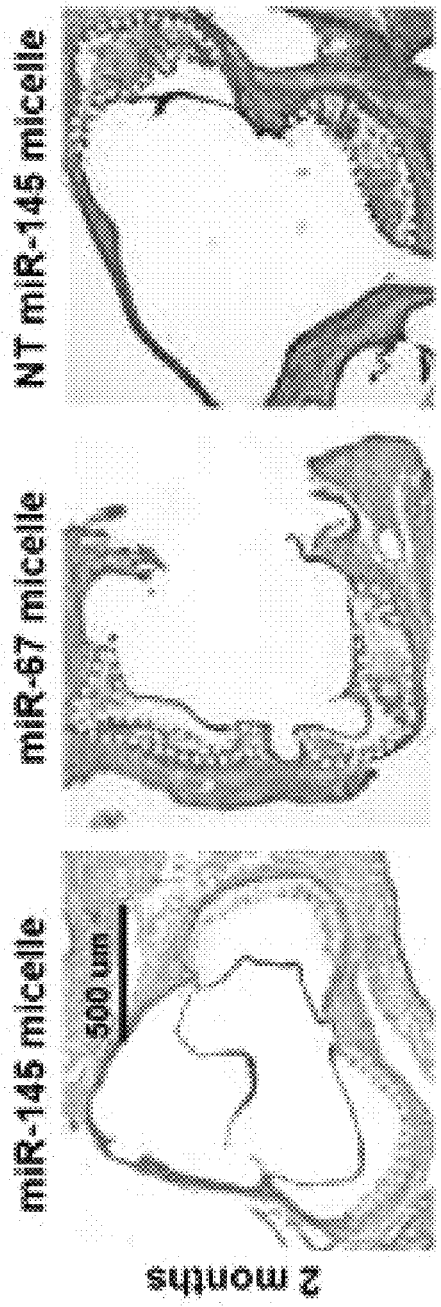
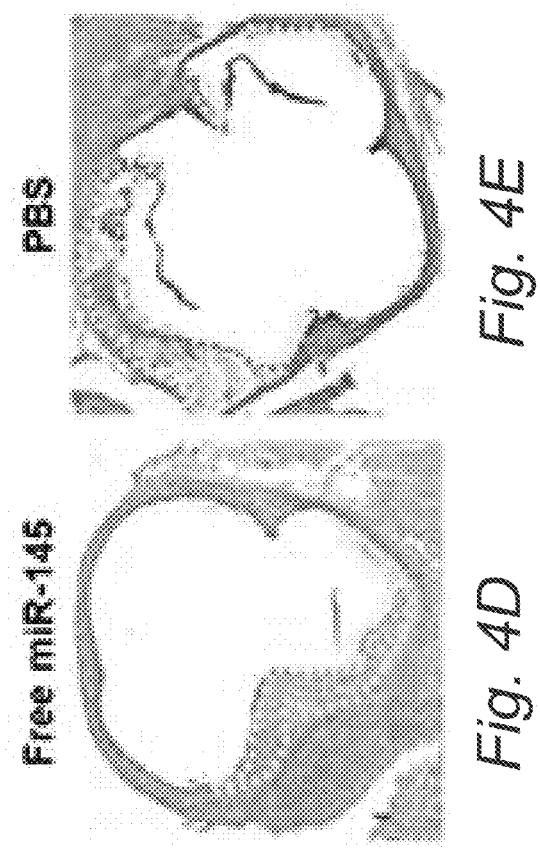
Fig. 4A  Fig. 4B  Fig. 4C  Fig. 4D  Fig. 4E

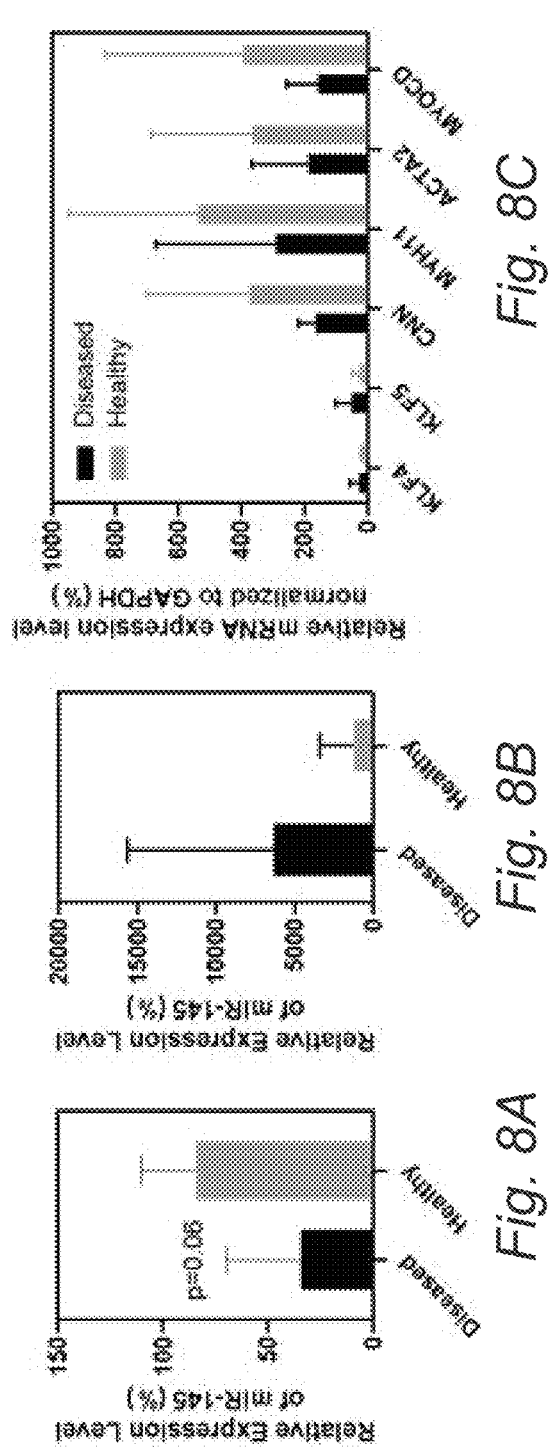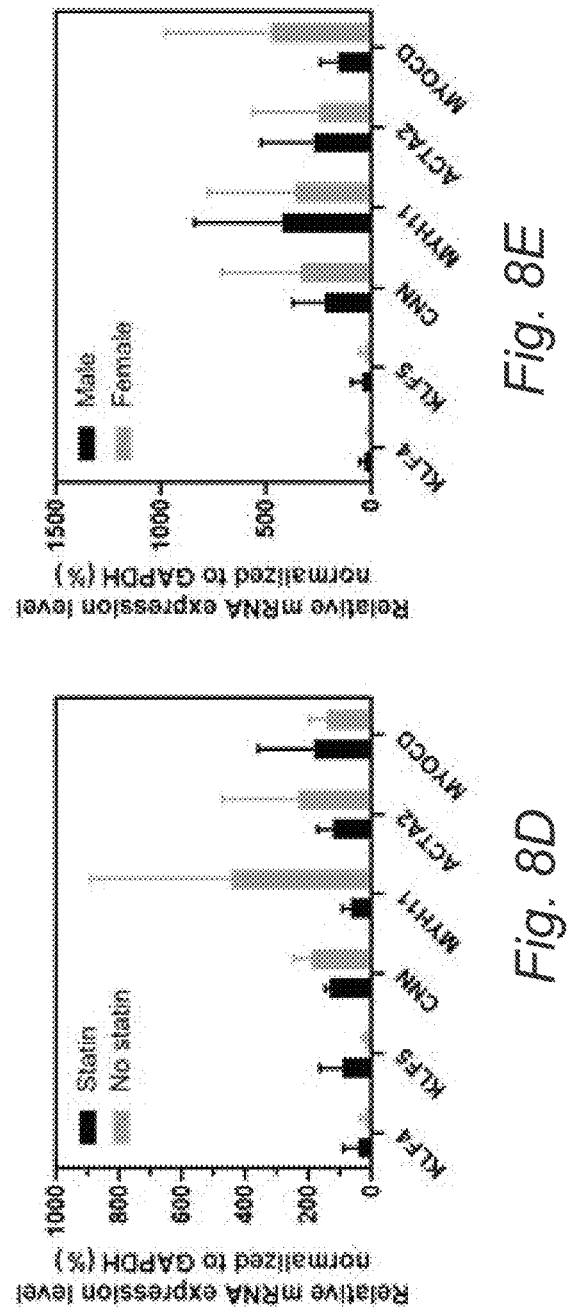
Fig. 8A
Fig. 8B
Fig. 8C
Fig. 8D
Fig. 8E

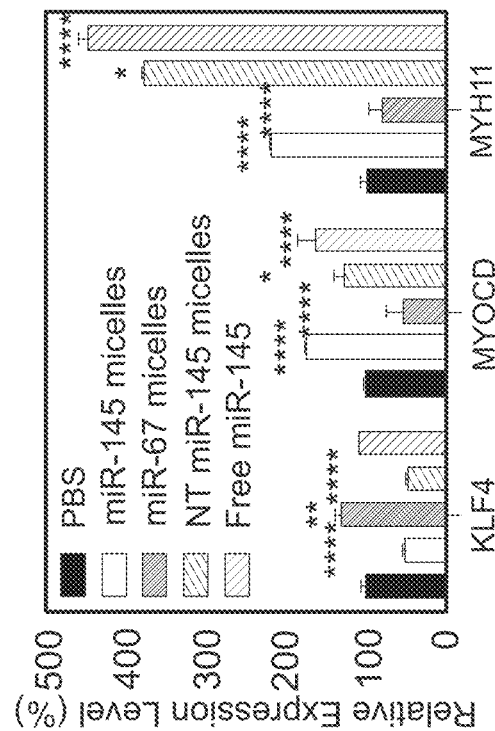
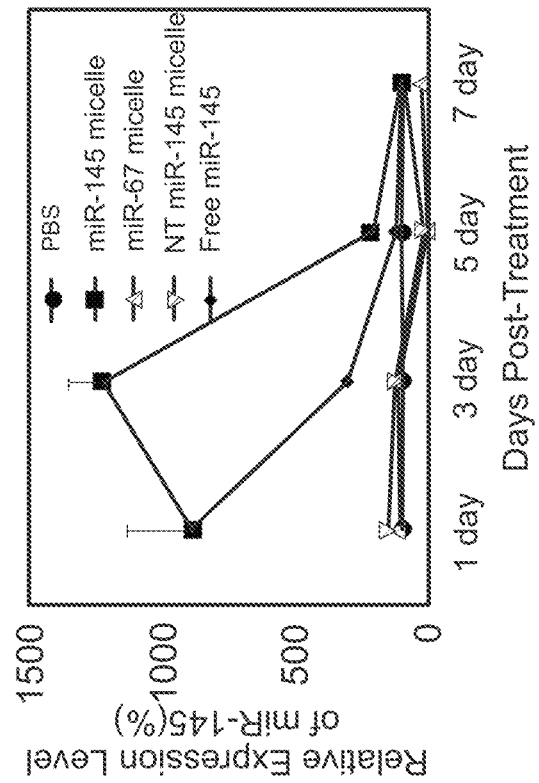
Fig. 9B
Fig. 9A

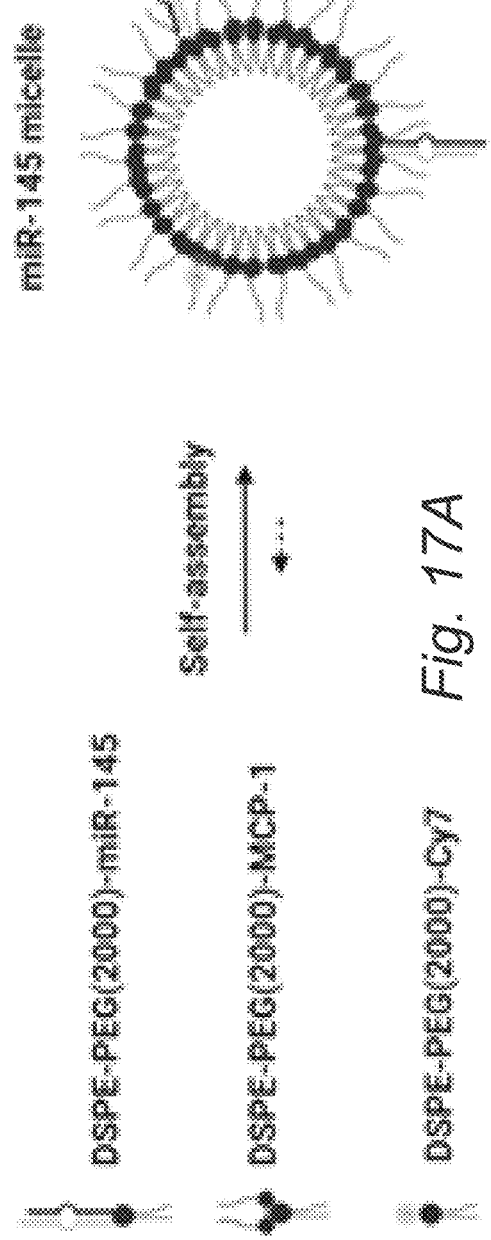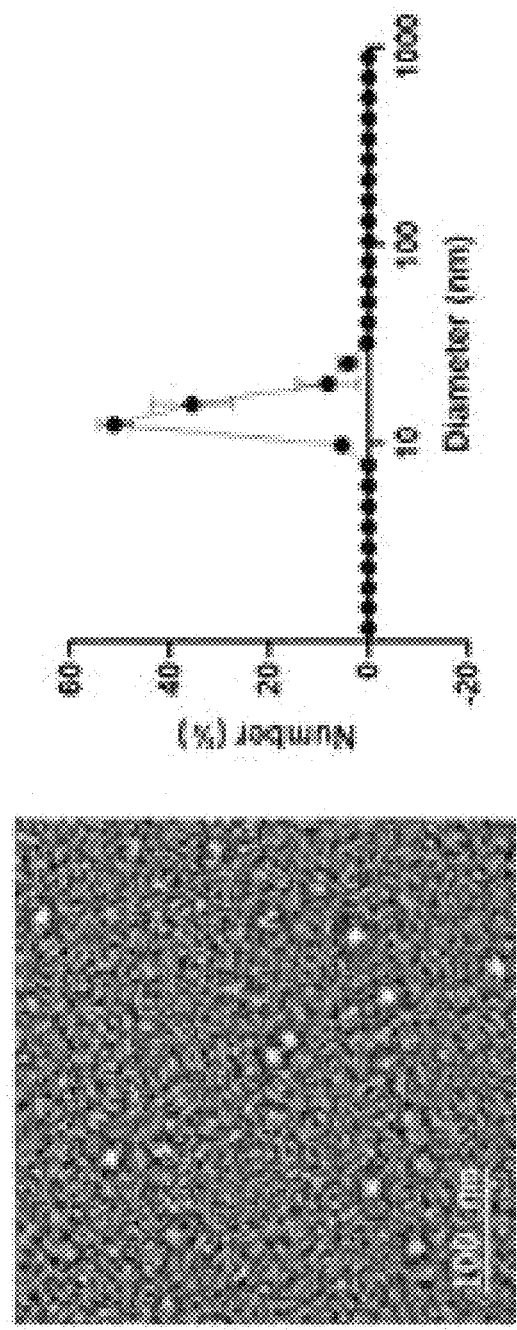
Fig. 17A
Fig. 17B
Fig. 17C

MIR-145 MICELLES FOR MITIGATING ATHEROSCLEROSIS

CROSS-REFERENCE TO RELATED APPLICATIONS

This application claims the benefit of U.S. provisional application Ser. No. 63/241,870 filed Sep. 8, 2021, the disclosure of which is hereby incorporated in its entirety by reference herein.

STATEMENT REGARDING FEDERALLY SPONSORED RESEARCH OR DEVELOPMENT

The invention was made with Government support under Contract Nos. HL124279 and DK121328, awarded by the National Institutes of Health (NIH). The Government has certain rights to the invention.

SEQUENCE LISTING

The xml file Micelle-ST26-update.XML of size 9719 bytes created Aug. 7, 2025 filed herewith, is hereby incorporated by reference.

TECHNICAL FIELD

In at least one aspect, the present invention is related to nanoparticles for treating atherosclerosis.

BACKGROUND

Vascular smooth muscle cells (VSMCs) are the predominant cell type in blood vessel walls and are responsible for maintaining vessel wall integrity, elasticity, and contractility [1]. In healthy vessels, VSMCs maintain a quiescent, contractile phenotype, but in response to injury or aging, such as atherosclerosis, VSMCs lose their contractile markers and dedifferentiate into an over proliferative and migratory synthetic phenotype and transdifferentiate into inflammatory macrophages and calcifying osteochondrogenic cells that can propagate disease [2,3]. Recent in vivo VSMC lineage-tracing studies in atherosclerotic mice have elucidated that 30-70% of the cell population in atherosclerotic plaques are originally derived from VSMCs and hence, interventions that can modulate VSMC phenotype and transdifferentiation may serve as a "multi-target" therapy in atherosclerosis by inhibiting multiple, plaque-propagating cell types [4,5].

MicroRNAs (miRs) are short, non-coding, 22-24 nucleotide RNAs that demonstrate post-transcriptional gene silencing capabilities [6]. In particular, miR-145 is the most highly expressed miR in the vasculature and maintains the VSMC contractile phenotype by promoting contractile genes, myocardin, calponin, and alpha-smooth muscle actin ($\alpha$-SMA), while downregulating synthetic genes, Krüppel-like factor-4/5 (KLF-4/5) and ETS domain-containing protein-1 (ELK-1) [7,8]. Clinically, patients with atherosclerosis have reduced levels of circulating miR-145 and regions of vascular damage express little to undetectable levels of miR-145 [7,9,10]. Thus, we hypothesize that delivery of miR-145 to VSMCs has the potential to mitigate plaque development by promoting the contractile VSMC phenotype.

Delivering nucleic acids in vivo, however, has challenges including degradation by nucleases, which limits drug half-life in circulation, and dilution in off-target tissues, which can lead to adverse side effects [11-13]. To overcome these limitations and improve the delivery of nucleic acids, we previously reported on the development of peptide amphiphile micelle (PAM) nanoparticles that can be specifically delivered to pathological features in atherosclerosis such as monocytes and microthrombi, and reported on their in vivo stability, biocompatibility, and potential for drug delivery [14-16]. Given the growing knowledge and significance of VSMCs in atherosclerosis in recent years, in this study, we designed a novel strategy using PAMs to mitigate VSMC phenotypic modulation through miR-145 delivery.

SUMMARY

In at least one aspect, the present invention provides a drug delivery system for treating atherosclerotic plaques is provided. The drug delivery system includes a plurality of nanoparticles wherein each nanoparticle includes a targeting peptide conjugated thereto that targets atherosclerotic plaque and a therapeutic agent conjugated thereto for treating atherosclerotic plaque. Advantageously, the nanoparticles can be micelles, and the therapeutic agent can be a polynucleotide (e.g., a miR).

In another aspect, a method for treating atherosclerosis in a subject is provided. The method including a step of administering a therapeutically effective amount of the drug delivery system set forth herein to the subject.

In still another aspect, PAMs consisting of the targeting moiety, monocyte chemoattractant protein-1 (MCP-1) peptide, for delivery of miR-145 to atherosclerotic lesions (miR-145 micelles) are provided. MCP-1/C-C motif chemokine ligand 2 (CCL2) is the high affinity ligand for C-C chemokine receptor-2 (CCR2), a receptor that is highly expressed on synthetic VSMCs. Additionally, CCR2 has been reported to be expressed on monocytes and macrophages that make up atherosclerotic plaques [17]. Thus, the use of MCP-1 for facilitated delivery of miR-145 is an attractive strategy to increase local concentration of miR-145 in plaques.

In another aspect, the efficacy of miR-145 micelles was evaluated by testing the ability of miR-145 micelles to bind to VSMCs and inhibit phenotypic switching in vitro using patient-derived VSMCs. Their ability to mitigate atherosclerosis at early- and mid-stage disease was evaluated in a ApoE knock-out (ApoE$^{-/-}$) mouse model. Additionally, the pharmacokinetic properties, safety, and toxicity of this novel nanotherapeutic were evaluated. Together, the therapeutic potency of miR-145 micelles and its potential application during multiple stages of atherosclerosis are reported.

In atherosclerosis, resident vascular smooth muscle cells (VSMCs) in the blood vessels become highly plastic and undergo phenotypic switching from the quiescent, contractile phenotype to the migratory and proliferative, synthetic phenotype. Additionally, recent VSMC lineage-tracing mouse models of atherosclerosis have found that VSMCs transdifferentiate into macrophage-like and osteochondrogenic cells and make up to 70% of cells found in atherosclerotic plaques. Given VSMC phenotypic switching is regulated by microRNA-145 (miR-145), it is believed that nanoparticle-mediated delivery of miR-145 to VSMCs has the potential to mitigate atherosclerosis development by inhibiting plaque-propagating cell types derived from VSMCs. This is tested by synthesizing miR-145 micelles targeting the C-C chemokine receptor-2 (CCR2), which is highly expressed on synthetic VSMCs. When miR-145 micelles were incubated with human aortic VSMCs in vitro, >90% miR-145 micelles escaped the lysosomal pathway in 4 hours and released the miR cargo under cytosolic levels of glutathione, an endogenous reducing agent. As such, miR- 145 micelles rescued atheroprotective contractile markers, myocardin, α-SMA, and calponin, in synthetic VSMCs in vitro. In early-stage atherosclerotic ApoE$^{-/-}$ mice, one dose of miR-145 micelles prevented lesion growth by 49% and sustained an increased level of miR-145 expression after 2 weeks post-treatment. Additionally, miR-145 micelles inhibited 35% and 43% plaque growth compared to free miR-145 and PBS, respectively, in mid-stage atherosclerotic ApoE$^{-/-}$ mice. Collectively, a novel therapeutic strategy and cell target for atherosclerosis is provided. Moreover, miR-145 micelles as a viable nanotherapeutic that can intervene in atherosclerosis progression at both early and later stages of disease are described.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a further understanding of the nature, objects, and advantages of the present disclosure, reference should be made to the following detailed description, read in conjunction with the following drawings, wherein like reference numerals denote like elements and wherein:

FIGS. 2A, 2B, 2C, 2D, 2E, 2F, 2G, 2H, and 2I. Plaque analysis in early-stage atherosclerotic mice one month after treatment with a single dose of miR-145 micelles. (A-E) Cross sections of aortic roots of miR-145 micelle-treated mice stained with H&E. Yellow outlines indicate plaque area. Scale bar 500 μm. Quantification of (F) aortic root lesion sizes and (G) aortic root plaque necrotic core area, and (H) en face lesions of the aorta. (I) miR-145 expression in the aortic root quantified by RT-qPCR.  indicates $p<0.01$, ** indicates $p<0.0001$.

FIGS. 4A, 4B, 4C, 4D, 4E, 4F, 4G, 4H, and 4I. Plaque analysis in mid-stage atherosclerotic mice two months after treatment with a single dose of miR-145 micelles. (A-E) H&E stains of aortic root cross sections of miR-145 micelle-treated mice two months after treatment. Yellow dashes delineate plaque area. Quantification of (F) aortic root lesion sizes and (G) aortic root plaque necrotic core area, and (H) en face lesions in the entire aorta. (I) miR-145 expression in the aortic root is elevated with miR-145 micelle treatment when quantified by RT-qPCR. * indicates $p<0.05$, **** indicates $p<0.0001$.

FIGS. 8A, 8B, 8C, 8D, and 8E. A) Baseline expression of miR-145 in diseased or healthy patient cells from 8 patient samples (N=4 per group). B) Change in miR-145 expression after treatment of diseased or healthy patient c ells with miR-145 micelles (25 uM, 4 h treatment). C) Change in expression of synthetic and contractile phenotypic markers in diseased and healthy patient cells after miR-145 micelle treatment when compared to baseline levels. D) Change in expression level of miR-145 after miR-145 micelles treatment of cells from patients that have or have not used statin. Values are relative compared to baseline expression levels. E) Gender differences in change in relative expression level of miR-145 after miR-145 micelles treatment of patient cells.

FIGS. 9A and 9B. A) Expression level of miR-145 in primary MYH11 SMCs after in vitro tamoxifen and initial treatment. B) Synthetic and contractile phenotypic markers in primary MYH11 SMCs after in vitro tamoxifen and treatment.

FIGS. 17A, 17B, and 17C. (A) Schematic of miR-145 micelle formulation. (B) TEM images of spherical miR-145 micelles. (C) DLS measurements of miR-145 micelle size.

DETAILED DESCRIPTION

Figure 1:
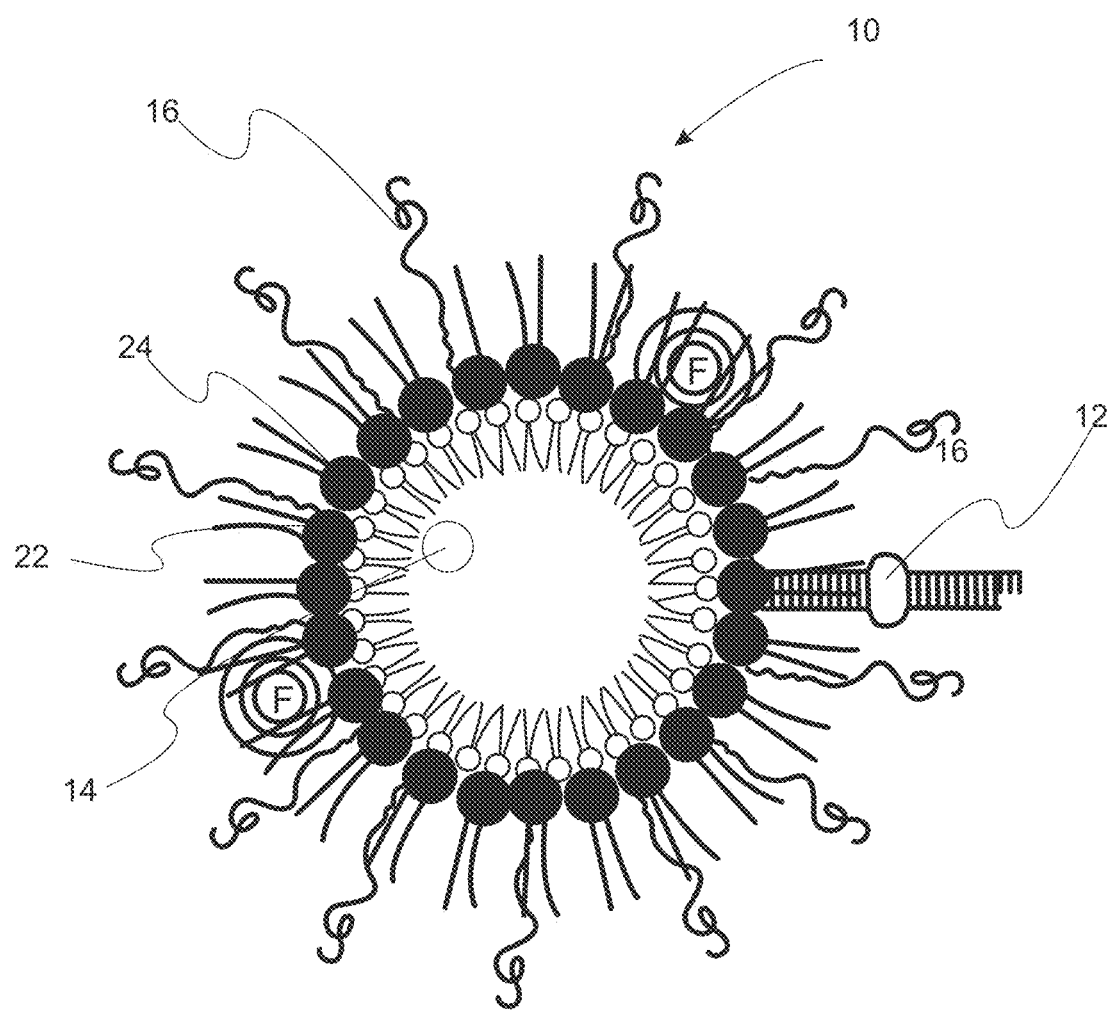
FIG. 1. Schematic of a micelle for atherosclerosis.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. Ri where i is an integer) include hydrogen, alkyl, lower alkyl, $C_{1-6}$ alkyl, $C_{6-10}$ aryl, $C_{6-10}$ heteroaryl, alylaryl (e.g., $C_{1-8}$ alkyl $C_{6-10}$ aryl), —NO$_2$, —NH$_2$, —N(R'R"), —N(R'R"R''')$^+$L$^-$, Cl, F, Br, —CF$_3$, —CCl$_3$, —CN, —SO$_3$H, —PO$_3$H$_2$, —COOH, —CO$_2$R', —COR', —CHO, —OH, —OR', —O$^-$M$^+$, —SO$_3^-$M$^+$, —PO$_3^-$M$^+$, —COO$^-$M$^+$, —CF$_2$H, —CF$_2$R', —CFH$_2$, and —CFR'R" where R', R" and R''' are $C_{1-10}$ alkyl or $C_{6-18}$ aryl groups, M$^+$ is a metal ion, and L$^-$ is a negatively charged counter ion; R groups on adjacent carbon atoms can be combined as —OCH$_2$O—;

single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, —NO$_2$, —NH$_2$, —N(R'R"), —N(R'R"R''')$^+$L$^-$, Cl, F, Br, —CF$_3$, —CCl$_3$, —CN, —SO$_3$H, —PO$_3$H$_2$, —COOH, —CO$_2$R', —COR', —CHO, —OH, —OR', —O$^-$M$^+$, —SO$_3^-$M$^+$, —PO$_3^-$M$^+$, —COO$^-$M$^+$, —CF$_2$H, —CF$_2$R', —CFH$_2$, and —CFR'R" where R', R" and R''' are $C_{1-10}$ alkyl or $C_{6-18}$ aryl groups, M$^+$ is a metal ion, and L$^-$ is a negatively charged counter ion; hydrogen atoms on adjacent carbon atoms can be substituted as —OCH$_2$O—; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

The sequences provide herein are human sequences.

Throughout this application, where publications are referenced, the disclosures of these publications in their entireties are hereby incorporated by reference into this application to more fully describe the state of the art to which this invention pertains.

Abbreviations

"CCR2" means C-C chemokine receptor type 2.
"DMEM" means Dulbecco's modified eagle medium.
"hASMC" means human smooth muscle cell.
"HBSS" means Hanks' balanced salt solution.
"PAM" means peptide amphiphile micelle.
"VSMC" means vascular smooth muscle cell.

The term "pharmaceutically acceptable carrier" means any material which, when combined with the compositions set forth herein allows the composition to retain biological activity. In the context of the present invention, a pharmaceutically acceptable carrier can include water or saline. Examples of other standard pharmaceutical carriers include a phosphate buffered saline solution, water, emulsions, such as an oil/water or water/oil emulsion, and various types of wetting agents. The compositions also can include stabilizers and preservatives.

The term "therapeutically effective amount" is an amount sufficient to effect beneficial or desired results. An effective amount can be administered in one or more administrations, applications or dosages.

The term "subject" refers to a human or animal, including all mammals such as primates (particularly higher primates), sheep, dog, rodents (e.g., mouse or rat), guinea pig, goat, pig, cat, rabbit, and cow.

The term "conjugate" means a compound formed as a composite between two or more molecules. In a refinement, the therapeutic agent is covalently bonded to an amphiphile typically via a linking group (e.g., PEG). Similarly, a fluorescent probe, when present in covalently bonded to an amphiphile via a linking group. Finally, the non-targeted amphiphile can includes an end cap group conjugated to a base amphiphile. In other refinements, the composite between two or more molecules is formed by electrostatic interactions. In still other refinement, composite between two or more molecules is formed by hydrophobically incorporate ligands, drugs, and other molecules.

The term "amphiphilic" means a chemical compound possessing both hydrophilic and lipophilic properties.

The term "base amphiphile" refers to an amphiphile that can be reacted with a linking group that may attach another molecule or moiety (e.g., a fluorescent probe, a therapeutic agent, an end group, and the like).

The term "targeting peptide-conjugated amphiphile" refers to an amphiphile that is conjugated to a targeting peptide. Sometimes "targeting peptide-conjugated amphiphile" is referred to as "targeting peptide amphiphile."

The term "therapeutic agent-conjugated amphiphile" refers to an amphiphile that is conjugated to a therapeutic agent. Sometimes "therapeutic agent-conjugated amphiphile" is referred to as "therapeutic agent amphiphile." The therapeutic agent can be a drug or a polynucleotide such as a microRNA.

The term "non-targeted amphiphile" refers to an amphiphile that is not conjugated to a targeting peptide.

In an embodiment, a drug delivery system that uses atherosclerotic plaque targeting peptides is provided. As illustrated in FIG. 1A, the drug delivery system includes a plurality of nanoparticles 10. Each nanoparticle 10 has a therapeutic agent 12 for treating atherosclerotic plaque conjugated thereto. In a variation, each nanoparticle 10 has a therapeutic agent 14 positioned within or partially within the nanoparticle. Moreover, each nanoparticle 10 also has a targeting peptide 16 conjugated thereto that targets atherosclerotic plaque. Advantageously, the nanoparticles can be micelles, liposomes, or combinations thereof. The nanoparticles are characterized in having at least one spatial dimension that is less than or equal to 100 nm. (e.g., 10 to 100 nm.). Typically, the nanoparticles have an average diameter that is less than or equal to 100 nm. (e.g., 1 to 100 nm.).

In a variation, the targeting peptide includes a CCR2 binding motif of MCP-1. An example of such a targeting peptide is a polypeptide having SEQ ID NO: 1-YNFTNRKISVQRLASYRRITSSK or a fragment thereof that binds to MCP-1.

In some variations, the therapeutic agent includes a polynucleotide and in particular RNA. In a refinement, the therapeutic agent is a microRNA such as miR-145 or a therapeutically effective fragment thereof. In particular, the therapeutic agent includes a polynucleotide having SEQ ID NO: 2-5'-GUCCAGUUUUCCCAGGAAUCCCU-3' or a therapeutically effective fragment thereof.

In other variations, the targeting peptide includes a component selected from the group consisting of MCP-1 having sequence CYNFTNRKISVQRLASYRRITSSK (SEQ ID NO: 10), a VLA-4 peptide having sequence CVHPKQHR (SEQ ID NO: 3), a fibrin-targeting peptide having sequence CREKA, a collagenase-targeting peptide having sequence CVPMSMCYNFTNRKISVQRLASYRRITSSKRGG (SEQ ID NO: 4), a hydroxyapatitie-targeting peptide having sequence SVSVGMKPSPRP, and derivates thereof, the derivatives including modification of cysteines and other functional groups on either peptide side.

Typically, the targeting peptide is connected to the nanoparticles by reaction with a functional group. Examples of such functional groups that can be used for linking include, but are not limited to amines, carboxylic acids, NHS esters, acid anhydrides, or unsaturated imides (e.g., maleimide).

In a variation, the micelle further includes a drug incorporated into the core of the micelle or conjugated to the hydrophobic tail of the amphiphiles. Examples of such drugs include, but are not limited to, cholesterol medications (e.g., statins, fibrates, etc.), anti-platelet medications, beta-blockers, angiotensin-converting enzyme (ACE) inhibitors, calcium channel blockers, and the like. In another variation, the micelle includes the drug incorporated into the core of the micelle or conjugated to the hydrophobic tail of the amphiphiles but not a therapeutic agent-conjugated amphiphile.

In another variation, the micelle further includes a combination of miR-145 and a statin.

Characteristically, the plurality of targeting peptide-conjugated amphiphiles includes amphiphiles having a first phospholipid conjugated to the targeting peptide with a first linking group, the plurality of therapeutic agent-conjugated amphiphiles includes amphiphiles having a second phospholipid conjugated to the therapeutic agent with a second linking group, and the optional plurality of non-targeted amphiphiles includes amphiphiles having a third phospholipid conjugated to a capping moiety (e.g., $C_{1-10}$ alkoxyl) with a third linking group. In a refinement, the first linking group, the second linking group, and the third linking group are each independently a polyethylene glycol having a weight average molecular weight from about 500 to 10000 Daltons. The targeting peptide and/or the therapeutic agent can be conjugated to the base amphiphile via reaction with a number of linking reactions known to those skilled in the art. Examples of functional groups that can be used for linking includes amines, carboxylic acids, NHS esters, acid anhydrides, unsaturated imides (e.g., maleimide), and the like. In a refinement, the targeting peptide can be conjugated to the base amphiphile via reaction with a maleimide end group on the linking group as depicted in the following formula:

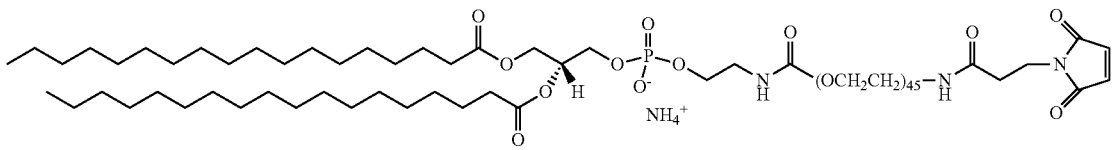

As set forth above, the plurality of nanoparticles can include a plurality of micelles. With reference to FIG. 1A, each micelle includes a plurality of targeting peptide-conjugated amphiphiles 20, a plurality of therapeutic agent-conjugated amphiphiles 22, and an optional plurality of non-targeted amphiphiles 24. The plurality of targeting peptide conjugated amphiphiles 20 include amphiphiles having a targeting peptide (e.g., SEQ ID NO: 1) conjugated to a base amphiphile. The plurality of therapeutic agent-conjugated amphiphiles 22 include amphiphiles having a therapeutic agent (e.g., SEQ ID NO: 2) conjugated to a base amphiphile. The non-targeted amphiphiles 24 are characterized in not having a targeting peptide conjugated thereto. Typically, the molar ratio of the plurality of targeting peptide-conjugated amphiphiles to the plurality of therapeutic agent-conjugated amphiphiles is from about 5:1 to 1:5 with a one-to-one ratio (1:1) being optimal. Similarly, when the non-targeted amphiphiles are present, the molar ratio of the plurality of targeting peptide-conjugated amphiphiles to the plurality of non-targeted amphiphiles is from about 5:1 to 1:5 with a one-to-one ratio (1:1) being optimal.

In the case of the therapeutic agent being a miR, and in particular miR-145, the miR can be thiolated at the 5' end.

In a variation, the plurality of micelles has an average micelle diameter form about 5 to 30 nm. In a refinement, the plurality of micelles has an average micelle diameter form about 8 to 20 nm. Typically, the drug delivery system is adapted for oral, subcutaneous, transdermal, intravenous or intraperitoneal administration. In this regard, the drug delivery system can further include a pharmaceutically acceptable carrier (e.g., water or saline).

In some variations, the first phospholipid, the second phospholipid, and the third phospholipid are each independently selected from the group consisting of phosphatidic acids, phosphatidyl inositols, phosphatidyl cholines, phosphatidyl ethanolamines, phosphatidyl serines, phosphatidyl glycerols, and any combinations thereof. More specific examples for the first phospholipid, the second phospholipid, and the third phospholipid include, but are not limited to, phosphatidylglycerol, lecithin, sphingomyelin, phosphatidylserine, phosphatidic acid, N-(2,3-di(9-(Z)-octadecenyloxy))-prop-1-yl-N,N,N-trimethylammonium chloride, phosphatidylethanolamine, lysolecithin, lysophosphatidylethanolamine, phosphatidylinositol, cephalin, cardiolipin, cerebrosides, dicetylphosphate, dioleoylphosphatidylcholine, dipalmitoylphosphatidylcholine, dipalmitoylphosphatidylglycerol, dioleoylphosphatidylglycerol, palmitoyl-oleoyl-phosphatidylcholine, di-stearoyl-phosphatidylcholine, stearoyl-palmitoyl-phosphatidylcholine, di-palmitoyl-phosphatidylethanolamine, di-stearoyl-phosphatidylethanolamine, di-myrstoyl-phosphatidylserine, di-oleyl-phosphatidylcholine, dimyristoyl phosphatidyl choline (DMPC), dioleoylphosphatidylethanolamine, palmitoyloleoylphosphatidylcholine, di stearoylphosphatidylcholine, dioleoylphosphatidylcholine, dipalmitoylphosphatidylcholine, dioleoylphosphatidylglycerol, dipalmitoylphosphatidylglycerol, -phosphatidylethanolamine, dioleoyl-phosphatidylethanolamine 4-(N-maleimidomethyl)-cyclohexane-1-carboxylate (DOPE-mal), 1-stearoyl-2-oleoyl phosphatidylcholine, 1,2-distearoyl-sn-glycerol-3-phosphoethanolamine, or combinations thereof.

A specific example of the targeting peptide-conjugated amphiphile is DSPE-PEG(2000)-MCP-1, and in particular, DSPE-PEG(2000)-YNFTNRKISVQRLASYRRITSSK (SEQ ID NO: 1). A specific example of the plurality of therapeutic agent-conjugated amphiphile is DSPE-PEG(2000)-miR-45, and in particular, DSPE-PEG(2000)-GUCCAGUUUUCCCAGGAAUCCCU (SEQ ID NO: 2). A specific example for the optional plurality of non-targeted amphiphiles includes amphiphiles having formula:

peptide synthesis procedures previously published [18-21]. MCP-1 peptide (0.25 mmol) [YNFTNRKISVQRLASYRRITSSK (SEQ ID NO: 1)] or scrambled (NT) peptide (0.25 mmol) [YNSLVFRIRNSTQRKYRASIST](SEQ ID NO: 5) were synthesized on an automated peptide synthesizer (PS3, Protein Technologies, Tucson, AZ) using Wang resin. The peptides were cleaved from the resin using a solution of 94:2:5:2:5:1 vol % trifluoroacetic acid:1,2-ethanedithiol: water:triisopropylsilane over a 4 h reaction. Peptides were precipitated, washed twice with ice-cold diethyl ether, lyophilized, and stored at −20° C. until purification via reverse-phase high performance liquid chromatography system (HPLC, Prominence, Shimadzu, Columbia, MD). Purified peptides were conjugated to DSPE-PEG(2000)-maleimide to synthesize peptide amphiphiles. Synthesis reactions occurred in pH 7.4 buffered water before purification via HPLC. Expected m/z peaks were verified using MALDI-TOF at $[M+H]^+$=5830.

miR-145 (5'-GUCCAGUUUUCCCAGGAAUCCCU-3') (SEQ ID NO: 2) and control miR (miR-67) (5'-UCACAAC-CUCCUAGAAAGAGUAGA-3') (SEQ ID NO: 6) were ordered from IDT (Coralville, IA) with a thiol modified 5' end of the sense (functional) strand to covalently conjugate the microRNA to the lipid tail. miR-145-SH (MW=14490 g/mol) was treated with TCEP and stirred in the dark at room temperature for 4 hours at 1600 rpm. Thiolated miR-145 was conjugated to DSPE-PEG(2000)-malemide (Avanti Polar Lipids, Alabaster, AL) via a thioether bond by adding a 10%

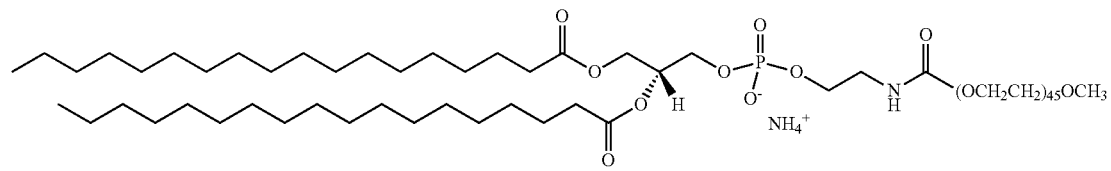

(DSPE-PEG(2000)-Methoxy).

In a refinement, a plurality of micelle includes an amphiphile composed of 1',3'-dihexadecyl N-succinyl-1-glutamate (diC16). In a further refinement, this amphiphile allows cylindrical micelles to form.

In an embodiment, a method for treating atherosclerosis in a subject is provided. the method can include a step of identifying a subject at risk for atherosclerosis and then administering a therapeutically effective amount of the drug delivery system set forth above. In a refinement, the method further includes a step of treating the subject with a small molecule therapeutics. As set forth above, the small molecule therapeutic can be a statin. In a further refinement, the small molecule therapeutic is incorporated into the nanoparticles as set forth above.

It should be appreciated that the drug delivery system can be administered intravenously, subcutaneously, orally, by intraperitoneal injection, and transdermally, and the like, and combinations thereof.

The following examples illustrate the various embodiments of the present invention. Those skilled in the art will recognize many variations that are within the spirit of the present invention and scope of the claims.

1. Long-Term, In Vivo Therapeutic Effects of a Single Dose of miR-145 Micelles in Atherosclerosis
1.1 Experimental
    1.1.1 Synthesis of amphiphiles. MCP-1 and scrambled peptides were synthesized using standard Fmoc solid-phase molar excess of lipid to reduced thiolated miR in DEPC-treated water. The resulting products were characterized using MALDI.
1.1.2 Mice.
Animal protocols were approved by the University of Southern California Institutional Animal Care and Use Committee (IACUC).

Male $Myh11\text{-}CreER^{T2}$ ROSA26 STOP-flox $eYFP^{+/+}$ $Apoe^{-/-}$ mice and female $Apoe^{-/-}$ mice were used for all studies as the Myh11 transgene is expressed only in male mice. Mice were genotyped by qPCR. Following previously reported methods [23], mice received ten intraperitoneal injections of 1 mg tamoxifen from 6 weeks of age to 8 weeks for 10 mg total of tamoxifen per 25 g of mouse body weight.

Subsequently, mice were fed a high fat diet (20-23% milkfat, 34% sucrose, 0.2% cholesterol, Teklad Envigo) for 2 weeks before intravenous tail vein injection of treatment (miR-145 micelles, miR-67 micelles, scrambled MCP-1 (NT) miR-145 micelles, free miR-145 (1 mg/kg miR or 0.7 mM total micelle), or PBS). Mice continued high fat diet for an additional 4 weeks or 8 weeks for short- and longer-term efficacy analyses. Mice were then euthanized via $CO_2$ asphyxiation and perfused with PBS, 4% paraformaldehyde (PFA), and PBS again. Organs and aorta were carefully dissected and saved for additional analyses.
1.1.3 Analysis of Atherosclerotic Lesions.
Atherosclerotic plaques were analyzed in two ways: 1) en face analysis of entire aorta with Oil Red O (ORO) lipid stain and 2) hematoxylin and eosin (H&E) stains of cross sections of aortic roots. Briefly, aortas were dissected from the root to the common iliac arteries. Excess adventitial fat was carefully removed and the aorta was fixed in 4% PFA overnight. The tissue was then cleaned in 78% methanol for 5 min before staining for 1 h with 0.2% ORO solution in methanol. The aortas were then washed twice with 78% methanol for 5 min each and cut open longitudinally before imaging with a stereomicroscope (Leica, Wetzlar, Germany). Quantification of positively stained lesions was done using ImageJ software (NIH, Bethesda, MD). Aortic roots were embedded in optimal cutting temperature compound (OCT) and flash frozen in 2-methylbutane and liquid nitrogen. Roots were sectioned at 10 μm thick sections and stained using H&E. Plaque and necrotic core area in three aortic root sections were quantified and averaged for each sample to obtain a mean±S.D. measurement.

1.1.4 In Vivo miR-145 Expression.

Aortic roots and liver tissue were obtained from treated mice. Tissues were weighed and lysed with Trizol (Invitrogen, Carlsbad, CA). miRNeasy Mini Kit (Qiagen, Hilden, Germany) was used to extract microRNA and the miScript II RT Kit (Qiagen, Hilden, Germany) was used to synthesize cDNA according to manufacturer's instructions. Real-time qRT-PCR was performed on the LightCycler 480 Real-Time PCR System (Bio-Rad Laboratories, Hercules, CA) to evaluate miR-145 levels. RNU-6 was used as an internal control and the 2-AACT method was used to calculate relative expression changes.

1.1.5 In Vivo Immunohistochemistry.

Aortic roots were cryosectioned as mentioned above. Tissue sections were blocked in 10% donkey serum with 1% BSA. Sections were subsequently stained with antibodies to GFP (Abcam ab6673), α-SMA (Abcam ab5694), CD68 (Abcam ab125212), and RUNX2 (Abcam ab192256) overnight at 4° C. Donkey anti-rabbit IgG Alexa Fluor 594 (Thermo Fisher, Waltham, MA, USA) and donkey anti-goat IgG Alex Fluor 488 (Thermo Fisher, Waltham, MA, USA) were used as secondary antibodies. Sections were counterstained with DAPI for the nuclei, mounted in ProLong Gold Antifade (Thermo Fisher, Waltham, MA, USA), and imaged using a confocal microscope (Nikon C2 CLSM, Nikon, Tokyo, Japan). Cells were then counted using ImageJ software. Current expression of alternative phenotype markers in VSMCs was compared with eYFP expression to determine transdifferentiation or retention of SMC phenotype.

1.1.6 Histological Analysis of Organs.

Heart, lung, liver, spleen, intestine, and kidneys were removed from the euthanized mice. Organs were flash frozen in OCT and cryosectioned at 10 μm thick slices. Tissue sections were stained with H&E, imaged (Leica DMi8, Leica, Wetzlar, Germany), and tissue morphology was analyzed.

1.1.7 Cholesterol Quantification.

Serum cholesterol levels were quantified using a high density lipoprotein (HDL) and low density lipoprotein (LDL) quantification kit (Sigma-Aldrich). Following the manufacturer's protocol, HDL and LDL were separated in serum using precipitation buffer. HDL and LDL samples were subsequently incubated with Reaction Mixes and fluorescence (ex: 535 nm/em: 587 nm) was measured using a plate reader (Varioskan LUX, Thermo Fisher, Waltham, MA, USA).

1.1.8 Statistical Analysis.

Results are stated as means±standard deviation (S.D.). Statistical analyses of the data were performed using a one-way analysis of variance (ANOVA) for more than two groups. A p value<0.05 was considered statistically significant. All statistical analyses were performed using GraphPad Prism 8 (GraphPad Software, San Diego, CA).

1.2 Results and Discussion 1.2.1 Single Dose miR-145 Micelle Effects on Atherosclerosis after One Month Therapeutic evaluation of a single dose of miR-145 micelles after one month miR-145 micelles were synthesized by self-assembling miR-145 amphiphiles, MCP-1 amphiphiles, and DSPE-PEG(2000)-methoxy amphiphiles at a 1:49:50 mole ratio as previously described, to formulate a micelle nanoparticle with optimized particle charge, size, and therapeutic dose for efficient cellular uptake, endosomal escape, and gene regulation [18-19]. miR-145 micelle nanoparticles are approximately 21.7 nm and zeta potential of 15.1 mV [18].

We previously observed sustained miR-145 upregulation in aortic tissue two weeks after a single IV injection of miR-145 micelles in ApoE−/− mice despite a reported elimination half-life of 10.3 h [18], suggesting the possible prolonged effect of miR-145 micelles beyond the initial circulation period similar to siRNA therapies in the market [24-25]. For the treatment of chronic diseases such as atherosclerosis, long-term therapeutic effects of drugs are desirable as they lead to fewer dosages and better disease management in terms of patient compliance. To determine the optimal dosing interval of miR-145 micelles, we assessed the therapeutic effect and miR-145 upregulation one month after injection.

The primary mechanism of action for miR-145 micelles is through inhibition of VSMC transformation into pathogenic phenotypes that form the lipid-rich necrotic core and produce plaque destabilizing calcifications [26]. Typically, assessment of cellular composition in plaques involves immunohistochemical analysis of vascular plaque tissue with conventional VSMC markers such as myocardin and Myosin Heavy Chain 11 (MYH11). However, as VSMCs dedifferentiate, they lose expression of these markers, making it difficult to assess the pathogenic cells in the plaque that have transformed from VSMCs, and subsequently, the effect of miR-145 micelle therapy after disease development [27]. As such, for our studies, we utilize $SMC^{lin}$ mice due to the unique capability to identify VSMCs despite transdifferentiation. When $SMC^{lin}$ mice are intraperitoneally administered tamoxifen, eYFP expression is activated in MYH11-expressing cells. Despite transdifferentiation, newly differentiated osteochondrogenic-like and macrophage-like cells will continue to express eYFP, allowing for the tracing of pathogenic cells to SMC origin. This allows the quantification and verification of miR-145 micelle gene regulatory effects on VSMC phenotype throughout disease progression [23, 27].

Figure 2F:
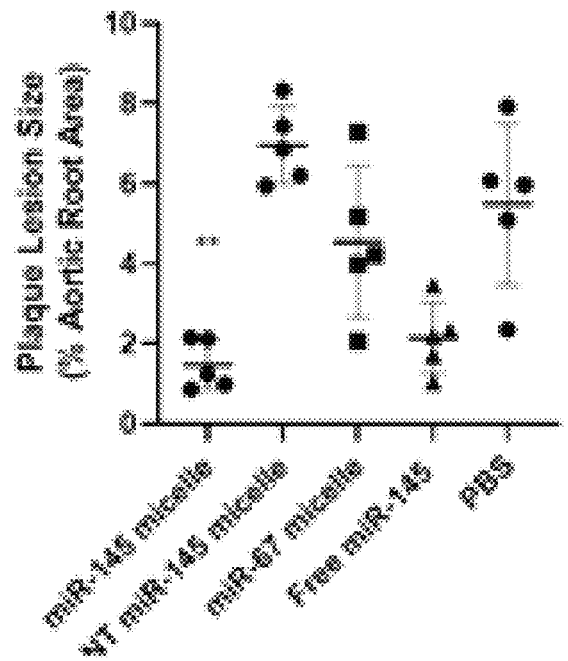
Figure 2G:
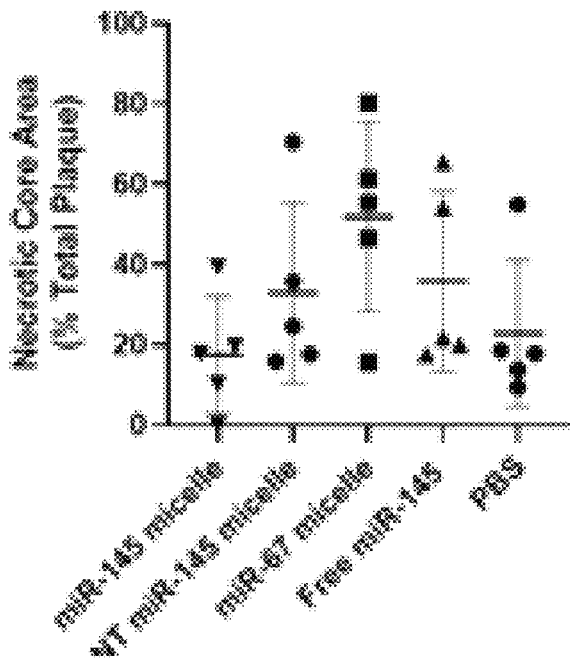
Figure 2H:
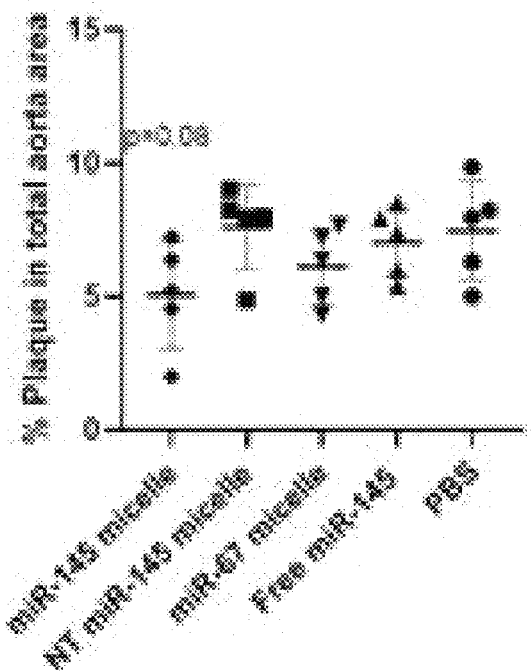
Figure 2I:
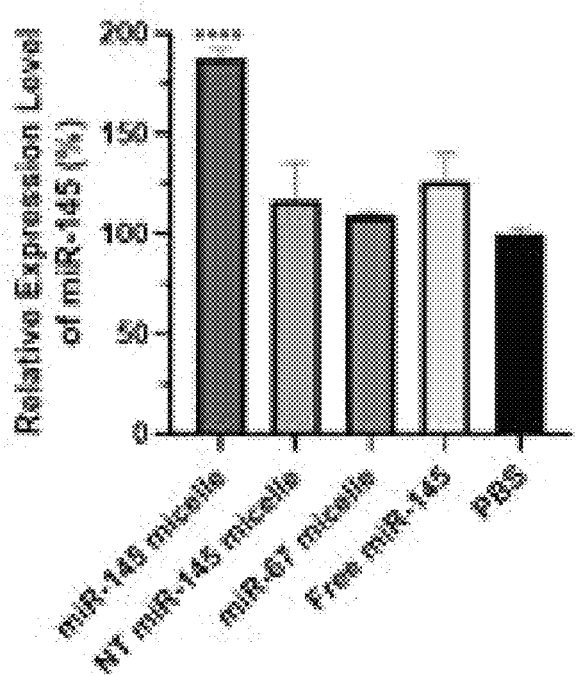

Briefly, mice were given a high fat diet for two weeks to induce a state of developing atherosclerosis and treated with miR-145 micelles, non-targeting scrambled MCP-1 miR-145 (NT miR-145 micelles), MCP-1 micelles with non-therapeutic miR-67 (miR-67 micelles) or free miR-145 at 1 mg/kg miR, or PBS [18]. Dose concentration was selected based on efficacy of previous therapeutic studies [18, 28]. Subsequently, mice were fed a high fat diet to continue atherosclerosis development. After one month, miR-145 micelle-treated mice had the smallest plaque area in the aortic root compared to all other treatments (miR-145 micelle: 1.5±0.6%, NT miR-145 micelle: 7.0±1.0%, miR-67 micelle: 4.6±1.9%, free miR-145: 2.1±0.9%, PBS: 5.5±2.0%, p<0.01 for miR-145 micelle compared to PBS, FIGS. 2 A and B). Additionally, necrotic core area for plaques were analyzed to investigate the stability of plaques with different treatment [29-31]. Although the necrotic core area was smaller upon miR-145 micelle treatment, the differences in area were not statistically significant (FIG. 2C).

Additionally, the overall lesion area of the aortas, from the aortic root to the iliac arteries, were quantified using ORO en face stain. While miR-145 micelle resulted in smaller total lesion area compared to other treatments, no statistically significant differences were found at this time point (miR-145 micelle: 5.1±2.0%, NT miR-145 micelle: 7.6±1.6%, miR-67 micelle: 6.1±1.4%, free miR-145: 7.0±1.3%, PBS: 7.5±1.0%, p=0.08 for miR-145 micelles compared to PBS) (FIG. 2D). Furthermore, miR-145 expression in the aortic root was analyzed via RT-qPCR. Notably, at one month post treatment, miR-145 micelle treatment sustained elevated levels of miR-145 expression in the aortic root by almost 1.8-fold (p<0.001 compared to PBS). This increase in miR-145 is comparable to the expression level at two weeks post treatment from our previous studies which was also approximately 1.8-fold greater than non-treatment controls [18]. Due to the elevation in miR-145 and its effects on VSMC phenotype, cellular compositions of atherosclerotic lesions were further evaluated.

Figure 3A:
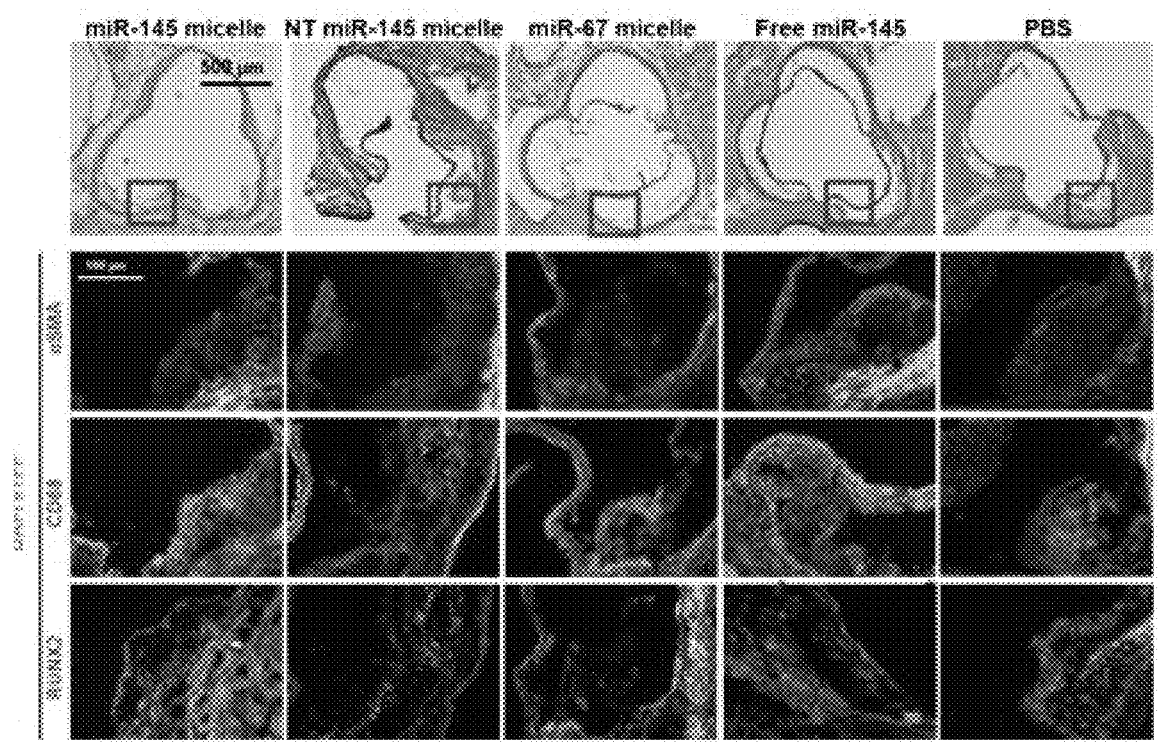
FIGS. 3A, 3B, 3C, 3D, 3E, 3F, and 3G. Cellular composition of early-stage atherosclerotic plaque one month after treatment with a single dose of miR-145 micelles. (A) Immunohistochemistry of aortic root plaques for eYFP (green), α-SMA, CD68, RUNX2 (red), and nuclei (blue). Red boxes on H&E images indicate zoomed in areas of aortic root (bottom). Quantification of cells expressing (B) α-SMA+/DAPI, (C) α-SMA+YFP+/YFP+, (D) CD68+/DAPI, (E) CD68+YFP+/YFP+, (F) RUNX2+/DAPI, and (G) RUNX2+YFP+/YFP+. VSMC marker expression with respect to YFP is used to analyze all VSMC-originating cells. * indicates $p<0.05$, ** indicates $p<0.01$.

Cellular Composition of Atherosclerotic Plaques One Month after Single Dose Micelle Treatment Previous studies have shown that up to 70% of cells in atherosclerotic plaques are derived from SMCs that have transdifferentiated into macrophage-like cells, foam cells, and osteogenic cells [32, 23, 26, 32]. Our previous reports on miR-145 micelles investigated the effect of miR-145 micelles on VSMC phenotype and plaque size two weeks after a single dose treatment [18]. The results suggested possible longer-term effects of miR-145 micelles, encouraging efficacy studies at longer time points and changes in plaque VSMC phenotype throughout disease progression. To comprehensively investigate the effect of miR-145 micelle therapy on VSMC sub-phenotypes, aortic roots of treated $SMC^{lin}$ mice were sectioned and stained for different VSMC phenotypes: α-smooth muscle actin (α-SMA, contractile VSMC), CD68 (macrophage-like cells), and RUNX2 (osteogenic cells, FIG. 3A).

Figure 3B:
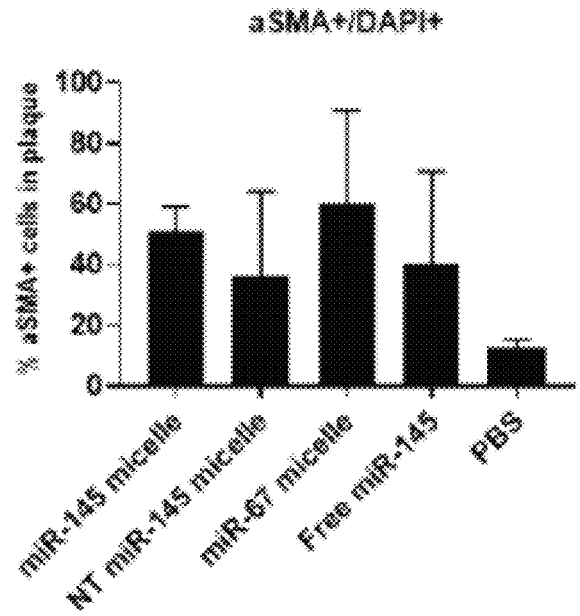
Figure 3C:
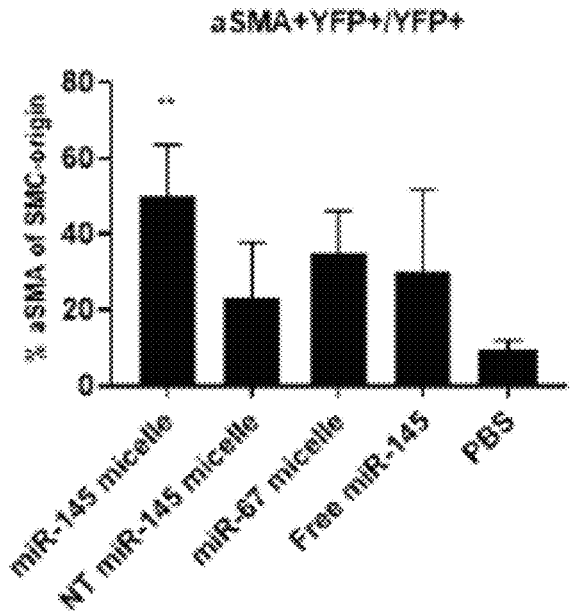

As shown in FIG. 3, PBS treatment resulted in the lowest α-SMA expression within plaques compared to miR-145 micelle treatment and treatment controls (miR-145 micelle: 50.6±8.4%, NT miR-145 micelle: 36.5±27.7%, miR-67 micelle: 60.3±30.5%, free miR-145: 40.1±30.7%, PBS: 12.7±2.5%, FIG. 3B) demonstrating that the majority of VSMCs in the plaque have dedifferentiated from contractile VSMCs. In contrast, miR-145 micelle treatment showed the greatest overlap in eYFP and α-SMA signal (50.3±13.3%, p<0.01, FIG. 3C) compared to other treatments (NT miR-145 micelle: 23.3±14.4%, miR-67 micelle: 34.9±11.2%, free miR-145: 30.0±22.1%, PBS: 9.3±2.7%), suggesting that miR-145 micelles preserve contractile VSMC phenotype and prevent the adoption of alternative phenotypes by VSMCs in plaques for up to a month after a single dose treatment [18].

Figure 3D:
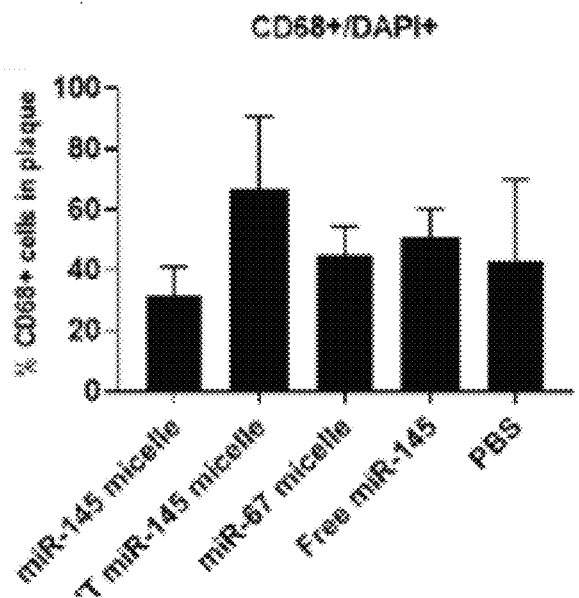
Figure 3E:
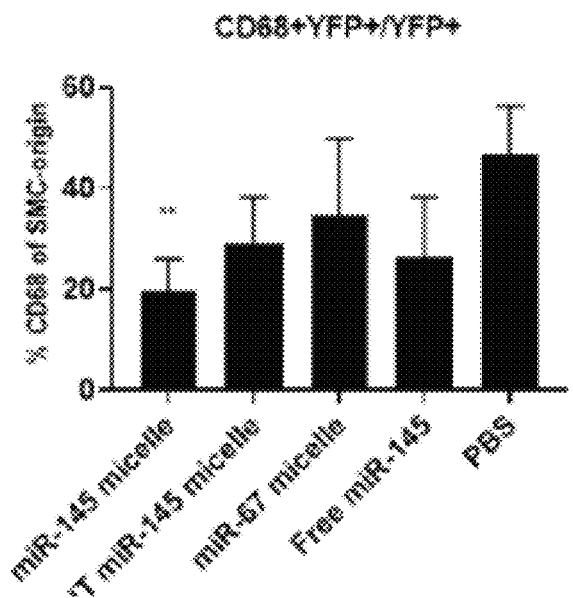
Figures 3F, 3G:
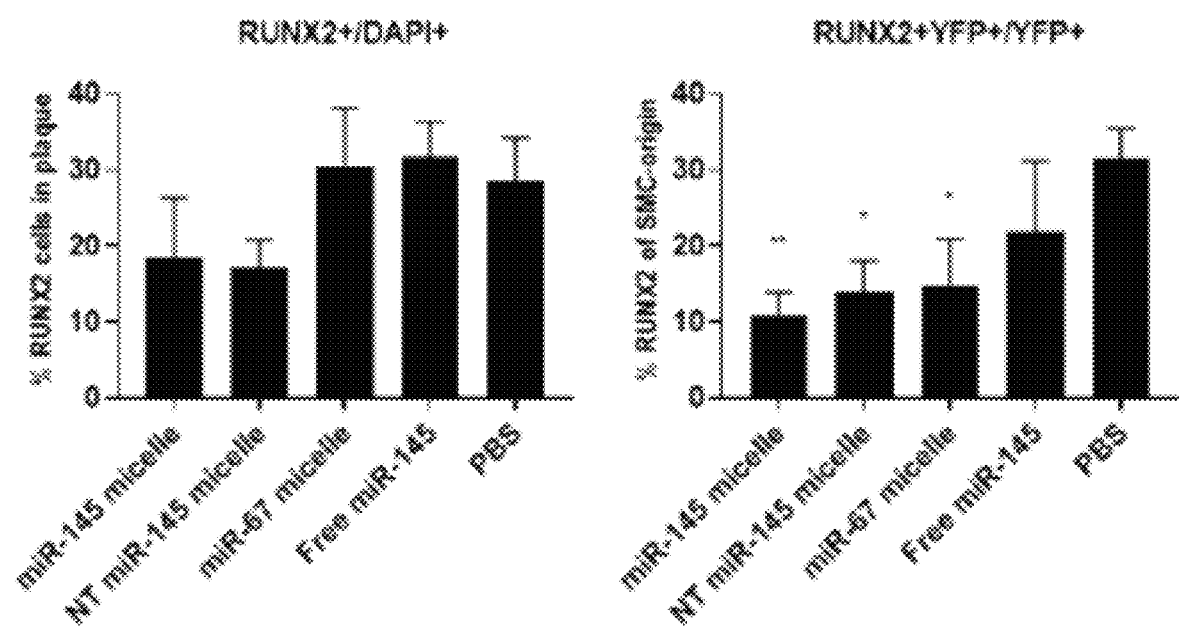

Furthermore, overall percentages of CD68+ (31.5±0.9%) and RUNX2+ cells (18.4±0.8%) were decreased with miR-145 micelle treatment indicating that there were lower numbers of pathogenic, macrophage-like and osteogenic cells in the plaques (FIGS. 3D and 3F). The inhibitory effect of miR-145 micelles on VSMC dedifferentiation is further validated by the lower percentage of CD68+YFP+ (19.7±0.6%) and RUNX2+YFP+ cells (10.8±0.3%) in the plaque with miR-145 micelle treatment compared to controls (PBS: 46.6±9.8% and 31.3±4%, respectively, FIGS. 3E and 3G). Collectively, miR-145 micelles help VSMCs maintain their contractile SMC phenotype in plaques and reduce the overall presence of macrophage-like and osteogenic cells at one month post single IV injection. Interestingly, despite the dynamic progression of lesion development with the continued high fat diet post treatment, lesion size remained small and cellular composition was largely skewed towards the contractile VSMC phenotype. The significant inhibition of plaque growth as seen in the smaller lesion sizes of miR-145 micelle-treated mice as well as the elevated miR-145 expression at the one-month time point suggest the possible longer duration of action of miR-145 micelles than previously suspected, prompting our next studies regarding the evaluation of efficacy at longer time points, still with one dose. Furthermore, as our previous studies show that miR-145 micelles and similar micelle nanoparticle constructs are eliminated within 10 hours to 7 days, the extended therapeutic effect of miR-145 micelles is suggested to come from stability of miR-145 within cells and the maintenance of contractile, healthy VSMC phenotype [18, 21]. For example, other miRs, such as miR-208 in rat hearts, has been shown to persist for weeks despite cessation of miR production, and in other cases, transfected miRs within fibroblasts have been found to have half-lives exceeding 100 h [33-36]. These studies demonstrate the variability in miR degradation and turnover rates as well as a gap in knowledge of the specific pathways for miR degradation [33]. As such, despite a circulation half-life of ~10 h, the cellular half-life of miR-145 delivered by micelles may be much longer, instilling the prolonged therapeutic effect. Overall, this highlights the potential of miR-145 micelles as a preventative treatment for atherosclerosis and warrants future investigation into possible feedback mechanisms and cellular crosstalk that minimizes plaque growth [37-39].

Figure 4F:
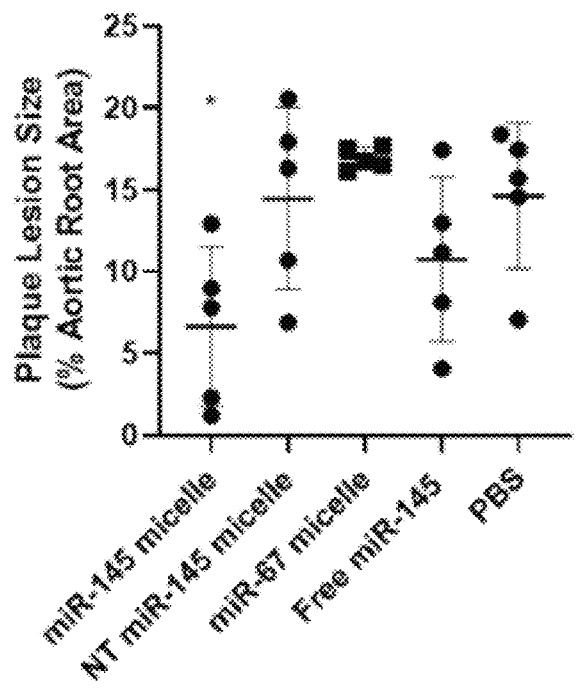
Figure 4G:
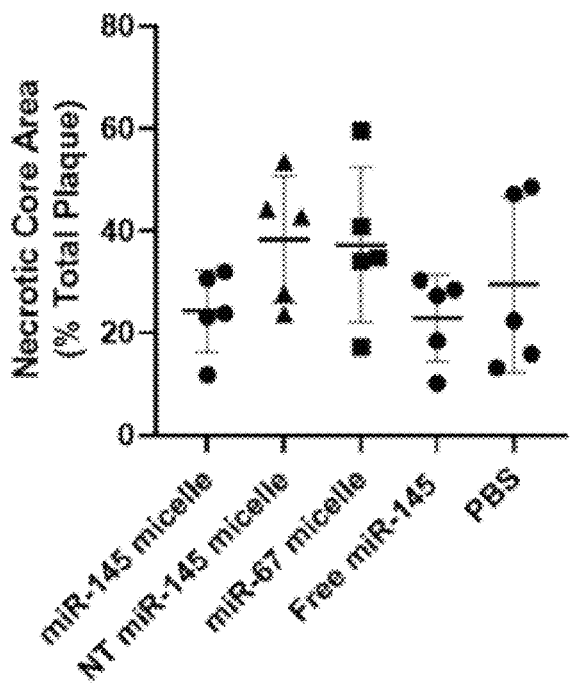
Figure 4H:
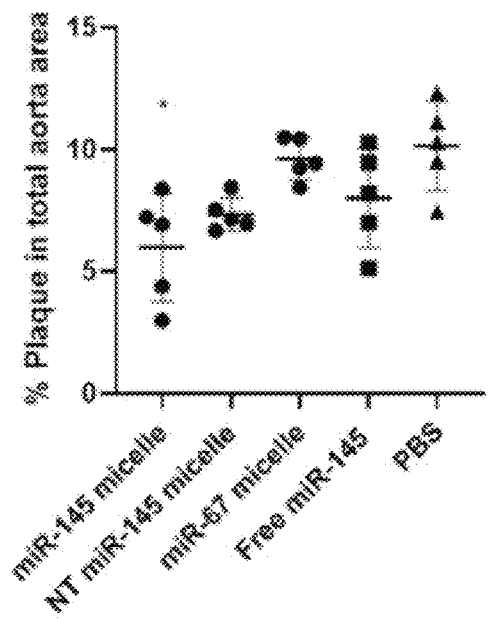
Figure 4I:
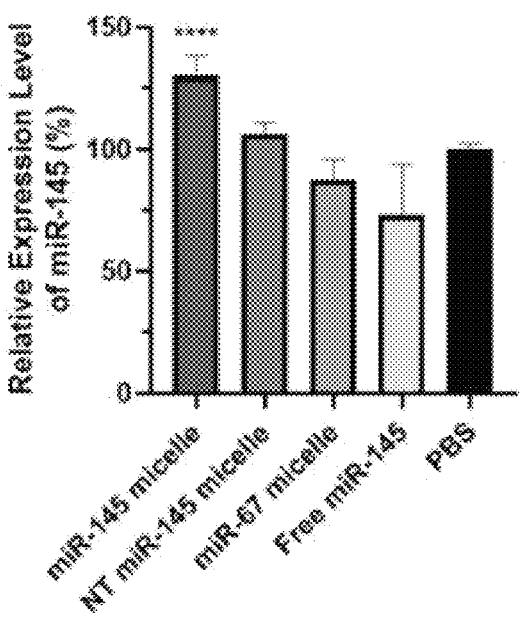

1.2.2 Single Dose miR-145 Micelle Effects on Atherosclerosis after Two Months 1.2.2.1 Therapeutic Evaluation of a Single Dose of miR-145 Micelles after Two Months Encouraged by the results from the one-month time point, we further investigated the longer therapeutic effects of miR-145 micelles by analyzing plaque sizes in mice two months after single dose treatment to determine extended dosing regimen to manage chronic disease. In the context of atherosclerosis therapies, common hyperlipidemia drugs are prescribed as daily medications, such as atorvastatin, or for the recently FDA approved siRNA drug, inclisiran, every 3-6 months [40-41]. As a comparison, even after two months post-administration of a single dose of miR-145 micelles, smaller plaques and reduced lesional area were found with miR-145 micelle treatment compared to other treatment groups (miR-145 micelle: 6.7±4.8%, NT miR-145 micelle: 14.5±5.6%, miR-67 micelle: 16.9±0.7%, free miR-145: 10.8±5.0%, PBS: 14.6±4.5%, p<0.05 compared to PBS, FIG. 4A, B), which was confirmed by en face ORO staining (miR-145 micelle: 6.0±2.2%, NT miR-145 micelle: 7.3±0.7%, miR-67 micelle: 9.6±0.9%, free miR-145: 8.0±2.0%, PBS: 10.2±1.8%, p<0.05 compared to PBS, FIG. 4D). No distinct trends were seen for necrotic core area based on treatment groups, although the necrotic core areas were generally smaller in this later time point than in the earlier time point regardless of treatment (1-month: 32.1±22.3% vs 2-months: 30.4±13.3%). Stabilization of necrotic cores are a reflection of the general progression of atherosclerosis and development of plaques regardless of treatment [29]. As early lesions transition into advanced plaques, necrotic cores can be overcome with fibrosis and calcification, resulting in smaller necrotic core area within plaques [41].

Interestingly, when miR-145 expression in the aortic root was analyzed, miR-145 micelle treatment maintained a 1.3-fold increase in miR-145 expression compared to PBS treatment. We previously showed that miR-145 micelles have an elimination half-life of 10.3 hours and similar micelle nanoparticles are 90% cleared 7 days after injection [18, 21]. As such, although it is unlikely that miR-145 micelles remain in circulation, it is possible that miR-145 micelles are retained in the vessels and within VSMCs due to their plaque-targeting capabilities seen in earlier studies [18]. Specifically, studies have shown that endothelial cells and contractile VSMCs naturally release miR-145-containing exosomes that can reinforce the upregulation of miR-145 [42]. Thus, we hypothesize that early treatment of atherosclerosis with miR-145 micelles helps maintain vascular homeostasis resulting in healthy endothelial cells which in turn promote contractile VSMC phenotype via miR-145 exosome signaling [39, 43]. However, additional studies will be needed to further investigate the feedback mechanism of cell-cell cross talk within vessel walls. Nonetheless, miR-145 micelles show prolonged effects in significantly stalling atherosclerosis progression and minimizing lesion size of aortic plaques.

Figure 5A:
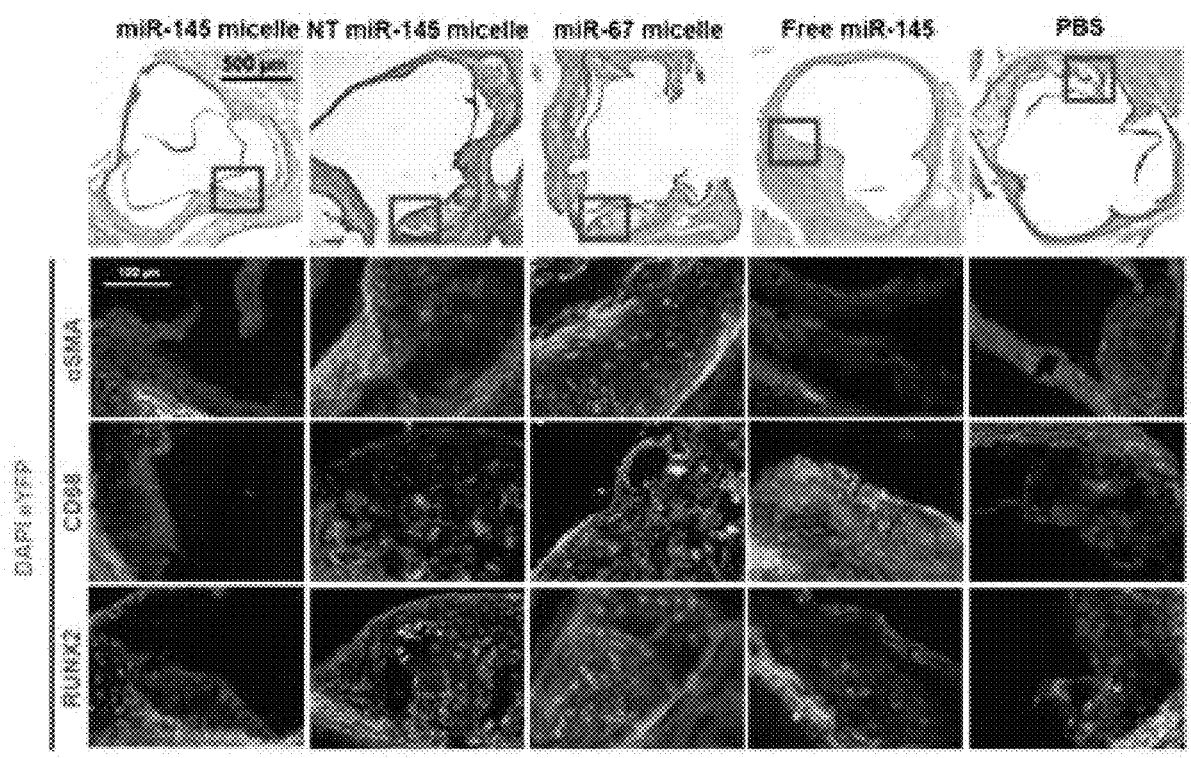
FIGS. 5A, 5B, 5C, 5D, and 5E. Cellular composition of early-stage atherosclerotic plaque two months after treatment with a single dose of miR-145 micelles. (A) Immunohistochemistry of aortic root plaques for eYFP (green), α-SMA, CD68, RUNX2 (red), and nuclei (blue). Red boxes on H&E images indicate zoomed in areas of the aortic root (bottom). Quantification of cells expressing (B) α-SMA+/DAPI, (C) α-SMA+YFP+/YFP+, (D) CD68+/DAPI, (E) CD68+YFP+/YFP+, (F) RUNX2+/DAPI, and (G) RUNX2+YFP+/YFP+. * indicates $p<0.05$,  $p<0.01$, * $p<0.001$.
Figure 5B:
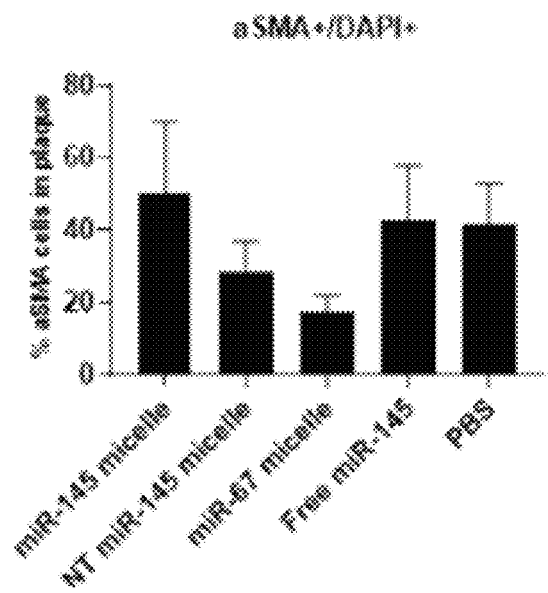
Figure 5C:
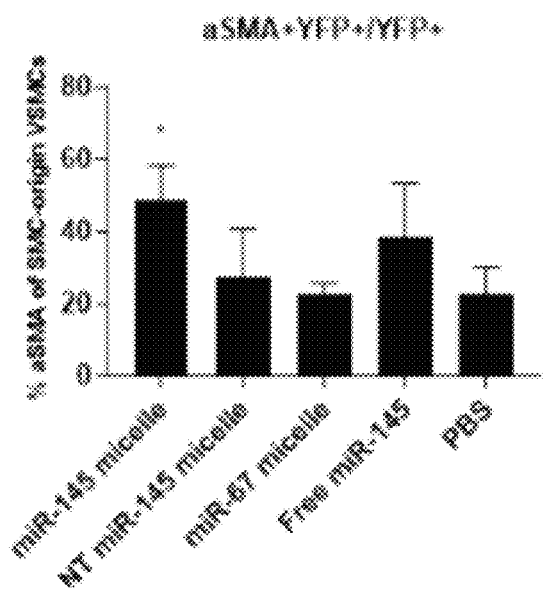
Figure 5D:
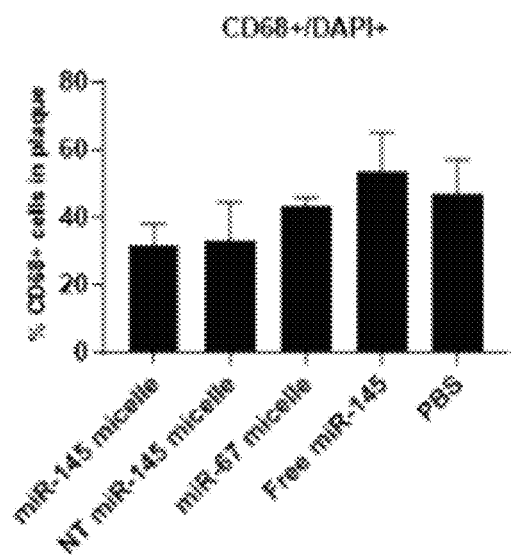
Figure 5E:
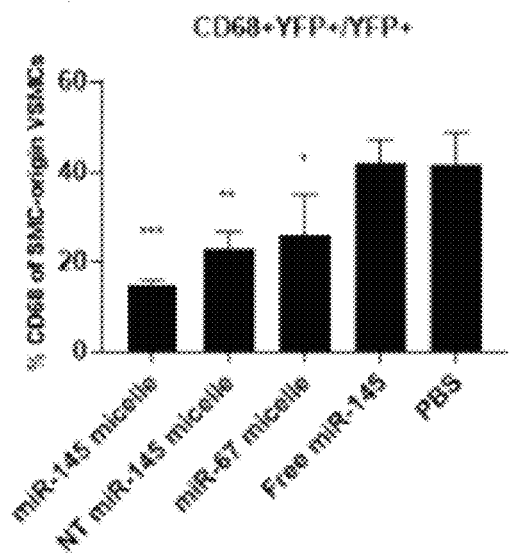

1.2.2.2 Cellular Composition of Atherosclerotic Plaques Two Months after Single Dose Micelle Treatment Similar to the one-month post treatment evaluation, cellular composition analyses were conducted to measure the effect of miR-145 micelles in VSMC phenotypic modulation two months after treatment. As such, the aortic roots were sectioned and stained for α-SMA, CD68, RUNX2, and eYFP (FIG. 5A). Notably, the overall trends at this longer time point were similar to the one month time point: miR-145 micelle treatment showed slightly larger proportion of α-SMA+ cells (miR-145 micelles: $50.0\pm20.1\%$ vs PBS: $41.5\pm11.3\%$) and smaller proportion of CD68+(miR-145 micelles: $32.6\pm6.9\%$ vs PBS: $46.8\pm10.5\%$) and RUNX2+ cells (miR-145 micelles: $17.1\pm2.1\%$ vs PBS: $36.6\pm21.5\%$) in plaques compared to PBS control, although not statistically significant. However, there were notable differences in the ratios of α-SMA+YFP+, CD68+YFP+, and RUNX2+YFP+ cells among SMC-originating (YFP+) cells, or the ratio of transformed VSMCs within plaques. miR-145 micelle treatment showed the highest ratio of α-SMA+YFP+ cells ($48.8\pm0.9\%$), lowest ratio of CD68+YFP+($14.5\pm1.4\%$) and RUNX2+YFP+ cells ($12.5\pm3.4\%$) compared to other treatment controls and PBS ($22.5\pm7.8\%$, $p<0.05$; $41.7\pm6.9\%$, $p<0.001$; and $36.8\pm12.0\%$, $p<0.05$, respectively). Thus, miR-145 micelle treatment shows maintenance of contractile VSMC phenotype in SMC-originating cells, and inhibition of transdifferentiation into macrophage-like and osteogenic-like cells. We hypothesize that the early treatment with miR-145 micelles may be inhibiting VSMC dedifferentiation and subsequently slowing disease development as studies have shown that VSMCs play a large role in early lesion formation through migration into the intima and proliferation, or expansion of lesional area [44]. As such, the results strongly suggest the long-term therapeutic effects of miR-145 micelles, beyond the two-month interval from treatment and assessment. However, additional studies exploring different dosages throughout disease development is needed to further validate this hypothesis. Collectively, these results indicate that miR-145 micelles help maintain SMC phenotype in SMC-derived cells and minimizes transdifferentiation into macrophage-like and osteogenic cells up to two months post treatment.

1.2.3 Effects of miR-145 Micelles on Liver and Cholesterol

Figure 6A:
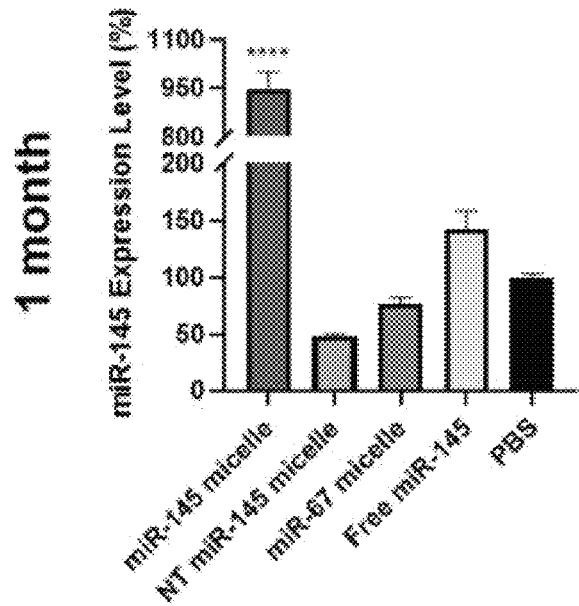
FIGS. 6A, 6B, 6C, 6D, 6E, and 6F. Liver and cholesterol effects of miR-145 micelles. (A, D) miR-145 expression in the liver tissue was determined via RT-qPCR for one month and two months post-treatment. Serum (B, E) HDL and (C, F) LDL levels in treated mice. * indicates $p<0.05$,  $p<0.01$, * $p<0.001$, **** $p<0.0001$.

Similar to the majority of nanoparticles and drug delivery systems that have been developed, our previous studies analyzing biodistribution of miR-145 micelles showed that miR-145 micelles are primarily eliminated through the liver [18, 45]. Thus, to analyze possible off-target effects of miR-145 micelles on liver tissue, we looked at miR-145 expression in the liver after micelle treatment. As expected, miR-145 expression levels were higher in the liver with miR-145 micelle treatment for both one month (9.5-fold increase compared to PBS) and two months (1.4-fold increase compared to PBS) post treatment (FIGS. 6A and D). At the one-month timepoint, a 1.5-fold increase in liver miR-145 was also observed with free miR-145 treatment, but not with NT miR-145 micelles. However, histological analyses of peripheral organ tissues with H&E stains show no significant differences in tissue morphology between different treatment groups. This suggests that there are minimal toxic off-target effects that lead to damaging of peripheral organs rising from miR-145 micelle treatment.

Additionally, due to the increase of miR-145 in the liver, we analyzed the effects of miR-145 on cholesterol production and the reverse cholesterol transport system as an alternative mechanism for lipid and necrotic core reduction in plaques. While there were no significant differences in serum HDL and LDL levels at one month post injection and LDL levels at two months post injection, miR-145 micelle treatment showed a significant upregulation of HDL at two months (FIG. 5). Both miR-145 micelles and free miR-145 resulted in increases of HDL levels at two months. It is possible that the miR-145 is increasing macrophage cholesterol efflux, via ERK1/2 inhibition, subsequently leading to increase nascent HDL generation [46-47]. Clinically, low levels of HDL have been associated with increased cardiovascular risk and have been used as a prognosis for poor outcome [48]. HDL is involved in the reverse cholesterol transport system, responsible for removing excess cholesterol from tissues and vessel walls through the liver. Thus, the increase in HDL from miR-145 micelle treatment may be an added anti-atherogenic effect [49-53]. However, additional studies are needed to determine the effects of miR-145 micelles on HDL biogenesis, function, circulation, and catabolism. Importantly, there were no elevations in LDL levels with miR-145 micelle therapy. The effects of miR-145 micelles on HDL formulation without elevation of LDL is an interesting phenomenon that will be explored more closely in future studies.

1.3 Conclusions

In summary, we demonstrate that miR-145 micelles show strong potential as a therapy for atherosclerosis. miR-145 micelles showed long-term efficacy with anti-atherogenic effects lasting up to two months post single dose treatment. Specifically, miR-145 micelles maintain healthy VSMC phenotype and inhibit transition of VSMCs into alternative pathogenic cells such as macrophage-like and osteogenic cells. Furthermore, we show that miR-145 micelles may play a role in reverse cholesterol transport through the elevation of HDL. Collectively, miR-145 micelles are advantageous due to their biocompatibility reported here and previously, as well as small size that allows for efficient uptake in plaques and VSMCs, and finally, protective properties that preserve the miR-145 cargo to elicit a long therapeutic response. Overall, miR-145 micelles can be a viable therapy for chronic, asymptomatic diseases such as atherosclerosis.

2. Additional Experiments
2.1 miR-145 Micelles+Statin Combination
Methods: hASMCs were activated with cholesterol loading for 72 hours. Cells were subsequently treated with PBS, 250 nM simvastatin for 24 hours, miR-145 micelles (25 uM) for 4 hours, or 24 hours of simvastatin followed by miR-145 micelle treatment. miR-145, contractile, synthetic, and inflammatory mRNA expression was measured with qRT-PCR.

Figure 6B:
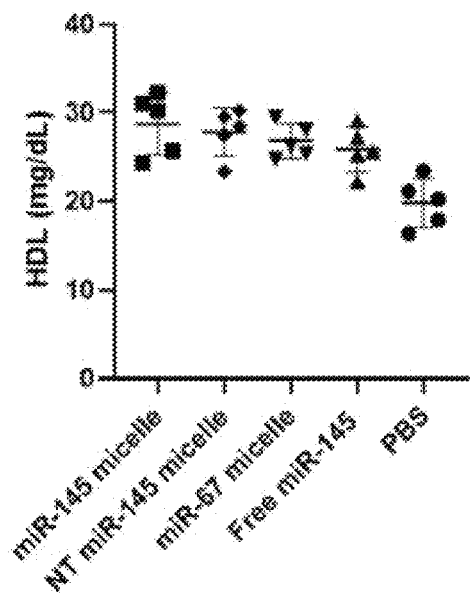
Figure 6C:
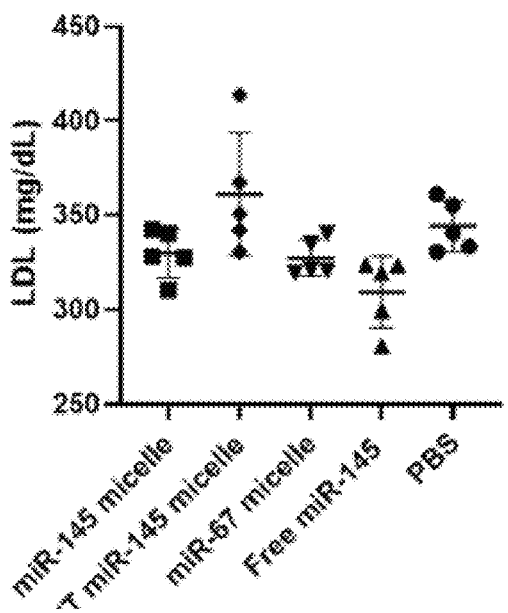
Figure 6D:
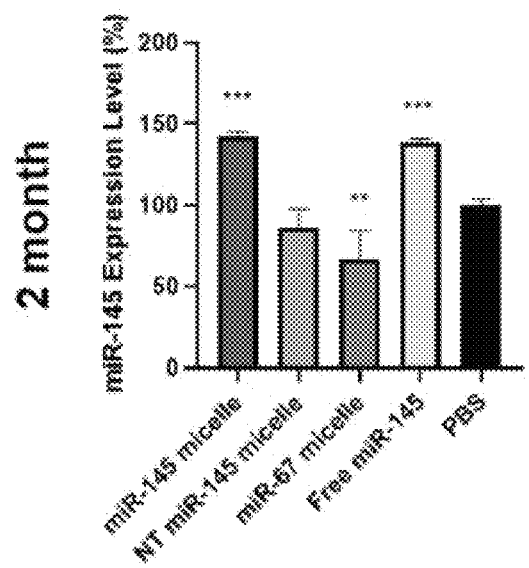
Figure 6E:
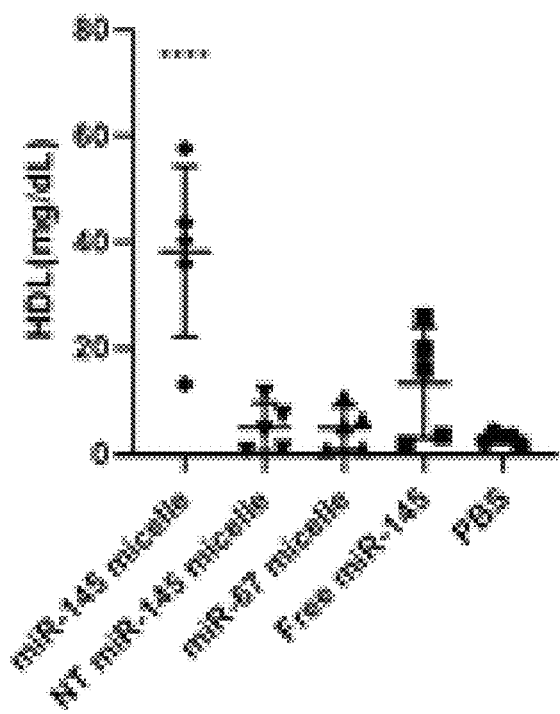
Figure 6F:
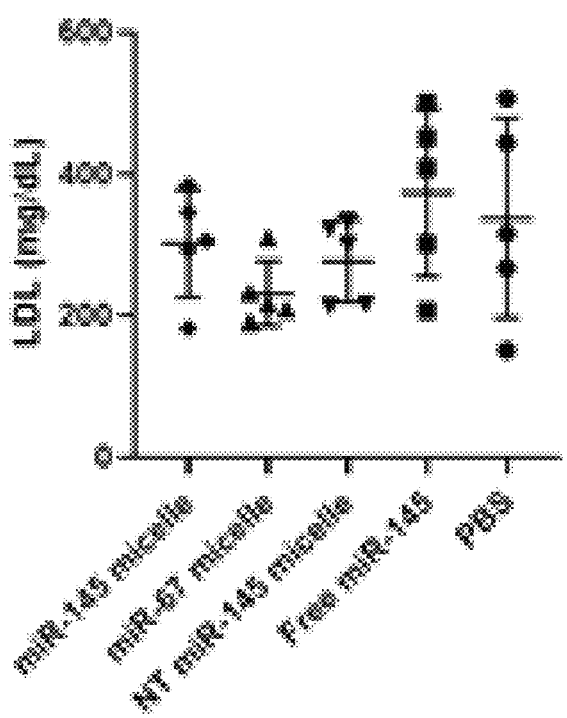

As shown in FIGS. 6A and 6B, miR-145 expression is highest with dual statin and miR-145 micelle treatment. miR-145 micelle treatment shows the greatest aSMA expression and the least KLF-4 and ELK-1 expression. Statin and miR-145 micelles reduce IL-1B and TNF-a to similar levels.

FIG. 6A provides miR-145 expression levels of cholesterol loaded hASMCs treated with statin (250 nM) for 24 hours and/or miR-145 micelles (25 uM) for 4 hours (N=3). FIG. 6B provides Contractile, synthetic, and inflammatory marker expression levels in cholesterol loaded hASMCs treated with statin (250 nM) for 24 hours and/or miR-145 micelles (25 uM) for 4 hours (N=3). Significance was analyzed compared to PBS (=p<0.01, **=p<0.0001).

2.2 miR-145 Micelles on Patient-Derived Atherosclerotic Smooth Muscle Cells
Methods: Patient derived SMCs from healthy (none), mildly diseased (mild), moderately diseased (moderate), and severely diseased (severe) were loaded with fluorescently-labeled cholesterol overnight. Cells were then treated with miR-145 micelles (25 uM) or PBS to measure the effects of miR-145 micelles on cholesterol efflux out of cells. Patient SMCs derived from diseased human tissue were grown to full confluency, treated with different micelles (25 uM) and controls for 4 hours (free miR-145 (250 nM), MCP-1 (12.5 uM)), and subjected to a scratch or a wound to test the migration of diseased SMCs. Cells that migrated into the wound region were counted as migratory cells. Migration was measured after 24 hours.

Figure 7A:
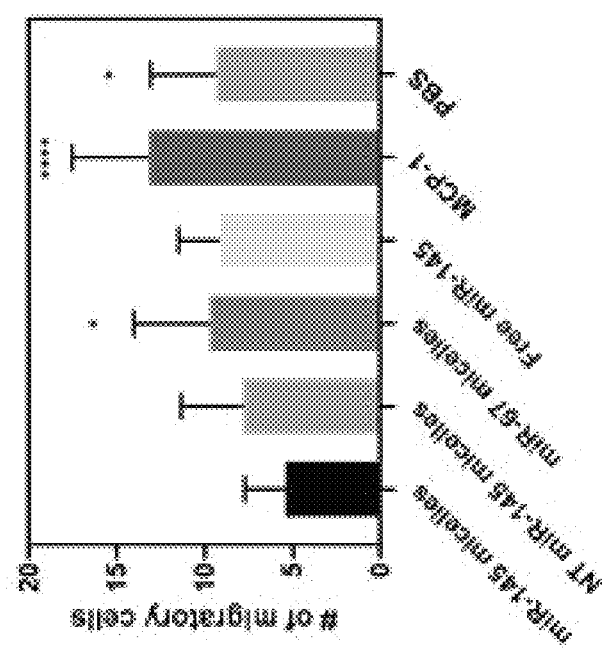
FIGS. 7A, 7B, and 7C. A) Cholesterol efflux in miR-145 micelle (25 uM) or PBS-treated patient SMCs over 5 hours. B) Cholesterol efflux in miR-145 micelle (25 uM) or PBS treated patient SMCs over 5 hours based on disease severity of tissue from which cells were isolated. C) Diseased patient hSMC migration after treatment with miR-145 micelles (25 uM). (*=$p<0.05$, =$p<0.01$, **=$p<0.0001$).
Figure 7B:
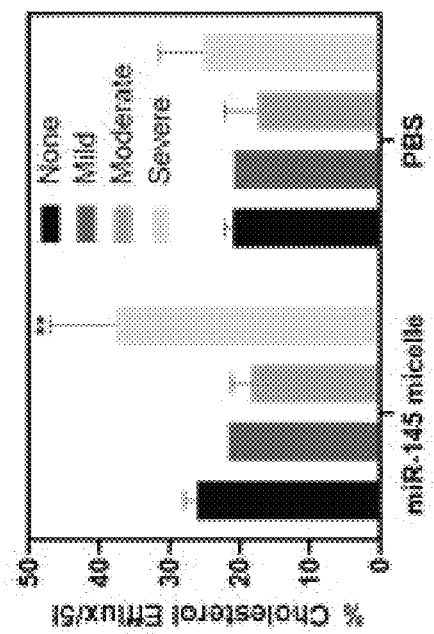
Figure 7C:
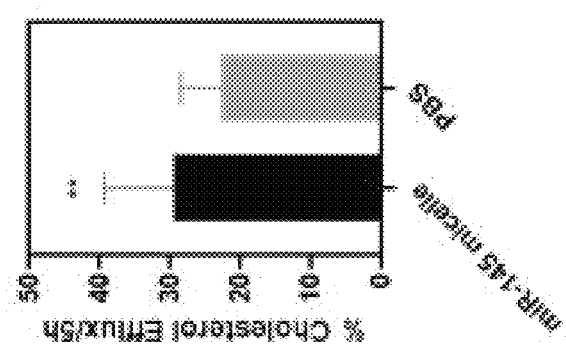

FIG. 7A provides cholesterol efflux in miR-145 micelle (25 uM) or PBS treated patient SMCs over 5 hours. FIG. 7B provides cholesterol efflux in miR-145 micelle (25 uM) or PBS treated patient SMCs over 5 hours based on disease severity of tissue from which cells were isolated FIG. 7C show diseased patient hSMC migration after treatment with miR-145 micelles (25 uM). (*=p<0.05, =p<0.01, **=p<0.0001).

FIG. 8A provides baseline expression of miR-145 in diseased or healthy patient cells from 8 patient samples (N=4 per group). FIG. 8B shows the change in miR-145 expression after treatment of diseased or healthy patient cells with miR-145 micelles (25 uM, 4 h treatment). FIG. 8C shows the change in expression of synthetic and contractile phenotypic markers in diseased and healthy patient cells after miR-145 micelle treatment when compared to baseline levels. FIG. 8D shows the change in in expression level of miR-145 after miR-145 micelles treatment of cells from patients that have or have not used statin. Values are relative compared to baseline expression levels. FIG. 8D shows differences in change in relative expression level of miR-145 after miR-145 micelles treatment of patient cells.

2.3 miR-145 Micelle Effects on Smooth Muscle Cells from Atherosclerotic Mice
2.3.1 MYH11 Primary Cells In Vitro
Methods: Primary SMCs were isolated from Myh11-CreERT2 ROSA floxed STOP eYFP Apoe-/- mice. Briefly, mice were euthanized and aortas were dissected. After brief incubation in an enzyme solution (1 mg/ml collagenase, 0.744 units/ml elastase in Hank's Balanced Salt Solution), the adventitia and endothelium were removed. Media layer of arterial tissue was further incubated in enzyme solution to completely break down the tissue. Cells were collected and seeded in 10% FBS, 1% P/S, DMEM.

Cells were treated in vitro with 4-hydroxytamoxifen (1 ng/ml) in media for 24 hours to mimic in vivo studies and then treated with miR-145 micelles (25 uM) and controls (free miR-145, 250 nM) for 4 hours. Cells were then collected at days 1, 3, 5, and 7 after treatment and RNA isolated for qRT-PCR.

FIG. 9A provides expression level of miR-145 in primary MYH11 SMCs after in vitro tamoxifen and initial treatment. FIG. 9B shows synthetic and contractile phenotypic markers in primary MYH11 SMCs after in vitro tamoxifen and treatment.

2.4 miR-145 Micelle Effects on Atherosclerotic Mice
2.4.1 MYH11 Mice In Vivo, 1 Month
Methods: Myh11-CreERT2 ROSA floxed STOP eYFP Apoe$^{-/-}$ mice were IP injected with tamoxifen (1 mg/day for 10 days) to induce YFP expression in MYH11 expressing cells. Mice were then started on a HFD for 2 weeks and treated with PBS, miR-145 micelle (1 mg miR/kg), or miR-67 micelle (1 mg miR/kg) via IV tail vein. Mice continued HFD for 4 more weeks and were euthanized. Aortas were collected, sectioned, and stained for aSMA (red) and DAPI (blue). Single cells were counted in the stained plaques to quantify the heterogeneous cell composition of plaques.

Figures 10A, 10B, 10C:
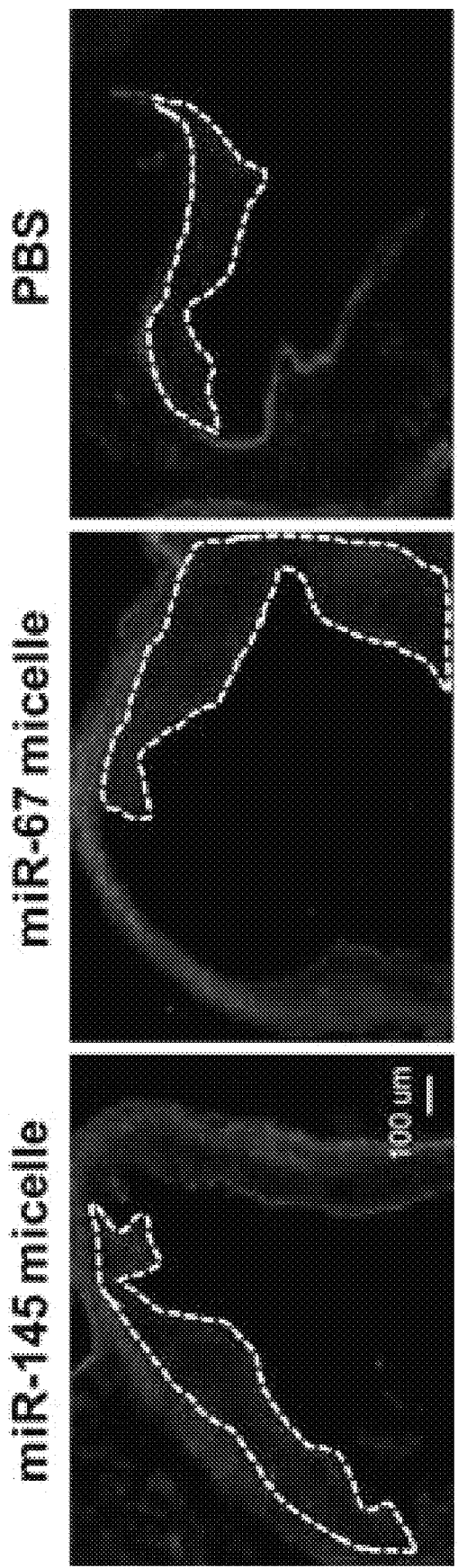
FIGS. 10A, 10B, and 10C. Aortic roots of Myh11 mice were sectioned and stained for aSMA (red) expression in the plaques (white dash line). miR-145 micelles show the most aSMA expression in the plaques, indicating the majority of cells in plaques are non-synthetic SMCs.

FIG. 10 shows aortic roots of Myh11 mice were sectioned and stained for aSMA (red) expression in the plaques (white dash line). miR-145 micelles show the most aSMA expression in the plaques, indicating the majority of cells in plaques are non-synthetic SMCs.

Figure 11:
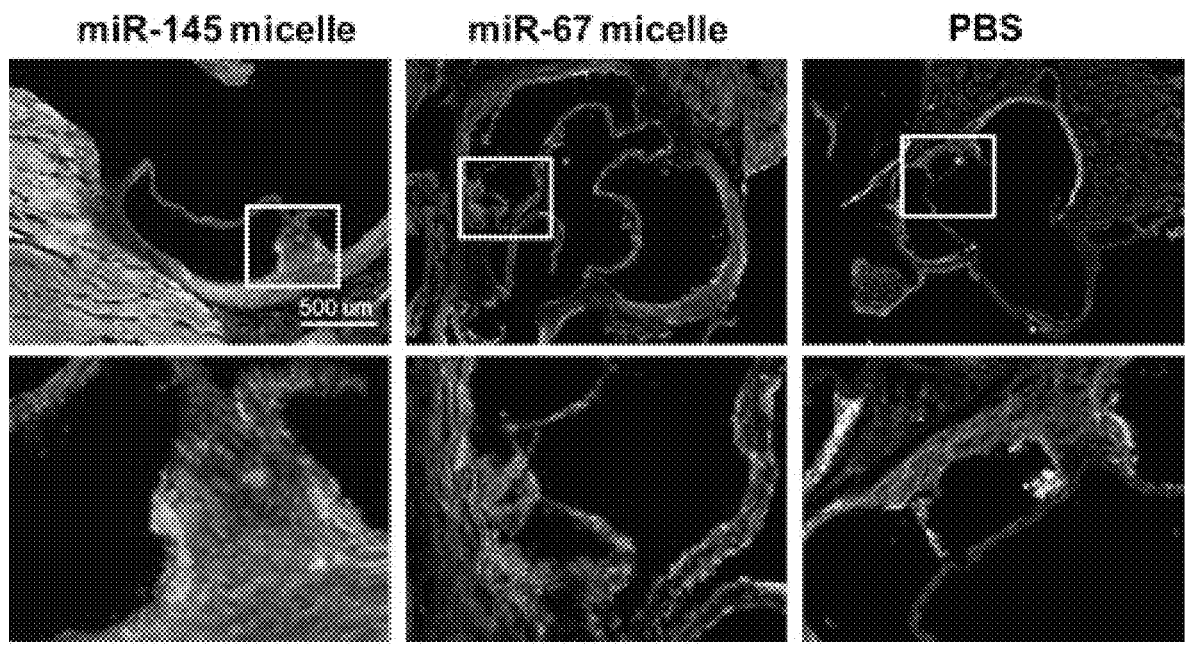
FIG. 11. Aortic roots were also stained for CD68 (red), YFP (green), and DAPI (blue). Plaques (white dash line) in miR-67 micelle treated mice show the most CD68 expression indicating the most inflammation. Bottom row is a magnification of the white boxes in the top row FIGS. 12A, 12B, 12C, and 12D. A) En face oil red O stain of aortas indicated NT miR-145 micelle treated mice have more overall plaque propagation compared to miR-145 micelle treated mice. B) Quantification of the number of cells in plaques, C) proportion of YFP+ cells, and D) proportion of CD68+YFP+ cells in plaque.

FIG. 11A shows aortic roots were also stained for CD68 (red), YFP (green), and DAPI (blue). Plaques (white dash line) in miR-67 micelle treated mice show the most CD68 expression indicating the most inflammation. Bottom row is a magnification of the white boxes in the top row.

Figures 12A, 12B, 12C, 12D:
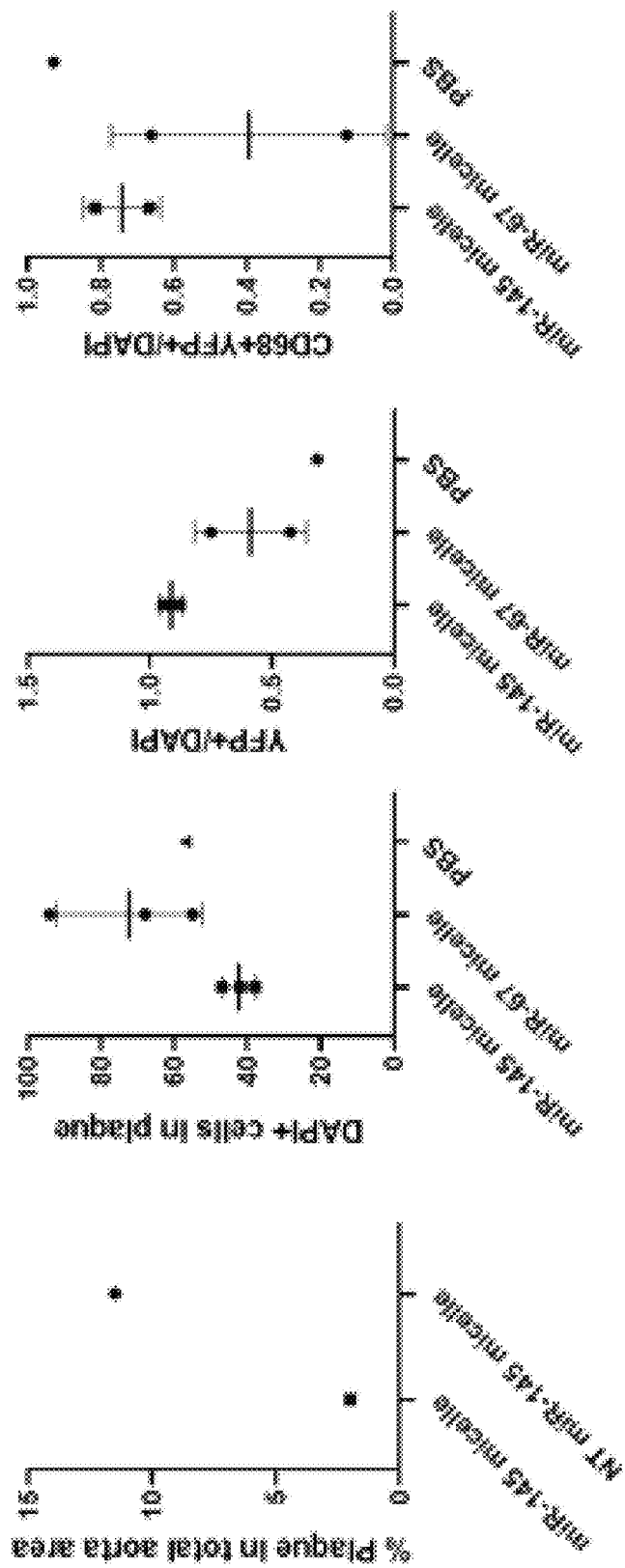

FIG. 12A shows en face oil red O stain of aortas indicated NT miR-145 micelle treated mice have more overall plaque propagation compared to miR-145 micelle treated mice. FIG. 12B provides quantification of the number of cells in plaques. FIG. 12C shows the proportion of YFP+ cells, while FIG. 12D shows proportion of CD68+YFP+ cells in plaque.

2.4.2 MYH11 Mice In Vivo, 2 Month
Methods: Myh11-CreERT2 ROSA floxed STOP eYFP Apoe$^{-/-}$ mice were IP injected with tamoxifen (1 mg/day for 10 days) to induce YFP expression in MYH11 expressing cells. Mice were then started on a HFD for 2 weeks and treated with miR-145 micelle (1 mg miR/kg), NT miR-145 micelles (1 mg miR/kg), or miR-67 micelle (1 mg miR/kg) via IV tail vein. Mice continued HFD for 8 more weeks and were euthanized. Aortas were collected, sectioned, and stained. Aortic root is stained with CD68 (red), YFP (green), and DAPI (blue).

FIG. 10 shows aortic roots of Myh11 mice were sectioned and stained for aSMA (red) expression in the plaques (white dash line). miR-145 micelles show the most aSMA expression in the plaques, indicating the majority of cells in plaques are non-synthetic SMCs.

Figure 13:
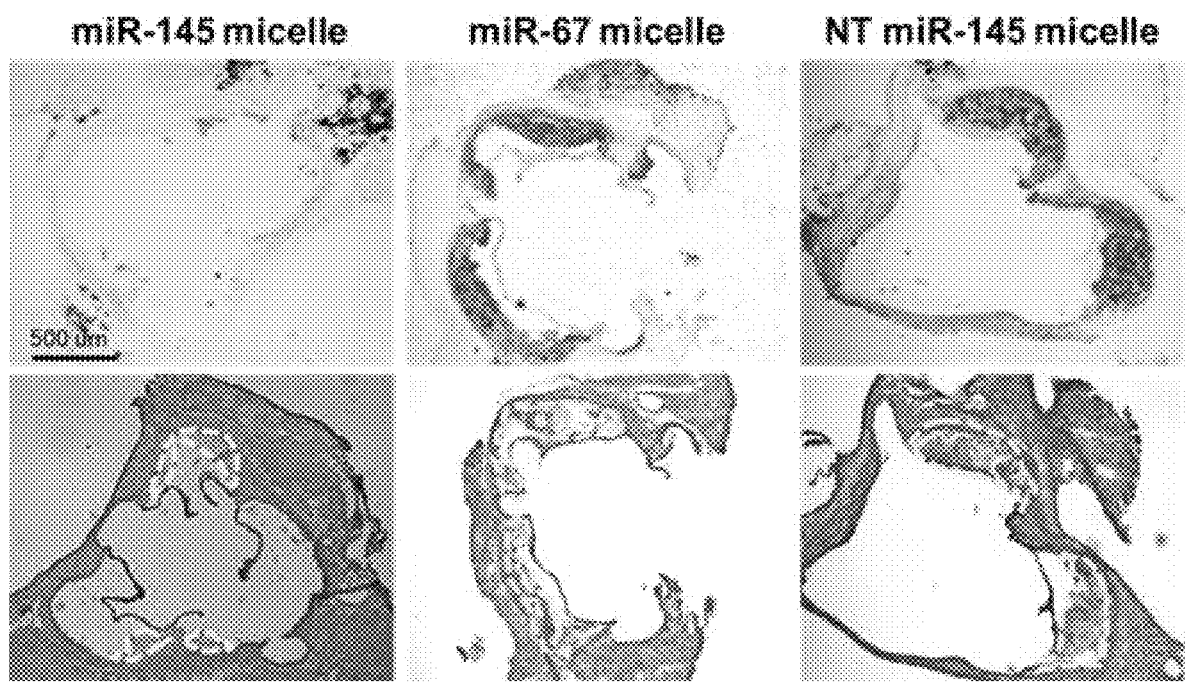
FIG. 13. Top row: Oil red O lipid stains of aortic roots. miR-145 micelles have minimal plaque formation. Bottom row: Hematoxylin & eosin stain of aortic roots. Plaques are outlined in yellow.

FIG. 13 shows in the top row: Oil red O lipid stains of aortic roots. miR-145 micelles have minimal plaque formation and in the bottom row: hematoxylin & eosin stain of aortic roots. Plaques are outlined in yellow.

Figure 14:
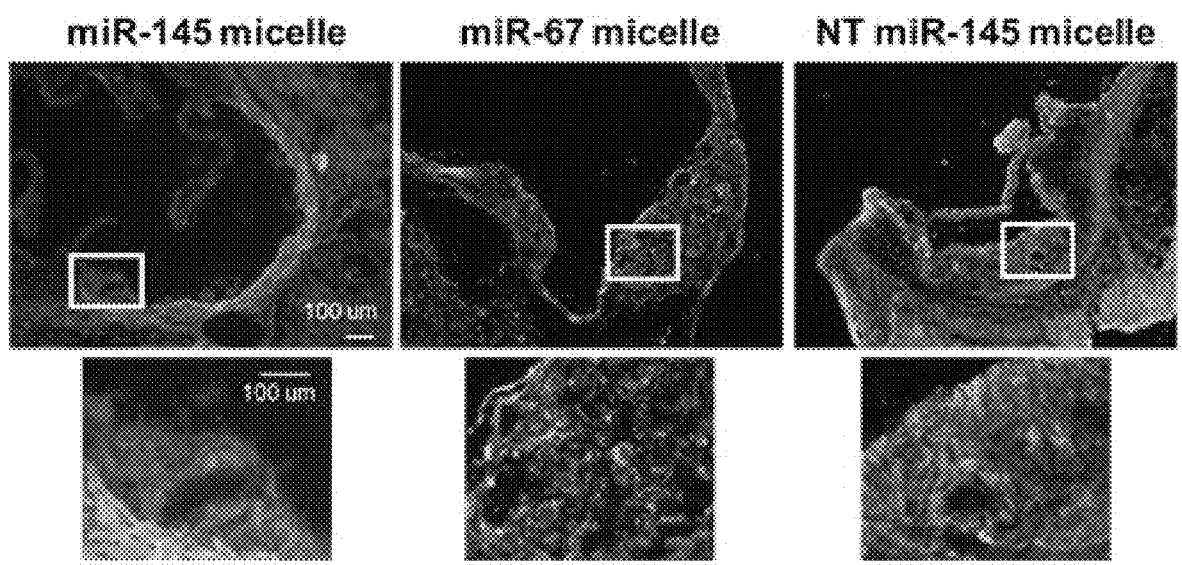
FIG. 14. Aortic root is stained with CD68 (red), YFP (green), and DAPI (blue).

FIG. 14 shows aortic root stained with CD68 (red), YFP (green), and DAPI (blue).

Figure 15A:
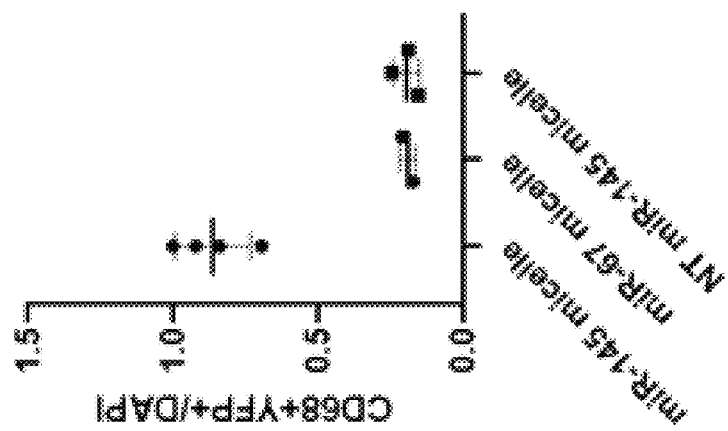
FIGS. 15A, 15B, and 15C. A) Quantification of the number of cells in plaques, B) proportion of YFP+ cells, and C) proportion of CD68+YFP+ cells in plaque.
Figure 15B:
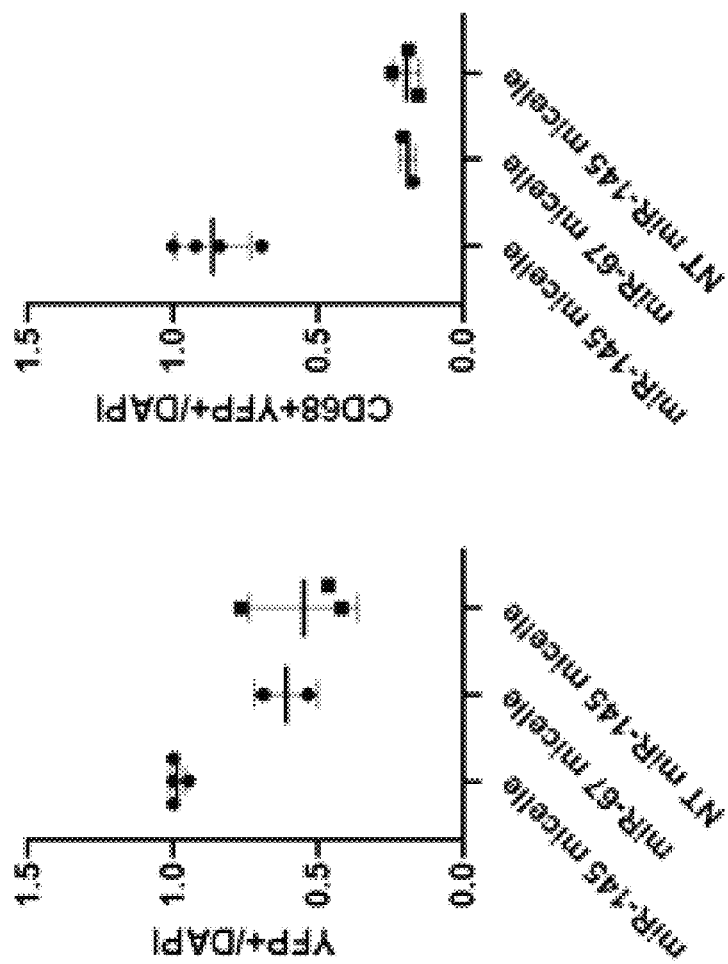
Figure 15C:
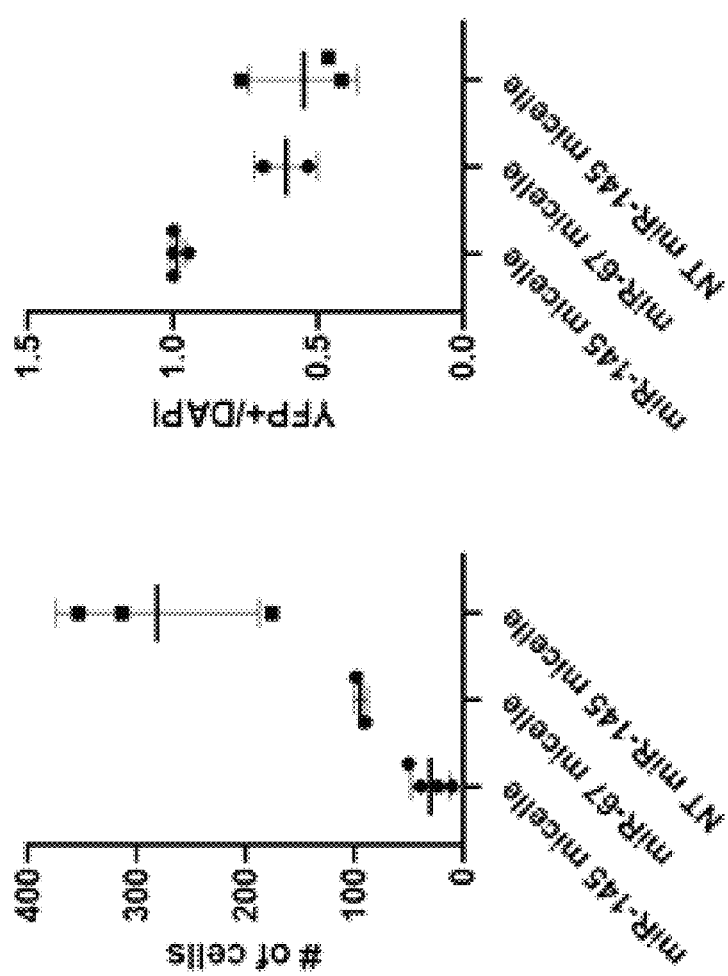

FIG. 15A provides quantification of the number of cells in plaques. FIG. 15B provides the proportion of YFP+ cells. FIG. 15C provides the proportion of CD68+YFP+ cells in plaque.

Figure 16A:
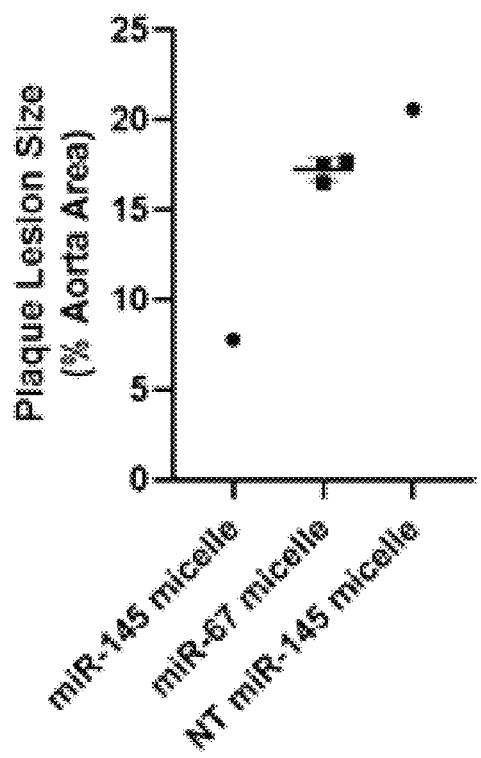
FIGS. 16A and 16B. A) Plaque lesion size as a percentage of aorta area, B) necrotic core area as a percentage of total plaque area.
Figure 16B:
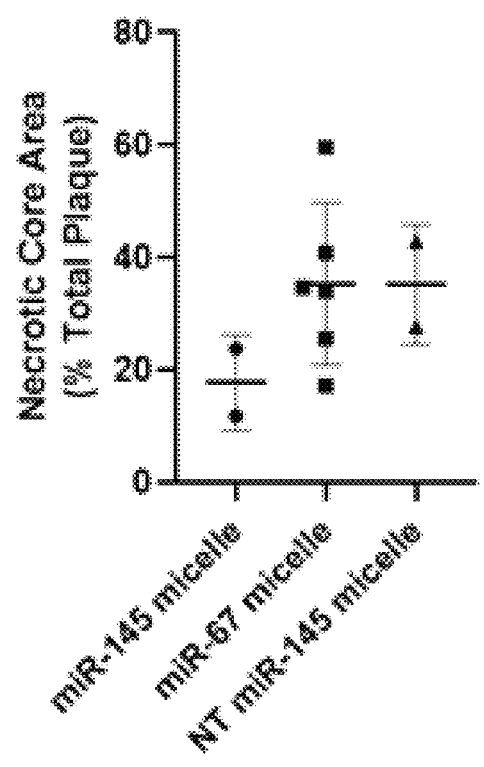

FIG. 16A provides the plaque lesion size as a percentage of aorta area. FIG. 16B provide the necrotic core area as a percentage of total plaque area.

3. The Effects of miR-145 Micelle Nanoparticles on Endothelial Cells 3.1 Introduction The activation of endothelial cells (ECs) during atherosclerosis causes endothelial permeability and increased accumulation of lipids and cholesterols into the arterial wall. Additionally, activated ECs release chemokines and overexpress C-C chemokine receptor-2 (CCR2) that recruit circulating monocytes and induce inflammation microRNA-145 (miR-145) has been identified as a highly expressed microRNA in healthy vasculature and downregulation of miR-145 is correlated with dysfunctional cell-cell tight junctions and propagation of cardiovascular disease, Previously, we developed miR-145 micelle nanoparticles and studied its effects on vascular smooth muscle cells (VSMCs) given miR-145 inhibits VSMC transformation into atherogenic cell types. We reported miR-145 micelles bind to CCR2 also expressed on VSMCs and inhibited atherosclerosis. However, given CCR2 expression on ECs and the developing knowledge of miR-145 in maintaining EC homeostasis, in this study, we investigate the effects of miR-145 micelles on ECs and endothelial repair for the first time. We demonstrate miR-145 micelle nanoparticles also bind to CCR2 expressed on activated ECs and are readily internalized, resulting in upregulation of intracellular miR-145 expression in human aortic ECs (155±14.2% compared to healthy HAECs). Additionally, miR-145 micelle treatment downregulated junction adhesion molecule-A, a protein associated with increased EC migration and permeability (JAM-A, 40.1±11.1% reduction compared to activated H-AECs), and rescued Zonula occludens-1 expression within tight junctions (2.5-fold increased expression compared to activated HAECs). Finally, we demonstrate that miR-145 micelle treatment results in a decrease in transendothelial monocyte migration by 31.8±8.1% compared to PBS-treatment. Overall, we report the effects of miR-145 micelles on ECs and the additional therapeutic effects and mechanisms by which miR-145 micelles may mitigate atherosclerosis.

3.2. Materials and Methods 3.2.1 Synthesis of Peptide Amphiphiles

MCP-1 peptides were synthesized using previously reported methods [54, 55]. Briefly, 0.25 mmol MCP-1 peptide [YNFTNRKISVQRLASYRRITSSK](SEQ ID NO: 1) or scrambled MCP-1 peptide (NT) [YNSLVFRIRNSTQRKYRASIST](SEQ ID NO: 5) were synthesized on Wang resin following conventional Fmoc-mediated solid phase peptide synthesis procedures using an automated peptide synthesizer (P53, Protein Technologies, Tucson, AZ) [56]. A solution of 94:2:5:2:5:1 vol. % trifluoroacetic acid:1,2-ethanedithiol:water:triisopropylsilane was added and reacted for 4 h to cleave the peptide from the resin. Peptides were precipitated in ice cold diethyl ether and the crude peptides were dissolved in Milli-Q water, frozen at −80° C., and lyophilized. Peptides were purified using reverse-phase high-performance liquid chromatography (HPLC, Prominence, Shimadzu, Columbia, MD) and successful synthesis was verified using matrix assisted laser desorption ionization-time of flight (MALDI-TOF) mass spectrometry.

3.2.2 Synthesis of DSPE-PEG(2000)-miR-145 Mimics

As previously described, thiolated miR-145 (5'-GUCCAGUUUUCCCAGGAAUCCCU-3') (SEQ ID NO: 2) and control miR (miR-67) (5'-UCACAACCUCCUA-GAAAGAGUAGA-3') (SEQ ID NO: 6) were custom ordered from IDT (Coralville, IA) [54]. miR-145-SH (MW=14,490 g/mol, 117.5 nmol, 1.70 mg) was added to DEPC-treated water to make 0.1 mM miR-145 solution. Tris(2-carboxyethyl)phosphine (TCEP) was added to the miR-145 solution and stirred in the dark at room temperature for 4 h [55]. Thiolated miR-145 was conjugated to DSPE-PEG(2000)-maleimide (Avanti Polar Lipids, Alabaster, AL) via a thioether bond by adding a 10% molar excess of lipid to reduced thiolated miR in DEPC-treated water.

3.2.3 Construction and Characterization of miR-Containing Micelles miR-145 micelles were self-assembled by combining MCP-1 peptide amphiphiles (MCP-1 PA) and DSPE-PEG(2000)-methoxy in a 49:50 mol ratio in methanol. The solvent was completely evaporated under nitrogen and further vacuum dried overnight. The resulting film was hydrated with 100 µL of the solution containing 1 mol % DSPE-PEG2000-miR-145 in nuclease-free water or PBS and incubated at 60° C. for 30 min. After incubation, the micelle solution was cooled to room temperature prior to use. Control micelle formulations containing MCP-1 and miR-67 amphiphiles (miR-67 micelle) or scrambled MCP-1 and miR-145 amphiphiles (NT miR-145 micelle) were synthesized similarly to miR-145 micelles (Table 1). Micelles were imaged using transmission electron microscopy (TEM). Briefly, synthesized micelles were loaded onto copper mesh grids for TEM and negatively stained using 2 wt % uranyl acetate. Micelle size was measured using dynamic light scattering (DLS) in water.

TABLE 1

Micelle formulations.

| | miR-145 amphiphile (mol %) | miR-67 amphiphile (mol %) | MCP-1 amphiphile (mol %) | NT MCP-1 amphiphile (mol%) | methoxy amphiphile (mol %) |
|---|---|---|---|---|---|
| miR-145 micelle | 1 | 0 | 49 | 0 | 50 |
| NT miR-145 micelle | 1 | 0 | 0 | 49 | 50 |
| MCP-1 micelle | 0 | 0 | 49 | 0 | 51 |
| NT MCP-1 micelle | 0 | 0 | 0 | 49 | 51 |
| miR-67 micelle | 0 | 1 | 49 | 0 | 50 |

3.2.4 In Vitro Micelle Binding Assay

Human aortic endothelial cells (HAECs, Lonza, Basel, Switzerland) were cultured in EBM-2 (Lonza, Basel, Switzerland), supplemented with endothelial cell growth supplement and 1% penicillin-streptomycin. HAECs were incubated for 24 h in tumor necrosis factor-α (TNF-α, 100 ng/ml) to induce activation and CCR2 expression [57, 58]. Cells from passages 4-7 were used for all experiments.

MCP-1 micelles, NT micelles (100 µM), or PBS were incubated with healthy and activated HAECs for 4 h to assess binding. Activation of HAECs was confirmed via immunocytochemistry. Cells were fixed using 4% PFA and were blocked with 1% BSA, 22 mg/mL glycine, and 0.1% Tween-20 for 1 h followed by 1 h of incubation with anti-CCR2 antibodies from a rabbit host (cat no. ab216863, Abcam, Cambridge, UK). Cells were then incubated with a goat anti-rabbit secondary antibody labeled with Alexa Fluor 594 (cat no. A-11037, Thermo Fisher Scientific, Waltham, MA, USA) in the dark for 1 h at room temperature. Nuclei were stained with DAPI (1 µg/mL) for 10 min at room temperature. The cells were imaged with a fluorescence microscope (Leica DMi8, Leica, Wetzlar, Germany).

3.2.5 In Vitro Cell Viability

HAECs were seeded in 96-well plates at a density of 10,000 cells/well. Cells were then treated with 1 µM, 10 µM, and 100 µM concentrations of miR-145 micelles, miR-67 micelles, or NT miR-145 micelles for 72 h. Cell viability was measured using an MTS assay (3-(4,5-dimethylthiazol-2-yl)-5-(3-carboxymethoxyphenyl)-2-(4-sulfophenyl)-2H-tetrazolium, BioVision, Milpitas, CA), following the manufacturer's instructions. Cell viability was compared to PBS-treated controls.

3.2.6 In Vitro mRNA and miR-145 Expression

Therapeutic effects of miR-145 micelles, NT miR-145 micelles, miR-67 micelles (100 µM), and PBS on activated HAECs were evaluated. Activated HAECs were treated with micelles for 4 h using serum-free media. Following the 4 h incubation period, the media was replaced by supplemented media containing 5% FBS and incubated for an additional 24 h. RNA was isolated via Trizol extraction (Invitrogen, Carlsbad, CA). cDNA was synthesized using RT2 First Strand Kit (Qiagen, Hilden, Germany) following the manufacturer's instructions. JAM-A expression was determined by RT-qPCR with RT2 SYBR Green qPCR Mastermix (Qiagen, Hilden, Germany) using a CFX384 Real-Time PCR Detection System (Bio-Rad Laboratories, Hercules, CA) with GAPDH as an internal loading control. miR-145 expression was also analyzed by RT-qPCR using miRCURY LNA RT Kit (Qiagen, Hilden, Germany) and RNU-6 as the internal control. The $2\Delta\Delta CT$ method was used to quantify mRNA expression level.

3.2.7 ZO-1 Immunocytochemistry

Activated HAECs were treated with miR-145 micelles, NT miR-145 micelles, miR-67 micelles (100 µM), and PBS using methods described above. Cells were fixed and blocked for 1 h incubation with mouse anti-human primary antibodies with Alexa Fluor 488 against ZO-1 (cat no. 339188, Thermo Fisher Scientific, Waltham, MA, USA) for 24 h at 4° C. Nuclei were then stained with DAPI (1 g/mL) for 5 min at room temperature. The cells were imaged with a fluorescence microscope (Leica DMi8, Leica, Wetzlar, Germany) using a GFP channel to analyze the ZO-1 signal.

3.2.8 Monocyte Transendothelial Migration Assay

A monocyte transendothelial migration assay was performed to measure the monocyte migration through an activated HAEC monolayer. HAECs were seeded to full confluency on 8 µm pore size transwell membranes coated with collagen I (3 mg/mL). Activated HAECs were treated with miR-145 micelles, NT miR-145 micelles, and miR-67 micelles (100 µM) for 24 h. After 24 h, 200,000 THP-1 monocytes were seeded into the apical chamber for 4 h using 10% FBS media and 20% FBS media on the basolateral chamber. Quant-it Pico Green (Invitrogen, Carlsbad, CA) was used to quantify the DNA of migrated monocytes on the basolateral chamber.

3.2.9 Statistical Analysis

Results are expressed as means±standard deviation (SD). A two-tailed Student t-tests was used to determine statistical significance between two groups, while a one-way analysis of variance (ANOVA) was used to determine statistical significance between more than two groups. A p-value of <0.05 was considered statistically significant. All statistical analyses were conducted using GraphPad Prism 8 (GraphPad Software, San Diego, CA).

3.3. The Effects of miR-145 Micelle Nanoparticles on Endothelial Cells—Results and Discussion 3.3.1 MCP-1 Micelles Bind to Healthy and Activated HAECs We previously developed and synthesized miR-145 micelles and demonstrated their efficacy as a therapy for atherosclerosis (FIG. 17A) [54]. We showed that miR-145 micelles containing MCP-1 peptides enabled binding to CCR2 expressed by pathogenic, synthetic VSMCs and mitigated VSMC transformation into pathogenic cell phenotypes in vitro and in vivo. However, as mentioned, CCR2 is expressed on activated ECs. Thus, in the present study, we investigated the effects of miR-145 micelles on CCR2-expressing ECs as a possible additional mechanism by which miR-145 micelles mitigate atherosclerosis.

Figure 18A:
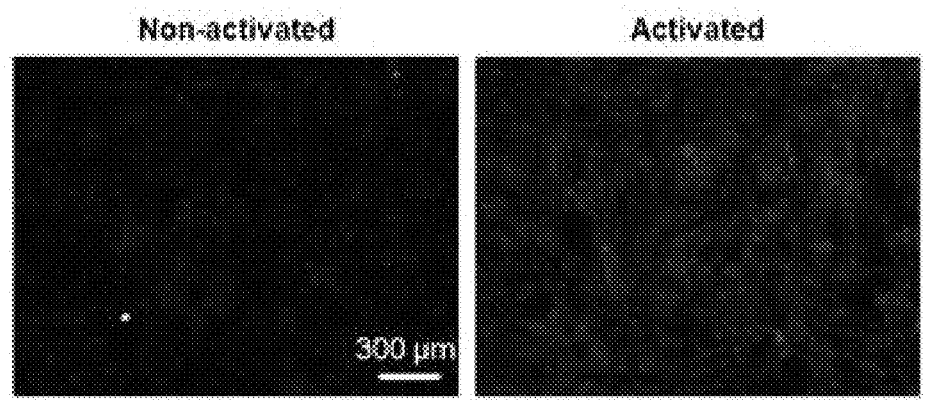
FIGS. 18A, 18B, 18C, and 18D. (A) Activated HAECs show greater expression of CCR2 (red). (B) Quantification of CCR2 expression. (C) Fluorescence images confirm increased binding of FITC-labeled MCP-1 micelles to activated HAECs (DAPI, blue) compared to FITC-labeled NT MCP-1 micelles. (D) Quantification of micelle binding shows MCP-1 micelles have greater affinity to activated HAECs compared to healthy HAECs as well as NT micelles. * indicates $p<0.05$,  $p<0.01$, ** $p<0.0001$.
Figure 18B:
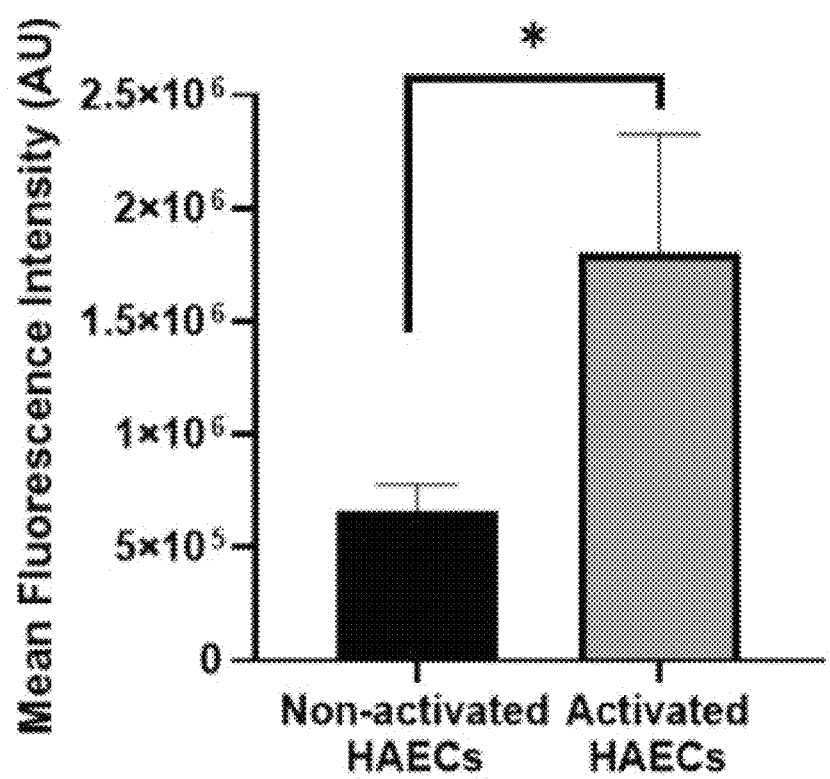
Figure 18C:
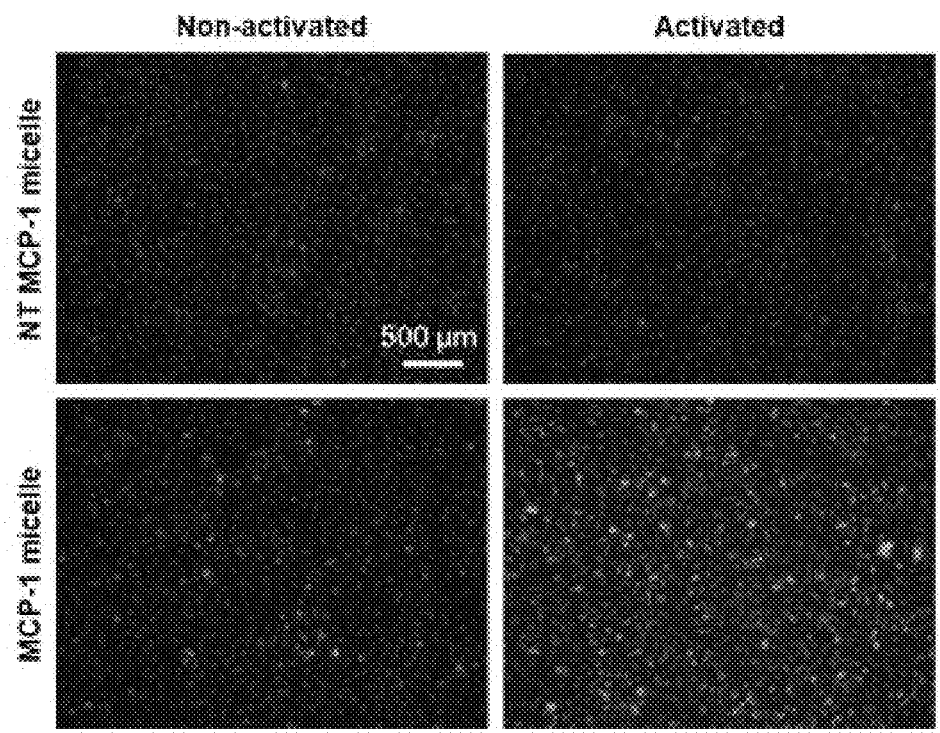
Figure 18D:
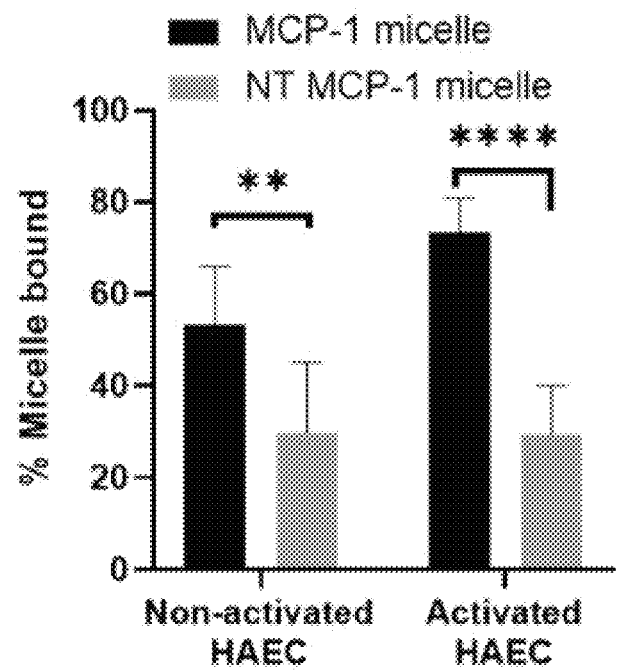

As found in FIGS. 17B and 17C, miR-145 micelles are spherical in morphology and approximately 21.5±1.2 nm in diameter as shown by DLS, consistent with earlier studies [54]. HAECs were activated with TNF-α treatment and activation was confirmed by CCR2 expression assessed via immunocytochemistry (FIGS. 18A and 18B). After activation, we verified binding of MCP-1 micelles to HAECs by incubating FITC-labeled MCP-1 micelles and NT MCP-1 micelles (100 µM) with non-activated and activated HAECs for 4 h. Immunofluorescence analysis showed that MCP-1 micelles had increased binding to healthy HAECs compared to NT MCP-1 micelles (53.3% vs. 29.9%, respectively). However, when HAECs were activated, MCP-1 micelles had a significantly increased level of binding to activated HAECs compared to healthy HAECs, and as expected, MCP-1 micelles demonstrated increased binding compared to NT MCP-1 micelles (FIG. 18C). Upon quantification, 73.4% of MCP-1 micelles bound to activated HAECs vs. 29.5% of NT MCP-1 micelles (FIG. 18D, p<0.0001). Additionally, 53.3% of MCP-1 micelles bound to non-activated HAECs compared to 29.9% of NT MCP-1 micelles (FIG. 18D, p<0.01). Thus, these results confirmed MCP-1 micelles target CCR2 expressed on activated HAECs.

3.3.2 Micelles are Biocompatible with ECs

Figure 19:
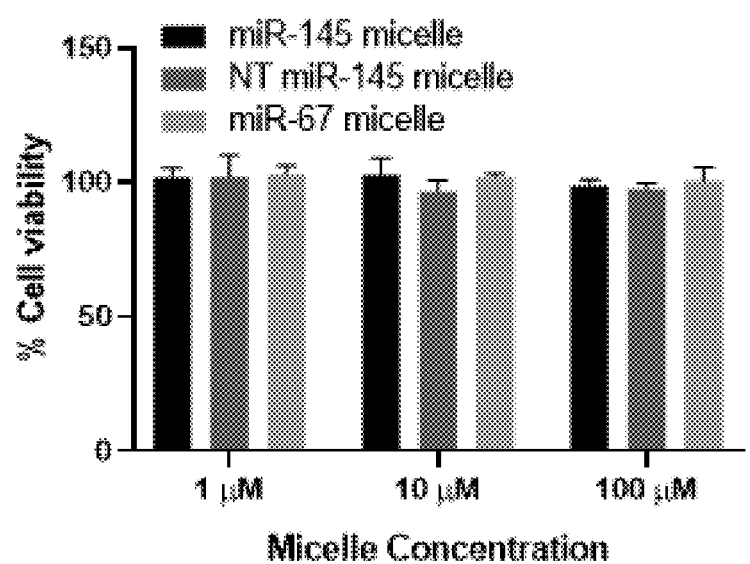
FIG. 19. Biocompatibility assessment at 1, 10, and 100 μM micelle concentrations show micelles are non-cytotoxic to HAECs after 72 h of treatment when compared to PBS treatment.

In order to assess biocompatibility of micelles, HAECs were incubated with 1, 10, and 100 µM concentrations of miR-145 micelles, NT miR-145 micelles, miR-67 micelles for 72 h. Cell viability was assessed using an MTS assay and compared to PBS-treated controls. Overall, cell viability remained near 100% and no cytotoxicity was observed at 1, 10, or 100 µM and for miR-145 micelles, NT miR-145 micelles, and miR-67 micelles (FIG. 19). These results indicate that the micelles are biocompatible with HAECs with minimal cytotoxic effects across these concentrations, which is consistent with previous studies testing miR-145 micelles as well as other micelles tested in vitro and in vivo for cardiovascular applications [54, 56, 59-63].

3.3.3 miR-145 Micelles Show Successful Transfection in Activated ECs

Figure 20:
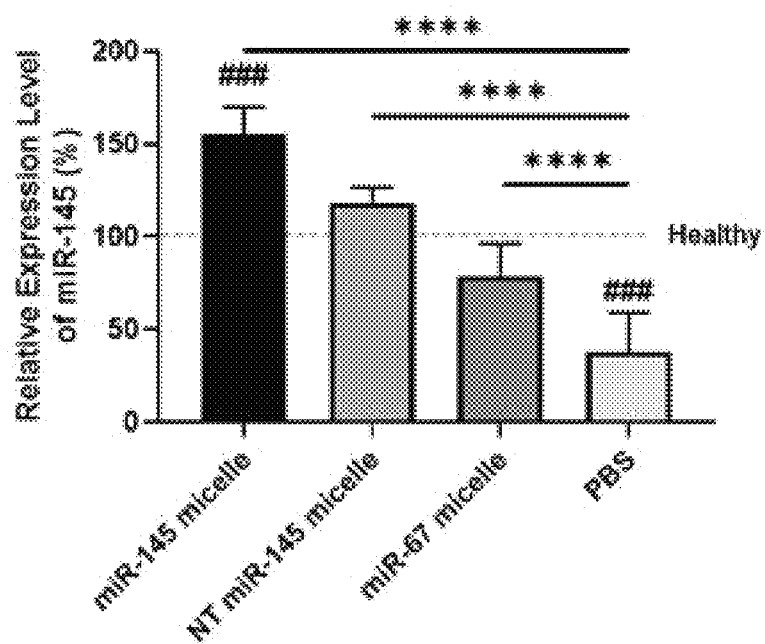
FIG. 20. miR-145 expression in activated HAECs with micelle treatment. ** indicates $p<0.0001$ compared to PBS. ** indicates $p<0.001$ compared to healthy ECs.

Downregulation of miR-145 has been correlated with endothelial injury and inflammation, while overexpression of miR-145 in ECs has been shown to improve endothelial injury and inflammation associated with cardiovascular disease [64]. Thus, to test the ability to regulate and rescue miR-145 expression in diseased ECs, we transfected activated ECs with miR-145 micelles. Non-activated HAECs were used as healthy controls. In accordance with previous studies, activated HAECs with PBS treatment expressed the lowest levels of miR-145 compared to healthy controls, confirming that activation of HAECs results in downregulation of miR-145 (PBS: 37.8±21.2% compared to non-activated HAECs, p<0.001). However, upon miR-145 micelle treatment in activated ECs, miR-145 expression is increased to levels greater than that of healthy ECs (miR-145 micelle: 155.6±14.2%, NT miR-145 micelles: 118±8.4%, miR-67 micelle: 78.8±17.3%, PBS: 37.8±21.2% compared to healthy controls, FIG. 20). These results suggest that despite adopting an activated state, activated ECs are receptive to miR-145 micelle therapy to upregulate miR-145 expression.

3.3.4 Assessment of Tight Junction Repair in Activated HAECs Treated with miR-145 Micelles After validation of MCP-1 micelle biocompatibility and uptake in activated HAECs, we investigated the ability of miR-145 micelles to rescue the healthy EC phenotype and inhibit endothelial permeability [65]. To do this, we measured tight junction markers in two ways: 1) mRNA expression of JAM-A and 2) the expression of Zonula occludens-1 (ZO-1) via immunofluorescence.

Figure 21A:
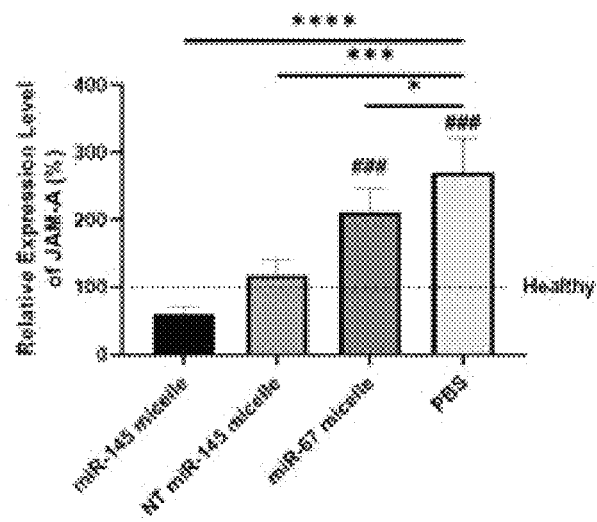
FIGS. 21A, 21B, and 21C. (A) Gene expression of JAM-A in HAECs after treatment. (B) ZO-1 expression (green) in healthy and activated HAECs treated with miR-145 micelles, NT miR-145 micelles, miR-67 micelles, or PBS. (C) Quantification of ZO-1 expression in mean fluorescence intensity. * indicates $p<0.05$,  $p<0.01$, * $p<0.001$, **** $p<0.0001$ compared to PBS. ## indicates $p<0.01$, ###$p<0.001$ compared to healthy ECs.

JAM-A expression is associated with increased endothelial permeability, loss of tight junction integrity, and overexpression of LFA-1, which in turn can promote atherosclerosis via LDL accumulation in the vessel wall and monocyte recruitment [66]. In activated HAECs (PBS group), JAM-A expression was found to be significantly elevated at 270.5±50.4% compared to healthy, non-activated HAECs (FIG. 21A). However, upon treatment with miR-145 micelles, JAM-A expression was dramatically decreased to 59.9±11.1% compared to healthy controls, which were similar to JAM-A downregulation in previous studies that treated ECs with miR-145 loaded exosomes [65].

Figure 21B:
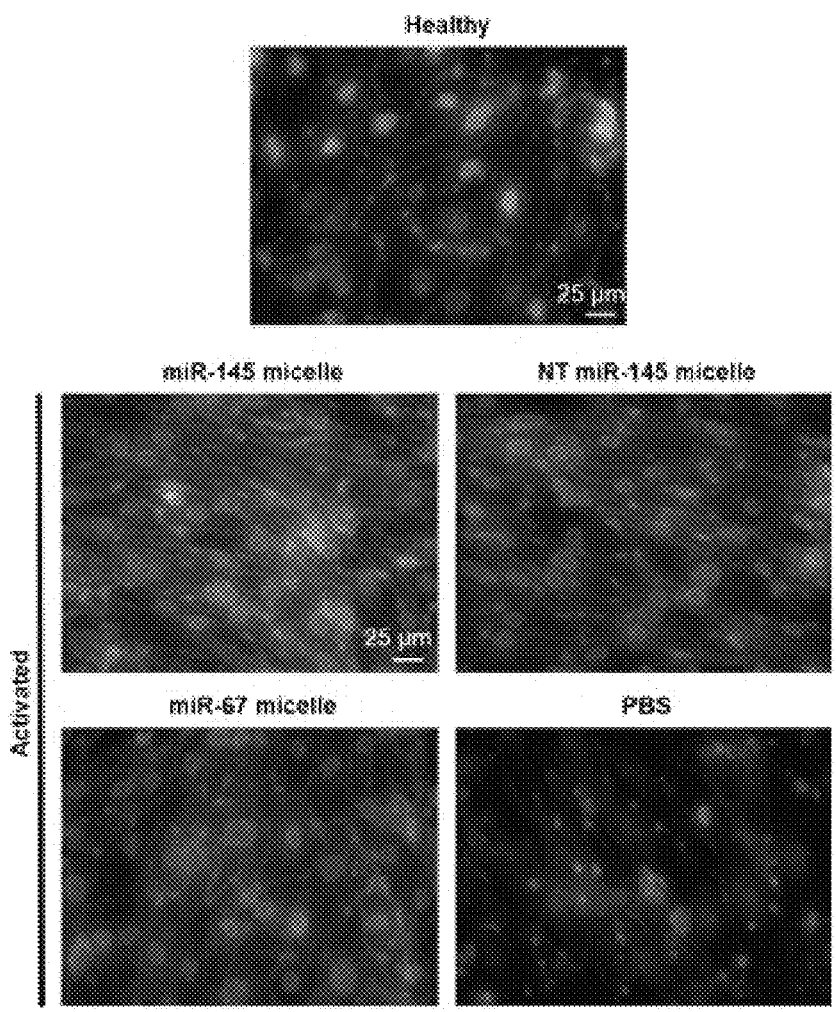
Figure 21C:
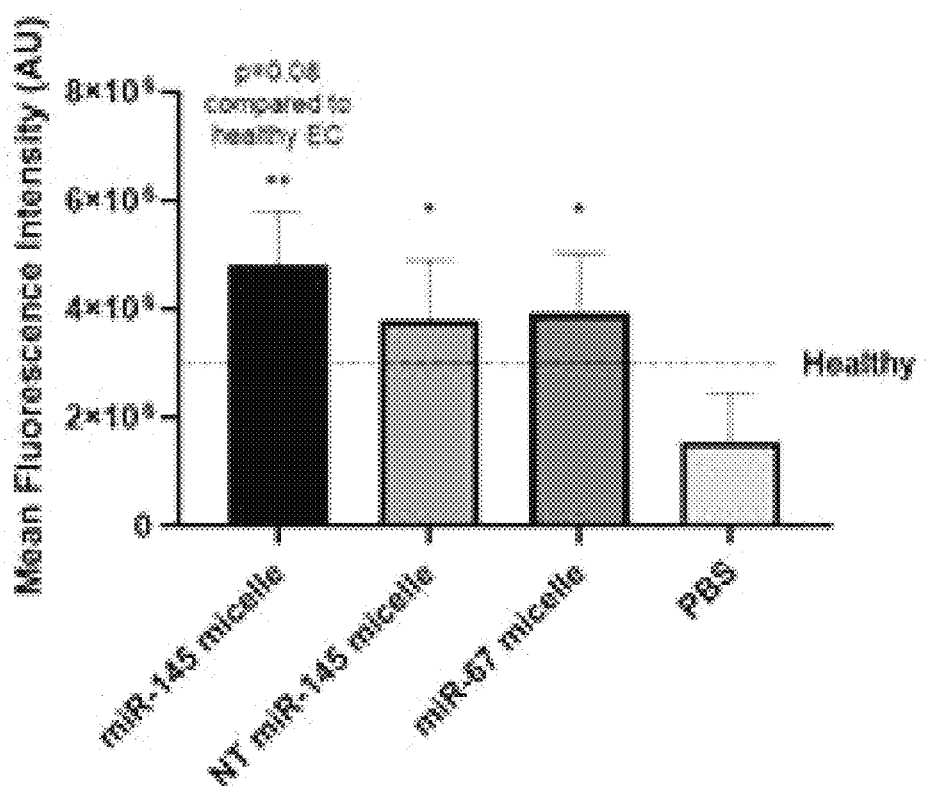

Next, we evaluated the ability of miR-145 micelles to repair endothelial permeability through fluorescence imaging of ZO-1. ZO-1 is a junctional adaptor protein that regulates tight junctions and cell migration in ECs [67]. Depletion of ZO-1 leads to tight junction disruption and a loss of tight junction proteins which are associated with endothelial dysfunction and permeability [68]. Thus, we tested the endothelial repair capabilities of miR-145 micelles on activated HAECs through ZO-1 expression (FIG. 21B). Activated HAECs treated with PBS showed a significant downregulation of ZO-1 expression ($1.6 \times 10^6 \pm 8.7 \times 10^5$ mean fluorescence intensity, AU) compared to healthy, non-activated HAECs ($2.9 \times 10^6 \pm 3.5 \times 10^5$ AU) when assessed via immunocytochemistry (FIG. 21C). Interestingly, miR-145 micelle treatment showed an increase in expression of ZO-1 ($4.8 \times 10^6 \pm 9.7 \times 10^5$ AU) compared to both healthy and activated HAECs. Similar to the effects on JAM-A expression, ZO-1 expression was comparable between NT miR-145 micelle ($3.8 \times 10^6 \pm 1.1 \times 10^6$ AU) and miR-67 micelle treatment ($3.9 \times 10^6 \pm 1.1 \times 10^6$ AU), but still upregulated compared to activated HAECs treated with PBS. Our results regarding miR-145 micelles in reducing JAM-A expression corroborates this data that shows miR-145 micelle treatment rescues ZO-1 expression and can restore cell-cell tight junctions. Thus, the improvement in endothelial permeability may be another mechanism by which miR-145 micelles slowed atherogenesis in previous studies.

3.3.5 miR-145 Micelle Treatment Regulates Monocyte Migration Through the Endothelium In addition to contributing to a permeable endothelium, activated ECs release chemokines and express adhesion molecules such as VCAM-1, and propagate inflammation by recruiting monocytes that adhere to the endothelium and intravasate into the subendothelium. Monocytes eventually transform into macrophages which engulf lipids and cholesterols and can undergo apoptosis, contributing to the lipid-rich necrotic core associated with plaque destabilization [69-75]. Monocyte recruitment triggered by endothelial activation is a critical process in the onset of lesion formation and limiting monocyte migration into the arterial wall can slow disease progression [76, 72, 77].

Figure 22A:
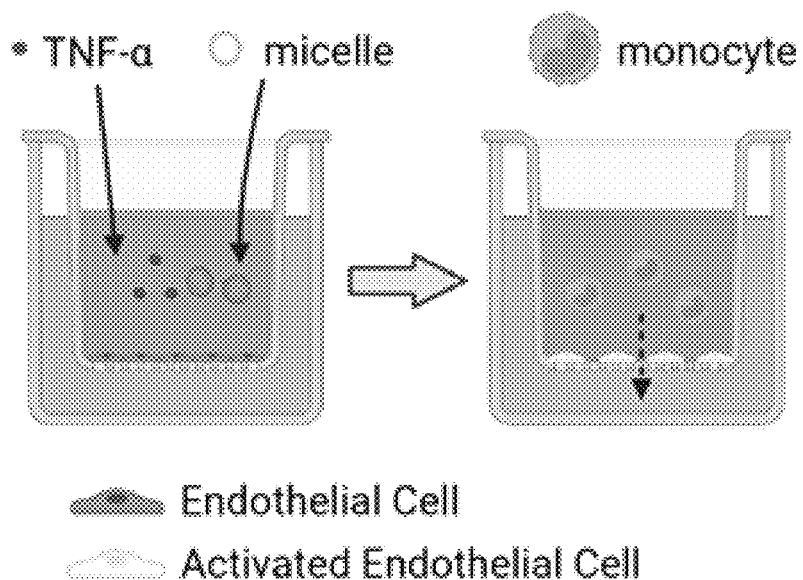
FIGS. 22A and 22B. (A) Schematic of transwell migration of monocytes through activated endothelium. (B) miR-145 micelle therapy reduces monocyte transendothelial migration compared to NT miR-145 micelle, miR-67 micelle, or PBS treatment. * indicates $p<0.05$.

To evaluate whether miR-145 micelles can inhibit entry of monocytes past the endothelium, a co-culture transwell in vitro model with activated ECs and monocytes was utilized to mimic monocyte recruitment into activated endothelium. HAECs were cultured on transwell membrane inserts, activated with TNF-α, and treated with micelles. After activation and treatment, monocytes were seeded into the apical chamber and a gradient of FBS was applied to act as a chemoattractant for monocytes as previously reported [59, 78, 79]. The migration of monocytes into the basolateral chamber was measured to determine the potential of micelles in repairing EC tight junctions and inhibition of monocyte recruitment (FIG. 22A).

Figure 22B:
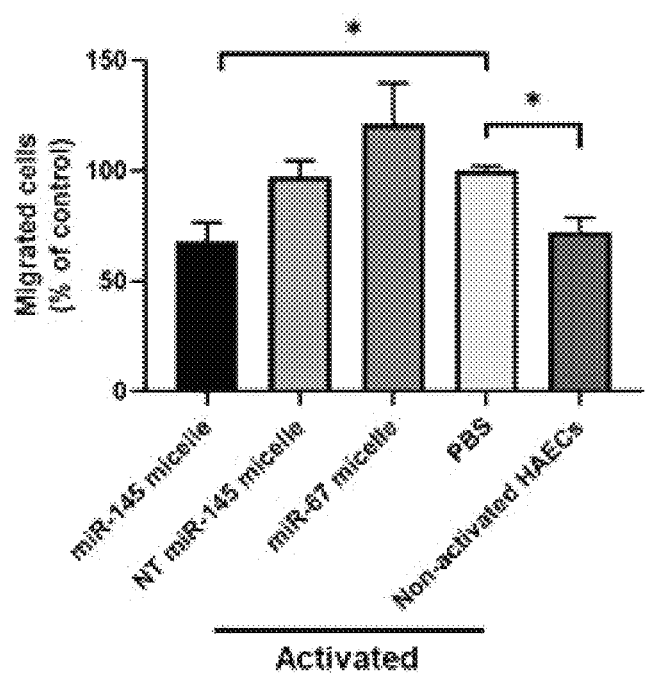

As found in FIG. 22, miR-145 micelle co-treatment with HAEC activation resulted in a less monocyte migration into the basolateral chamber compared to PBS controls (miR-145 micelle 68.2±8.4% vs. PBS: 100±2.1%, p<0.05). Similarly, a functional endothelium derived from healthy HAECs also prevented monocyte transendothelial migration (healthy: 72.4±6.3%). NT miR-145 micelle treatment and miR-67 micelle treatment did not cause significant changes in monocyte migration compared to PBS controls. In addition, monocytes also express CCR2 which bind to chemokines released by inflammatory endothelium and contribute to the recruitment of monocytes into the vessel [76, 62].

In vivo, it is possible that miR-145 micelles can bind to CCR2 on circulating monocytes, which may further inhibit monocyte recruitment to the activated endothelium [80, 76, 59, 62]. Our previous studies, in correlation with studies by other groups, have found that miR-145 will reduce inflammation, and, additionally, reduce macrophage infiltration and monocyte proliferation [55, 81]. As such, future studies will investigate the effects of miR-145 micelles on monocytes and the targeting abilities to additional cell types expressing CCR2 that lead to the therapeutic response of miR-145 micelles [55, 59, 62]. Nonetheless, these results suggest that miR-145 micelle therapy is capable of reducing monocyte transendothelial migration and highlights another possible therapeutic mechanism of action through which miR-145 micelles induced atheroprotective effects in vivo in our earlier studies [54].

3.3.4. Conclusion

In conclusion, we investigated the effects of miR-145 micelles on endothelial dysfunction and monocyte recruitment. Our results found that miR-145 micelles are biocompatible, can successfully bind to activated HAECs, and are uptaken intracellularly to induce ZO-1 expression and reduce JAM-A. Furthermore, miR-145 micelles inhibited monocyte migration through an activated EC monolayer. Taken together, our current study is the first investigation regarding the effects of miR-145 micelles on ECs and highlights another target by which miR-145 micelles mitigate atherosclerosis. As such, miR-145 micelles may have multiple targets to induce a therapeutic response in atherosclerosis and future studies will evaluate the effects of miR-145 micelles on other CCR2 expressing cell types in vivo.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

[1] F. V. Brozovich, et al., Mechanisms of vascular smooth muscle contraction and the basis for pharmacologic treatment of smooth muscle disorders, Pharmacol. Rev. 68 (2) (2016) 476-532.

[2] M. R. Bennett, S. Sinha, G. K. Owens, Vascular smooth muscle cells in atherosclerosis, Circ. Res. 118 (4) (2016) 692-702.

[3] D. Gomez, G. K. Owens, Smooth muscle cell phenotypic switching in atherosclerosis, Cardiovasc. Res. 95 (2) (2012) 156-164.

[4] L. S. Shankman, et al., KLF4-dependent phenotypic modulation of smooth muscle cells has a key role in atherosclerotic plaque pathogenesis, Nat. Med. 21 (2015) 628.

[5] G. L. Basatemur, et al., Vascular smooth muscle cells in atherosclerosis, Nat. Rev. Cardiol. 16 (12) (2019) 727-744.

[6] F. Wahid, et al., MicroRNAs: synthesis, mechanism, function, and recent clinical trials, Biochim. Biophys. Acta 1803 (11) (2010) 1231-1243.

[7] F. Lovren, et al., MicroRNA-145 targeted therapy reduces atherosclerosis, Circulation 126 (11, Suppl. 1) (2012) S81-S90.

[8] K. R. Cordes, et al., miR-145 and miR-143 regulate smooth muscle cell fate and plasticity, Nature 460 (7256) (2009) 705-710.

[9] L. Elia, et al., The knockout of miR-143 and -145 alters smooth muscle cell maintenance and vascular homeostasis in mice: correlates with human disease, Cell Death Differ. 16 (2009) 1590.

[10] S. Fichtlscherer, et al., Circulating microRNAs in patients with coronary artery disease, Circ. Res. 107 (5) (2010) 677-684.

[11] L. Y. Zhou, et al., Current RNA-based therapeutics in clinical trials, Curr. Gene Ther. 19 (3) (2019) 172-196.

[12] Y. Chen, D.-Y. Gao, L. Huang, In vivo delivery of miRNAs for cancer therapy: challenges and strategies, Adv. Drug Deliv. Rev. 81 (2015) 128-141.

[13] S. M. Hoy, Patisiran: First global approval, Drugs 78 (15) (2018) 1625-1631.

[14] D. D. Chin, S. Chowdhuri, E. J. Chung, Calcium-binding nanoparticles for vascular disease, Regenerative Engineering and Translational Medicine 5 (1) (2019) 74-85.

[15] D. D. Chin, et al., Collagenase-cleavable peptide amphiphile micelles as a novel theranostic strategy in atherosclerosis, Advanced Therapeutics 3 (3) (2020) 1900196.

[16] C. Poon, et al., Protein mimetic and anticancer properties of monocyte-targeting peptide amphiphile micelles, ACS Biomaterials Science & Engineering, 2017.

[17] A. D. Schecter, et al., MCP-1-dependent signaling in CCR2(−/−) aortic smooth muscle cells, J. Leukoc. Biol. 75 (6) (2004) 1079-1085.

[18] D. D. Chin, C. Poon, J. Wang, J. Joo, V. Ong, Z. Jiang, K. Cheng, A. Plotkin, G. A. Magee and E. J. Chung, Biomaterials, 2021, 273, 120810.

[19] E. J. Chung, L. B. Mlinar, K. Nord, M. J. Sugimoto, E. Wonder, F. J. Alenghat, Y. Fang and M. Tirrell, Adv Healthc Mater, 2015, 4, 367-376.

[20] D. D. Chin, J. Wang, M. Mel de Fontenay, A. Plotkin, G. A. Magee and E. J. Chung, J Mater Chem B, 2019, DOI: 10.1039/c9tb01918a.

[21] E. J. Chung, L. B. Mlinar, M. J. Sugimoto, K. Nord, B. B. Roman and M. Tirrell, Nanomedicine, 2015, 11, 479-487.

[22] D. Adams, M. Polydefkis, A. Gonzalez-Duarte, J. Wixner, A. V. Kristen, H. H. Schmidt, J. L. Berk, I. A. Losada Lopez, A. Dispenzieri, D. Quan, I. M. Conceicao, M. S. Slama, J. D. Gillmore, T. Kyriakides, S. Ajroud-Driss, M. Waddington-Cruz, M. M. Mezei, V. Plante-Bordeneuve, S. Attarian, E. Mauricio, T. H. Brannagan, 3rd, M. Ueda, E. Aldinc, J. J. Wang, M. T. White, J. Vest, E. Berber, M. T. Sweetser, T. Coelho and O. L. E. s. g. patisiran Global, Lancet Neurol, 2021, 20, 49-59.

[23] L. S. Shankman, D. Gomez, O. A. Cherepanova, M. Salmon, G. F. Alencar, R. M. Haskins, P. Swiatlowska, A. A. Newman, E. S. Greene, A. C. Straub, B. Isakson, G. J. Randolph and G. K. Owens, Nat Med, 2015, 21, 628-637.

[24] G. L. Basatemur, H. F. Jorgensen, M. C. H. Clarke, M. R. Bennett and Z. Mallat, Nat Rev Cardiol, 2019, 16, 727-744.

[25] D. Adams, A. Gonzalez-Duarte, W. D. O'Riordan, C. C. Yang, M. Ueda, A. V. Kristen, I. Tournev, H. H. Schmidt, T. Coelho, J. L. Berk, K. P. Lin, G. Vita, S. Attarian, V. Plante-Bordeneuve, M. M. Mezei, J. M. Campistol, J. Buades, T. H. Brannagan, 3rd, B. J. Kim, J. Oh, Y. Parman, Y. Sekijima, P. N. Hawkins, S. D. Solomon, M. Polydefkis, P. J. Dyck, P. J. Gandhi, S. Goyal, J. Chen, A. L. Strahs, S. V. Nochur, M. T. Sweetser, P. P. Garg, A. K. Vaishnaw, J. A. Gollob and O. B. Suhr, N Engl J Med, 2018, 379, 11-21.

[26] A. Daugherty, A. R. Tall, M. Daemen, E. Falk, E. A. Fisher, G. Garcia-Cardena, A. J. Lusis, A. P. Owens, 3rd, M. E. Rosenfeld, R. Virmani, T. American Heart Association Council on Arteriosclerosis, B. Vascular and S. Council on Basic Cardiovascular, Arterioscler Thromb Vasc Biol, 2017, 37, e131-e157.

[27] A. Daugherty, A. R. Tall, M. Daemen, E. Falk, E. A. Fisher, G. Garcia-Cardena, A. J. Lusis, A. P. Owens, 3rd, M. E. Rosenfeld, R. Virmani, T. American Heart Association Council on Arteriosclerosis, B. Vascular and S. Council on Basic Cardiovascular, Arterioscler Thromb Vasc Biol, 2017, 37, e131-e157.26 [28]

[28] F. Lovren, Y. Pan, A. Quan, K. K. Singh, P. C. Shukla, N. Gupta, B. M. Steer, A. J. Ingram, M. Gupta, M. Al-Omran, H. Teoh, P. A. Marsden and S. Verma, Circulation, 2012, 126, S81-90.

[29] J. F. Bentzon, F. Otsuka, R. Virmani and E. Falk, Circ Res, 2014, 114, 1852-1866.

[30] E. Falk, M. Nakano, J. F. Bentzon, A. V. Finn and R. Virmani, Eur Heart J, 2013, 34, 719-728.

[31] A. V. Finn, M. Nakano, J. Narula, F. D. Kolodgie and R. Virmani, Arterioscler Thromb Vasc Biol, 2010, 30, 1282-1292.

[32] J. Chappell, J. L. Harman, V. M. Narasimhan, H. Yu, K. Foote, B. D. Simons, M. R. Bennett and H. F. Jorgensen, Circ Res, 2016, 119, 1313-1323.

[33] M. P. Gantier, C. E. McCoy, I. Rusinova, D. Saulep, D. Wang, D. Xu, A. T. Irving, M. A. Behlke, P. J. Hertzog, F. Mackay and B. R. Williams, Nucleic Acids Res, 2011, 39, 5692-5703.

[34] E. van Rooij, L. B. Sutherland, X. Qi, J. A. Richardson, J. Hill and E. N. Olson, Science, 2007, 316, 575-579.

[35] S. Bail, M. Swerdel, H. Liu, X. Jiao, L. A. Goff, R. P. Hart and M. Kiledjian, RNA, 2010, 16, 1032-1039.

[36] Y. Guo, J. Liu, S. J. Elfenbein, Y. Ma, M. Zhong, C. Qiu, Y. Ding and J. Lu, *Nucleic Acids Res,* 2015, 43, 2326-2341.

[37] S. Feil, B. Fehrenbacher, R. Lukowski, F. Essmann, K. Schulze-Osthoff, M. Schaller and R. Feil, *Circ Res,* 2014, 115, 662-667.

[38] G. F. Alencar, K. M. Owsiany, S. Karnewar, K. Sukhavasi, G. Mocci, A. T. Nguyen, C. M. Williams, S. Shamsuzzaman, M. Mokry, C. A. Henderson, R. Haskins, R. A. Baylis, A. V. Finn, C. A. McNamara, E. R. Zunder, V. Venkata, G. Pasterkamp, J. Bjorkegren, S. Bekiranov and G. K. Owens, *Circulation,* 2020, 142, 2045-2059.

[39] N. Méndez-Barbero, C. Gutierrez-Munoz and L. M. Blanco-Colio, *International journal of molecular sciences,* 2021, 22, 7284.

[40] K. K. Ray, U. Landmesser, L. A. Leiter, D. Kallend, R. Dufour, M. Karakas, T. Hall, R. P. Troquay, T. Turner, F. L. Visseren, P. Wijngaard, R. S. Wright and J. J. Kastelein, N Engl J Med, 2017, 376, 1430-1440.

[41] D. K. Arnett, R. S. Blumenthal, M. A. Albert, A. B. Buroker, Z. D. Goldberger, E. J. Hahn, C. D. Himmelfarb, A. Khera, D. Lloyd-Jones, J. W. McEvoy, E. D. Michos, M. D. Miedema, D. Munoz, S. C. Smith, Jr., S. S. Virani, K. A. Williams, Sr., J. Yeboah and B. Ziaeian, J Am Coll Cardiol, 2019, 74, 1376-1414.

[41] H. C. Stary, Arterioscler Thromb Vase Biol, 2000, 20, 1177-1178.

[42] A. Y. Rangrez, Z. A. Massy, V. Metzinger-Le Meuth and L. Metzinger, Circ Cardiovasc Genet, 2011, 4, 197-205.

[43] E. Hergenreider, S. Heydt, K. Treguer, T. Boettger, A. J. Horrevoets, A. M. Zeiher, M. P. Scheffer, A. S. Frangakis, X. Yin, M. Mayr, T. Braun, C. Urbich, R. A. Boon and S. Dimmeler, *Nat Cell Biol,* 2012, 14, 249-256.

[44] K. Jacobsen, M. B. Lund, J. Shim, S. Gunnersen, E. M. Fuchtbauer, M. Kjolby, L. Carramolino and J. F. Bentzon, *JCI Insight,* 2017, 2.

[45] C. Poon, S. Chowdhuri, C.-H. Kuo, Y. Fang, F. J. Alenghat, D. Hyatt, K. Kani, M. E. Gross and E. J. Chung, *ACS Biomaterials Science & Engineering,* 2017, DOI: 10.1021/acsbiomaterials.7b00600.

[46] J. Y. Lee and J. S. Parks, *Curr Opin Lipidol,* 2005, 16, 19-25.

[47] X. Zhou, Z. Yin, X. Guo, D. P. Hajjar and J. Han, *J Biol Chem,* 2010, 285, 6316-6326.

[48] P. P. Toth, *Circulation,* 2004, 109, 1809-1812.

[49] M. Barylski, P. P. Toth, D. Nikolic, M. Banach, M. Rizzo and G. Montalto, *Best Pract Res Clin Endocrinol Metab,* 2014, 28, 453-461.

[50] M. H. Davidson and P. P. Toth, *Am J Cardiol,* 2007, 100, n32-40.

[51] M. B. Elshazly, R. Quispe, E. D. Michos, A. D. Sniderman, P. P. Toth, M. Banach, K. R. Kulkarni, J. Coresh, R. S. Blumenthal, S. R. Jones and S. S. Martin, *Circulation,* 2015, 132, 667-676.

[52] M. Kaur, K. R. Ahuja, S. Khubber, L. Zhou, B. R. Verma, C. Meenakshisundaram, M. M. Gad, A. Saad, K. Dhaliwal, T. Isogai, J. Rajeswaran, A. Toth, J. Chahine, L. Cho, R. Puri and S. Kapadia, *Am J Cardiol,* 2021, 146, 8-14

[53] P. P. Toth, *Dis Mon,* 2001, 47, 369-416
Xxxxxxxxxxxxxxxxxxxx

[54] Chin, D. D., et al., miR-145 micelles mitigate atherosclerosis by modulating vascular smooth muscle cell phenotype. Biomaterials, 2021. 273: p. 120810.

[55] Poon, C., et al., Protein Mimetic and Anticancer Properties of Monocyte-Targeting Peptide Amphiphile Micelles. ACS Biomaterials Science & Engineering, 2017.

[56] Chin, D. D., et al., Collagenase-Cleavable Peptide Amphiphile Micelles as a Novel Theranostic Strategy in Atherosclerosis. Advanced Therapeutics, 2020. 3(3): p. 1900196.

[57] Weber, K. S., et al., Expression of CCR2 by endothelial cells: implications for MCP-1 mediated wound injury repair and In vivo inflammatory activation of endothelium. Arterioscler Thromb Vasc Biol, 1999. 19(9): p. 2085-93.

[58] Meekins, J. W., et al., Endothelial cell activation by tumour necrosis factor-alpha (TNF-alpha) and the development of pre-eclampsia. Clinical and experimental immunology, 1994. 98(1): p. 110-114.

[59] Poon, C., M. Sarkar, and E. J. Chung, Synthesis of Monocyte-targeting Peptide Amphiphile Micelles for Imaging of Atherosclerosis. 2017(129): p. e56625.

[60] Yoo, S. P., et al., Gadolinium-Functionalized Peptide Amphiphile Micelles for Multimodal Imaging of Atherosclerotic Lesions. ACS Omega, 2016. 1(5): p. 996-1003.

[61] Chung, E. J., Targeting and therapeutic peptides in nanomedicine for atherosclerosis. Exp Biol Med (Maywood), 2016. 241(9): p. 891-8.

[62] Chung, E. J., et al., Monocyte-targeting supramolecular micellar assemblies: a molecular diagnostic tool for atherosclerosis. Adv Healthc Mater, 2015. 4(3): p. 367-76.

[63] Chin, D. D., et al., Hydroxyapatite-binding micelles for the detection of vascular calcification in atherosclerosis. J Mater Chem B, 2019.

[64] Wu, S., H. Sun, and B. Sun, MicroRNA-145 is involved in endothelial cell dysfunction and acts as a promising biomarker of acute coronary syndrome. Eur J Med Res, 2020. 25(1): p. 2.

[65] Yang, W., et al., Mesenchymal stem-cell-derived exosomal miR-145 inhibits atherosclerosis by targeting JAM-A. Mol Ther Nucleic Acids, 2021. 23: p. 119-131.

[66] Schmitt, M. M., et al., Endothelial junctional adhesion molecule—a guides monocytes into flow-dependent predilection sites of atherosclerosis. Circulation, 2014. 129 (1): p. 66-76.

[67] Tornavaca, O., et al., ZO-1 controls endothelial adherens junctions, cell-cell tension, angiogenesis, and barrier formation. J Cell Biol, 2015. 208(6): p. 821-38.

[68] Haas, A. J., et al., Interplay between Extracellular Matrix Stiffness and JAM-A Regulates Mechanical Load on ZO-1 and Tight Junction Assembly. Cell Reports, 2020. 32(3): p. 107924.

[69] Bentzon, J. F., et al., *Mechanisms of plaque formation and rupture.* Circ Res, 2014. 114(12): p. 1852-66.

[70] Feil, S., et al., Transdifferentiation of vascular smooth muscle cells to macrophage-like cells during atherogenesis. Circ Res, 2014. 115(7): p. 662-7.

[71] Libby, P., *Inflammation in atherosclerosis.* Arterioscler Thromb Vasc Biol, 2012. 32(9): p. 2045-51.

[72] Tang, J., et al., Inhibiting macrophage proliferation suppresses atherosclerotic plaque inflammation. Sci Adv, 2015. 1(3).

[73] Falk, E., et al., *Update on acute coronary syndromes: the pathologists' view.* Eur Heart J, 2013. 34(10): p. 719-28.

[74] Finn, A. V., et al., *Concept of vulnerable unstable plaque.* Arterioscler Thromb Vasc Biol, 2010. 30(7): p. 1282-92.

[75] Naghavi, M., et al., From vulnerable plaque to vulnerable patient: a call for new definitions and risk assessment strategies: Part II. Circulation, 2003. 108(15): p. 1772-8.
[76] Weber, C., et al., Downregulation by tumor necrosis factor-alpha of monocyte CCR2 expression and monocyte chemotactic protein-1-induced transendothelial migration is antagonized by oxidized low-density lipoprotein: a potential mechanism of monocyte retention in atherosclerotic lesions. Atherosclerosis, 1999. 145(1): p. 115-23.
[77] Swirski, F. K., et al., Monocyte accumulation in mouse atherogenesis is progressive and proportional to extent of disease. Proc Natl Acad Sci USA, 2006. 103(27): p. 10340-10345.
[78] Toetsch, S., et al., The evolution of chemotaxis assays from static models to physiologically relevant platforms. Integr Biol (Camb), 2009. 1(2): p. 170-81.
[79] Zhang, C., et al., *A microfluidic Transwell to study chemotaxis*. Exp Cell Res, 2016. 342(2): p. 159-65.
[80] Salcedo, R., et al., Human endothelial cells express CCR2 and respond to MCP-1: direct role of MCP-1 in angiogenesis and tumor progression. Blood, 2000. 96(1): p. 34-40.
[81] He, M., et al., miR-145 improves metabolic inflammatory disease through multiple pathways. J Mol Cell Biol, 2020. 12(2): p. 152-162.

SEQUENCE LISTING

<110> University of Southern California
<120> MIR-145 MICELLES FOR MITIGATING ATHEROSCLEROSIS
<130> USC0314PUSP
<160> 6
<170> PatentIn version 3.5
<210> 1
<211> 23
<212> PRT
<213> *Homo sapiens*
<400> 1
Tyr Asn Phe Thr Asn Arg Lys Ile Ser Val Gln Arg Leu Ala Ser Tyr
1 5 10 15
Arg Arg Ile Thr Ser Ser Lys
20
<210> 2
<211> 23
<212> RNA
<213> *Homo sapiens*
<400> 2
guccaguuuu cccaggaauc ccu 23
<210> 3
<211> 8
<212> PRT
<213> *Homo sapiens*
<400> 3
Cys Val His Pro Lys Gln His Arg
1 5
<210> 4
<211> 33
<212> PRT
<213> *Homo sapiens*
<400> 4
Cys Val Pro Met Ser Met Cys Tyr Asn Phe Thr Asn Arg Lys Ile Ser
1 5 10 15
Val Gln Arg Leu Ala Ser Tyr Arg Arg Ile Thr Ser Ser Lys Arg Gly
20 25 30
Gly
<210> 5
<211> 22
<212> PRT
<213> *Homo sapiens*
<400> 5
Tyr Asn Ser Leu Val Phe Arg Ile Arg Asn Ser Thr Gln Arg Lys Tyr
1 5 10 15
Arg Ala Ser Ile Ser Thr
20
<210> 6
<211> 24
<212> RNA
<213> *Homo sapiens*
<400> 6
ucacaaccuc cuagaaagag uaga 24

---

```
                              SEQUENCE LISTING

Sequence total quantity: 10
SEQ ID NO: 1              moltype = AA  length = 23
FEATURE                   Location/Qualifiers
source                    1..23
                          mol_type = protein
                          organism = Homo sapiens
SEQUENCE: 1
YNFTNRKISV QRLASYRRIT SSK                                            23

SEQ ID NO: 2              moltype = RNA  length = 23
FEATURE                   Location/Qualifiers
source                    1..23
                          mol_type = genomic RNA
                          organism = Homo sapiens
SEQUENCE: 2
gtccagtttt cccaggaatc cct                                            23

SEQ ID NO: 3              moltype = AA  length = 8
FEATURE                   Location/Qualifiers
source                    1..8
                          mol_type = protein
                          organism = Homo sapiens
```

```
SEQUENCE: 3
CVHPKQHR                                                                         8

SEQ ID NO: 4            moltype = AA   length = 33
FEATURE                 Location/Qualifiers
source                  1..33
                        mol_type = protein
                        organism = Homo sapiens
SEQUENCE: 4
CVPMSMCYNF TNRKISVQRL ASYRRITSSK RGG                                            33

SEQ ID NO: 5            moltype = AA   length = 22
FEATURE                 Location/Qualifiers
source                  1..22
                        mol_type = protein
                        organism = Homo sapiens
SEQUENCE: 5
YNSLVFRIRN STQRKYRASI ST                                                        22

SEQ ID NO: 6            moltype = RNA  length = 24
FEATURE                 Location/Qualifiers
source                  1..24
                        mol_type = genomic RNA
                        organism = Homo sapiens
SEQUENCE: 6
tcacaacctc ctagaaagag taga                                                      24

SEQ ID NO: 7            moltype = AA   length = 5
FEATURE                 Location/Qualifiers
source                  1..5
                        mol_type = protein
                        organism = Homo sapiens
SEQUENCE: 7
CREKA                                                                            5

SEQ ID NO: 8            moltype = AA   length = 9
FEATURE                 Location/Qualifiers
source                  1..9
                        mol_type = protein
                        organism = Homo sapiens
SEQUENCE: 8
CVPMSMRGG                                                                        9

SEQ ID NO: 9            moltype = AA   length = 12
FEATURE                 Location/Qualifiers
source                  1..12
                        mol_type = protein
                        organism = Homo sapiens
SEQUENCE: 9
SVSVGMKPSP RP                                                                   12

SEQ ID NO: 10           moltype = AA   length = 24
FEATURE                 Location/Qualifiers
source                  1..24
                        mol_type = protein
                        organism = Homo sapiens
SEQUENCE: 10
CYNFTNRKIS VQRLASYRRI TSSK                                                      24
```

What is claimed is:

1. A drug delivery system comprising:
a plurality of nanoparticles, wherein each nanoparticle includes a targeting peptide conjugated thereto that targets atherosclerotic plaque, and a therapeutic agent conjugated thereto for treating atherosclerotic plaque, wherein the therapeutic agent includes a component selected from the group consisting of miR-145 and therapeutically effective fragments thereof and wherein the targeting peptide includes a component selected from the group consisting of MCP-1 having a sequence having CYNFTNRKISVQRLASYRRITSSK (SEQ ID NO: 10), a VLA-4 peptide having sequence CVHPKQHR (SEQ ID NO: 3), a fibrin-targeting peptide having sequence CREKA (SEQ ID NO: 7), a collagenase-targeting peptide having sequence CVPMSMRGG (SEQ ID NO: 8), a collagenase-targeting peptide having sequence CVPMSMCYNFTNRKISVQRLASYRRITSSKRGG (SEQ ID NO: 4), and a hydroxyapatitie-targeting peptide having sequence SVSVGMKPSPRP SEQ ID NO: 9).

2. The drug delivery system of claim 1 wherein the plurality of nanoparticles includes nanoparticles selected from the group consisting of micelles, liposomes, and combinations thereof.

3. The drug delivery system of claim 1 wherein the targeting peptide includes a CCR2 binding motif of MCP-1.

4. The drug delivery system of claim 1 wherein the targeting peptide includes a polypeptide having SEQ ID NO 1: YNFTNRKISVQRLASYRRITSSK or a fragment thereof that binds to MCP-1.

5. The drug delivery system of claim 1 wherein the therapeutic agent includes a microRNA.

6. The drug delivery system of claim 5 wherein the therapeutic agent includes miR-145 or a therapeutically effective fragment thereof.

7. The drug delivery system of claim 1 wherein the therapeutic agent includes a polynucleotide having SEQ ID NO 2: 5'-GUCCAGUUUUCCCAGGAAUCCCU-3' or a therapeutically effective fragment thereof.

8. The drug delivery system of claim 1 wherein the targeting peptide is connected to the nanoparticles by reaction with a functional group.

9. The drug delivery system of claim 8 wherein the functional group that can be used for linking includes amines, carboxylic acids, NHS esters, acid anhydrides, or unsaturated imides.

10. The drug delivery system of claim 1 wherein the plurality of nanoparticles includes a plurality of micelles.

11. The drug delivery system of claim 10 wherein each micelle includes a plurality of targeting peptide-conjugated amphiphiles, a plurality of therapeutic agent-conjugated amphiphiles, and an optional plurality of non-targeted amphiphiles.

12. The drug delivery system of claim 11 wherein the plurality of targeting peptide-conjugated amphiphiles includes amphiphiles having a first phospholipid conjugated to the targeting peptide with a first linking group, the plurality of therapeutic agent-conjugated amphiphiles includes amphiphiles having a second phospholipid conjugated to the therapeutic agent with a second linking group, and the optional plurality of non-targeted amphiphiles includes amphiphiles having a third phospholipid conjugated to a capping moiety with a third linking group.

13. The drug delivery system of claim 12 wherein the first linking group, the second linking group, and the third linking group are each independently a polyethylene glycol having a weight average molecular weight from about 500 to 10000 Daltons.

14. The drug delivery system of claim 12 wherein the first phospholipid, the second phospholipid, and the third phospholipid are each independently selected from the group consisting of phosphatidic acids, phosphatidyl inositols, phosphatidyl cholines, phosphatidyl ethanolamines, phosphatidyl serines, phosphatidyl glycerols, and any combinations thereof.

15. The drug delivery system of claim 12 wherein the first phospholipid, the second phospholipid, and the third phospholipid are each independently selected from the group consisting of phosphatidylglycerol, lecithin, sphingomyelin, phosphatidylserine, phosphatidic acid, N-(2,3-di(9-(Z)-octadecenyloxy))-prop-1-yl-N,N,N-trimethylammonium chloride, phosphatidylethanolamine, lysolecithin, lysophosphatidylethanolamine, phosphatidylinositol, cephalin, cardiolipin, cerebrosides, dicetylphosphate, dioleoylphosphatidylcholine, dipalmitoylphosphatidylcholine, dipalmitoylphosphatidylglycerol, dioleoylphosphatidylglycerol, palmitoyl-oleoyl-phosphatidylcholine, di-stearoyl-phosphatidylcholine, stearoyl-palmitoyl-phosphatidylcholine, di-palmitoyl-phosphatidylethanolamine, di-stearoyl-phosphatidylethanolamine, di-myrstoyl-phosphatidylserine, di-oleyl-phosphatidylcholine, dimyristoyl phosphatidyl choline (DMPC), dioleoylphosphatidylethanolamine, palmitoyloleoylphosphatidylcholine, di stearoylphosphatidylcholine, dioleoylphosphatidylcholine, dipalmitoylphosphatidylcholine, dioleoylphosphatidylglycerol, dipalmitoylphosphatidylglycerol, -phosphatidylethanolamine, dioleoyl-phosphatidylethanolamine 4-(N-maleimidomethyl)-cyclohexane-1-carboxylate (DOPE-mal), 1-stearoyl-2-oleoyl phosphatidylcholine, 1,2-distearoyl-sn-glycerol-3-phosphoethanolamine, and combinations thereof.

16. The drug delivery system of claim 12 wherein the optional plurality of non-targeted amphiphiles includes amphiphiles having formula:

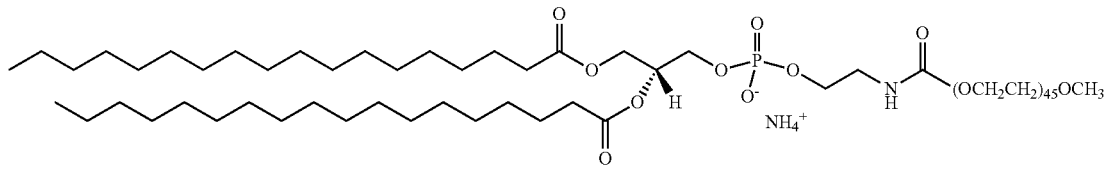

(DSPE-PEG(2000)-Methoxy).

17. The drug delivery system of claim 12 further comprising a pharmaceutically acceptable carrier.

18. The drug delivery system of claim 1 wherein a micelle includes an amphiphile composed of 1',3'-dihexadecyl N-succinyl-1-glutamate (diC16).

19. The drug delivery system of claim 18, wherein the micelle further includes a drug incorporated into a core of the micelle or conjugated to a hydrophobic amphiphile tail.

20. The drug delivery system of claim 19, wherein the drug is selected from the group consisting of cholesterol medications, anti-platelet medications, beta blockers, angiotensin-converting enzyme (ACE) inhibitors, calcium channel blocker, and combinations thereof.

21. The drug delivery system of claim 20, wherein the cholesterol medications are selected from the group consisting of statins, fibrates, and combinations thereof.

22. The drug delivery system of claim 1 wherein the therapeutic agent is a combination of miR-145 and a statin.

23. A drug delivery system comprising:
a plurality of nanoparticles, wherein each nanoparticle includes a statin, a targeting peptide conjugated thereto that targets atherosclerotic plaque, and a therapeutic agent conjugated thereto for treating atherosclerotic plaque, wherein the therapeutic agent includes a component selected from the group consisting of miR-145 and therapeutically effective fragments thereof and wherein the targeting peptide includes a component selected from the group consisting of MCP-1 having a sequence having CYNFTNRKISVQRLASYRRITSSK (SEQ ID NO: 10), a VLA-4 peptide having sequence CVHPKQHR (SEQ ID NO: 3), a fibrin-targeting peptide having sequence CREKA (SEQ ID NO: 7), a collagenase-targeting peptide having sequence CVPMSMRGG (SEQ ID NO: 8), a collagenase-targeting peptide having sequence CVPMSMCYNFTNRKISVQRLASYRRITSSKRGG (SEQ ID NO: 4), and a hydroxyapatitie-targeting peptide having sequence SVSVGMKPSPRP SEQ ID NO: 9).

24. The drug delivery system of claim 23, wherein the plurality of nanoparticles includes nanoparticles selected from the group consisting of micelles, liposomes, and combinations thereof.

25. The drug delivery system of claim 23, wherein the miR-145 includes a polynucleotide having SEQ ID NO 2: 5'-GUCCAGUUUUCCCAGGAAUCCCU-3' or a therapeutically effective fragment thereof.

26. The drug delivery system of claim 23, wherein the plurality of nanoparticles includes a plurality of micelles.

27. The drug delivery system of claim 26, wherein each micelle includes a plurality of targeting peptide-conjugated amphiphiles, a plurality of therapeutic agent-conjugated amphiphiles, and an optional plurality of non-targeted amphiphiles.

28. The drug delivery system of claim 27, wherein the plurality of targeting peptide-conjugated amphiphiles includes amphiphiles having a first phospholipid conjugated to the targeting peptide with a first linking group, the plurality of therapeutic agent-conjugated amphiphiles includes amphiphiles having a second phospholipid conjugated to the therapeutic agent with a second linking group, and the optional plurality of non-targeted amphiphiles includes amphiphiles having a third phospholipid conjugated to a capping moiety with a third linking group.

29. The drug delivery system of claim 28, wherein the first linking group, the second linking group, and the third linking group are each independently a polyethylene glycol having a weight average molecular weight from about 500 to 10000 Daltons.

30. The drug delivery system of claim 28, wherein the first phospholipid, the second phospholipid, and the third phospholipid are each independently selected from the group consisting of phosphatidic acids, phosphatidyl inositols, phosphatidyl cholines, phosphatidyl ethanolamines, phosphatidyl serines, phosphatidyl glycerols, and any combinations thereof.

31. The drug delivery system of claim 28, wherein the first phospholipid, the second phospholipid, and the third phospholipid are each independently selected from the group consisting of phosphatidylglycerol, lecithin, sphingomyelin, phosphatidylserine, phosphatidic acid, N-(2,3-di(9-(Z)-octadecenyloxy))-prop-1-yl-N,N,N-trimethylammonium chloride, phosphatidylethanolamine, lysolecithin, lysophosphatidylethanolamine, phosphatidylinositol, cephalin, cardiolipin, cerebrosides, dicetylphosphate, dioleoylphosphatidylcholine, dipalmitoylphosphatidylcholine, dipalmitoylphosphatidylglycerol, dioleoylphosphatidylglycerol, palmitoyl-oleoyl-phosphatidylcholine, di-stearoyl-phosphatidylcholine, stearoyl-palmitoyl-phosphatidylcholine, di-palmitoyl-phosphatidylethanolamine, di-stearoyl-phosphatidylethanolamine, di-myrstoyl-phosphatidylserine, di-oleyl-phosphatidylcholine, dimyristoyl phosphatidyl choline (DMPC), dioleoylphosphatidylethanolamine, palmitoyloleoylphosphatidylcholine, di stearoylphosphatidylcholine, dioleoylphosphatidylcholine, dipalmitoylphosphatidylcholine, dioleoylphosphatidylglycerol, dipalmitoylphosphatidylglycerol, -phosphatidylethanolamine, dioleoyl-phosphatidylethanolamine 4-(N-maleimidomethyl)-cyclohexane-1-carboxylate (DOPE-mal), 1-stearoyl-2-oleoyl phosphatidylcholine, 1,2-distearoyl-sn-glycerol-3-phosphoethanolamine, and combinations thereof.

32. The drug delivery system of claim 27, wherein the optional plurality of non-targeted amphiphiles includes amphiphiles having formula:

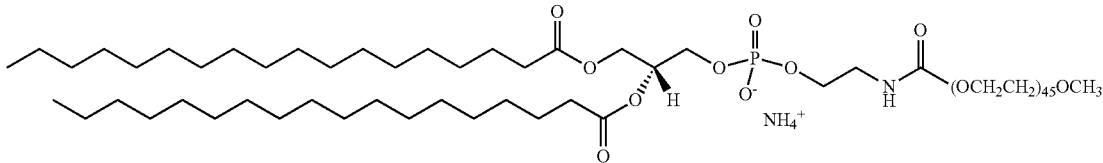

(DSPE-PEG(2000)-Methoxy).

33. The drug delivery system of claim 26, wherein the plurality of micelles includes a drug incorporated into a core of the micelles or conjugated to a hydrophobic amphiphile tail.

34. The drug delivery system of claim 33, wherein the drug is selected from the group consisting of cholesterol medications, anti-platelet medications, beta-blockers, angiotensin-converting enzyme (ACE) inhibitors, calcium channel blockers, and combinations thereof.

35. The drug delivery system of claim 34, wherein the cholesterol medications are selected from the group consisting of statins, fibrates, and combinations thereof.

36. The drug delivery system of claim 23, wherein the plurality of nanoparticles includes a plurality of micelles having an amphiphile composed of 1',3'-dihexadecyl N-succinyl-1-glutamate (diC16).

37. The drug delivery system of claim 23, further comprising a pharmaceutically acceptable carrier.

38. A drug delivery system comprising:
a plurality of nanoparticles wherein each nanoparticle includes a statin, a therapeutic agent for treating atherosclerotic plaque conjugated thereto by a first DSPE-PEG(2000)-maleimide, and a targeting peptide that targets atherosclerotic plaque conjugated thereto by a second DSPE-PEG(2000)-maleimide, the therapeutic agent including miR-145 and the targeting peptide including a polypeptide having SEQ ID NO 1: YNFTNRKISVQRLASYRRITSSK or a fragment thereof that binds to MCP-1.

* * * * *